(12) United States Patent
Goldfain et al.

(10) Patent No.: US 9,654,605 B2
(45) Date of Patent: May 16, 2017

(54) ACCESSORY FOR USE WITH ELECTRONIC DEVICE AND COVER

(71) Applicant: Otter Products, LLC, Fort Collins, CO (US)

(72) Inventors: Russell J. Goldfain, Fort Collins, CO (US); Dane A. Sprister, Fort Collins, CO (US); Jonathan B. Rayeski, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 15/043,721

(22) Filed: Feb. 15, 2016

(65) Prior Publication Data

US 2017/0026498 A1    Jan. 26, 2017

Related U.S. Application Data

(60) Provisional application No. 62/128,415, filed on Mar. 4, 2015.

(51) Int. Cl.
*H04B 1/38* (2015.01)
*H04M 1/02* (2006.01)
(Continued)

(52) U.S. Cl.
CPC ........... *H04M 1/0249* (2013.01); *A45C 11/00* (2013.01); *A45C 11/182* (2013.01); *A45C 15/00* (2013.01);
(Continued)

(58) Field of Classification Search
CPC ............. H04M 1/0249; H04M 1/0254; H04M 1/0262; H04M 1/0274; H04M 2001/0204;
(Continued)

(56) References Cited

U.S. PATENT DOCUMENTS 3,023,885 A    3/1962    Kindseth
4,029,999 A    6/1977    Neumann et al.
(Continued)

FOREIGN PATENT DOCUMENTS

CN    202488509 U    10/2012
KR    200446444    10/2009
(Continued)

*Primary Examiner* — Nguyen Vo

(57) ABSTRACT

An electrical accessory for use with a portable electronic device and with a protective cover for the portable electronic device is provided. The electrical accessory includes a body, an electrical connector, and electrical circuitry. The body includes a back portion and a bottom portion. The back portion is slidably attachable to the back of the protective cover to removably affix the electrical accessory to the back of the protective cover. The bottom portion is adapted to be proximate the bottom of the protective cover when the electrical accessory is removably affixed to the protective cover. The electrical connector is affixed to the bottom portion of the body of the electrical accessory. The electrical connector is positioned to electrically interconnect to an electrical port of the portable electronic device when the electrical accessory is affixed to the protective cover and when the portable electronic device is installed in the protective cover.

20 Claims, 39 Drawing Sheets

(51) Int. Cl.
*A45C 11/00* (2006.01)
*H04B 1/3888* (2015.01)
*A45C 11/18* (2006.01)
*A45C 15/00* (2006.01)

(52) U.S. Cl.
CPC ........ *H04B 1/3888* (2013.01); *H04M 1/0254* (2013.01); *H04M 1/0262* (2013.01); *H04M 1/0274* (2013.01); *A45C 2011/002* (2013.01); *A45C 2011/188* (2013.01); *H04M 2001/0204* (2013.01); *H04M 2201/34* (2013.01)

(58) Field of Classification Search
CPC H04M 2201/34; H04B 1/3883; H04B 1/3888
See application file for complete search history.

(56) References Cited

U.S. PATENT DOCUMENTS

| | | |
|---|---|---|
| 4,097,878 A | 6/1978 | Cramer |
| 4,584,718 A | 4/1986 | Fuller |
| 5,025,921 A | 6/1991 | Gasparaitis et al. |
| 5,123,044 A | 6/1992 | Tate |
| 5,138,523 A | 8/1992 | Benck et al. |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| 5,508,479 A | 4/1996 | Schooley |
| 5,541,813 A | 7/1996 | Satoh et al. |
| 5,671,120 A | 9/1997 | Kikinisi |
| 6,115,248 A | 9/2000 | Canova et al. |
| 6,311,017 B1 | 10/2001 | Mori |
| 6,317,313 B1 | 11/2001 | Mosgrove et al. |
| 6,349,824 B1 | 2/2002 | Yamada |
| 6,375,009 B1 | 4/2002 | Lee |
| 6,445,577 B1 | 9/2002 | Madsen et al. |
| 6,456,487 B1 | 9/2002 | Hetterick |
| 6,490,155 B2 | 12/2002 | Han et al. |
| 6,545,862 B1 | 4/2003 | Gettemy et al. |
| 6,616,111 B1 | 9/2003 | White |
| 6,625,394 B2 | 9/2003 | Smith et al. |
| 6,626,362 B1 | 9/2003 | Steiner et al. |
| 6,701,159 B1 | 3/2004 | Powell |
| 6,762,935 B2 | 7/2004 | Hidewasa |
| 6,865,076 B2 | 3/2005 | Lunsford |
| 7,050,841 B1 | 5/2006 | Onda |
| 7,072,699 B2 | 7/2006 | Eiden |
| 7,194,291 B2 | 3/2007 | Peng |
| 7,236,588 B2 | 6/2007 | Gartrell |
| 7,343,184 B2 | 3/2008 | Rostami |
| 7,359,184 B2 | 4/2008 | Lord |
| 7,555,325 B2 | 6/2009 | Goros |
| 7,558,594 B2 | 7/2009 | Wilson |
| 7,688,580 B2 | 3/2010 | Richardson et al. |
| 7,889,489 B2 | 2/2011 | Richardson et al. |
| 7,907,394 B2 | 3/2011 | Richardson et al. |
| 7,933,122 B2 | 4/2011 | Richardson et al. |
| 8,049,727 B2 | 11/2011 | Hanson et al. |
| 8,453,344 B2 | 6/2013 | Nishiwaki et al. |
| 8,457,701 B2 | 6/2013 | Diebel |
| 8,567,599 B2 | 10/2013 | Beatty et al. |
| 8,599,547 B2 | 12/2013 | Richardson et al. |
| 8,755,852 B2 | 6/2014 | Hynecek et al. |
| 8,777,002 B2 | 7/2014 | Lonsdale, II et al. |
| 8,798,675 B2 | 8/2014 | Salmon et al. |
| 9,060,580 B2 | 6/2015 | Tages |
| 9,098,238 B2 | 8/2015 | Richardson et al. |
| 9,125,297 B2 | 9/2015 | Magness |
| 2002/0065054 A1 | 5/2002 | Humphreys et al. |
| 2002/0079244 A1 | 6/2002 | Kwong |
| 2005/0088811 A1* | 4/2005 | Ulla ..................... G06F 1/1626 361/679.21 |
| 2005/0224508 A1 | 10/2005 | Tajiri et al. |
| 2005/0279661 A1 | 12/2005 | Hodges |
| 2006/0172765 A1 | 8/2006 | Lev |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0146985 A1 | 6/2007 | Mick et al. |
| 2007/0158220 A1 | 7/2007 | Cleereman et al. |
| 2007/0297149 A1 | 12/2007 | Richardson et al. |
| 2008/0163463 A1 | 7/2008 | Hulden |
| 2009/0034169 A1 | 2/2009 | Richardson et al. |
| 2009/0237377 A1 | 9/2009 | Lai et al. |
| 2009/0283184 A1 | 11/2009 | Han |
| 2010/0006468 A1 | 1/2010 | Lin |
| 2010/0093412 A1 | 4/2010 | Serra et al. |
| 2010/0122756 A1 | 5/2010 | Longinotti-Buitoni |
| 2010/0203931 A1 | 8/2010 | Hynecek et al. |
| 2011/0064401 A1 | 3/2011 | Desorbo |
| 2011/0192857 A1 | 8/2011 | Rothbaum et al. |
| 2011/0228459 A1 | 9/2011 | Richardson et al. |
| 2012/0018325 A1 | 1/2012 | Kim |
| 2012/0037536 A1 | 2/2012 | Lonsdale, II et al. |
| 2012/0111881 A1 | 5/2012 | Gaddis, II et al. |
| 2012/0287565 A1 | 11/2012 | Bennett |
| 2013/0027862 A1 | 1/2013 | Rayner |
| 2013/0088813 A1 | 4/2013 | Su et al. |
| 2013/0098788 A1 | 4/2013 | McCarville et al. |
| 2013/0220841 A1 | 8/2013 | Yang |
| 2013/0220847 A1 | 8/2013 | Fisher et al. |
| 2014/0049142 A1 | 2/2014 | Magness |
| 2014/0065847 A1 | 3/2014 | Salmon et al. |
| 2014/0097102 A1 | 4/2014 | Piatt et al. |
| 2014/0099526 A1 | 4/2014 | Powell et al. |
| 2014/0183064 A1 | 7/2014 | Ge |
| 2014/0183065 A1 | 7/2014 | Toulotte |
| 2014/0187289 A1 | 7/2014 | Cataldo et al. |
| 2014/0228074 A1 | 8/2014 | Kulkarni et al. |
| 2014/0265765 A1 | 9/2014 | Khodapanah et al. |
| 2014/0302896 A1* | 10/2014 | Xu ..................... H04B 1/3883 455/574 |
| 2015/0068935 A1 | 3/2015 | Kay et al. |

FOREIGN PATENT DOCUMENTS

| | | |
|---|---|---|
| KR | 101394285 | 5/2014 |
| WO | 9400037 A1 | 1/1994 |
| WO | 9941958 A1 | 8/1999 |
| WO | 2015103599 A1 | 7/2015 |

* cited by examiner

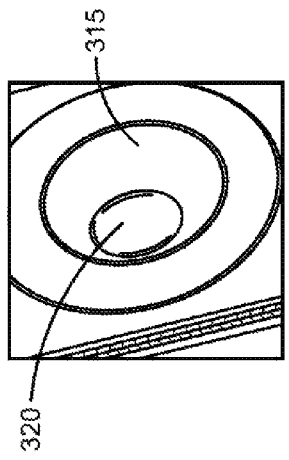
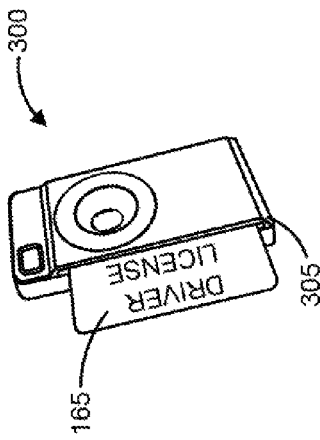
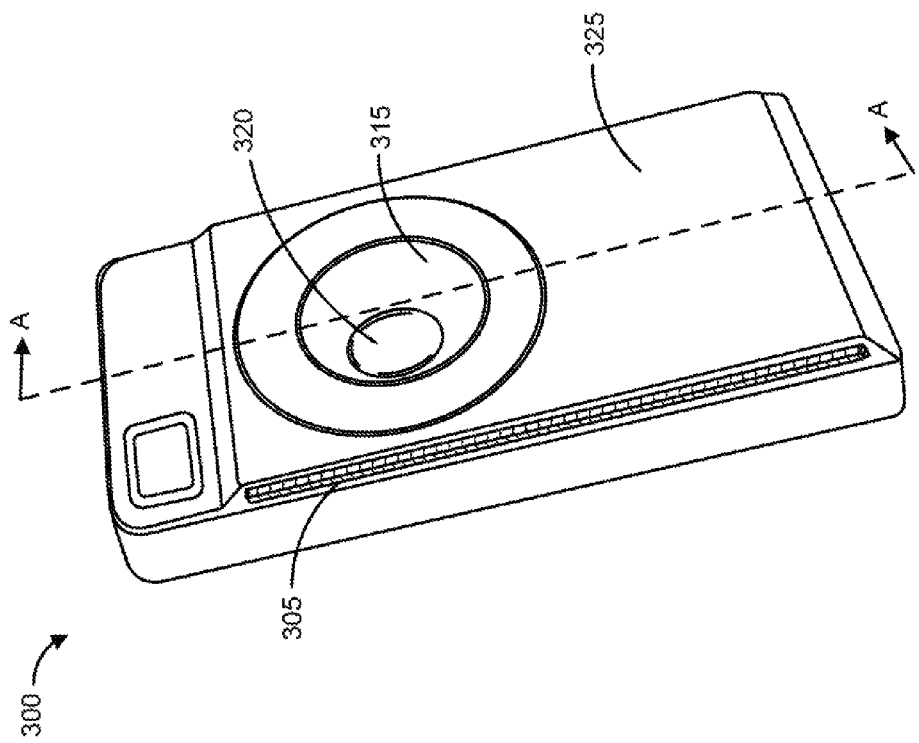

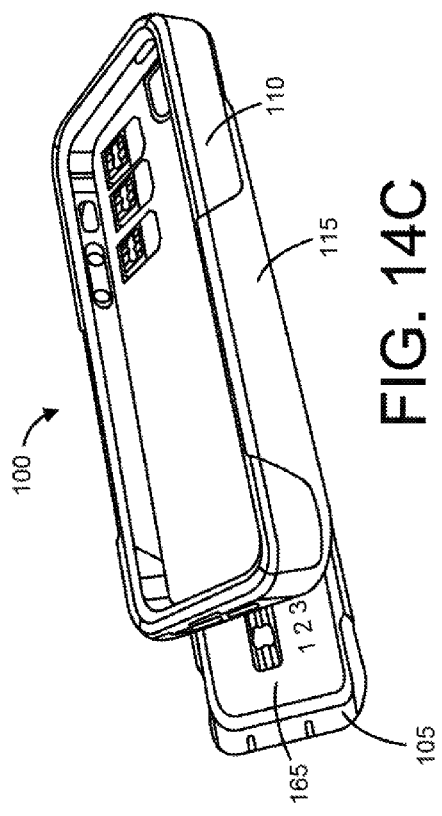

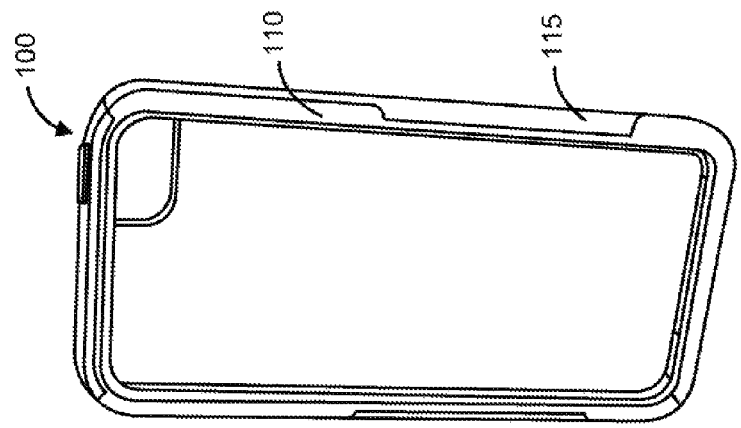
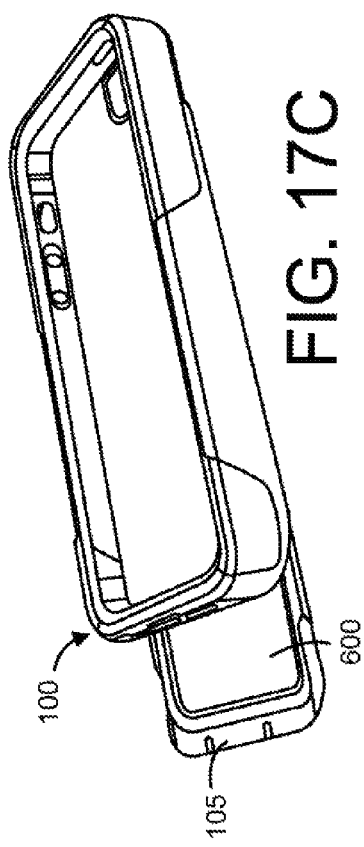
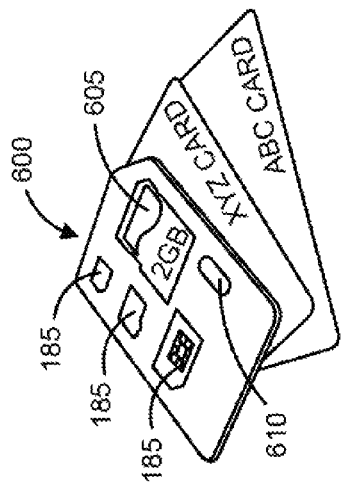
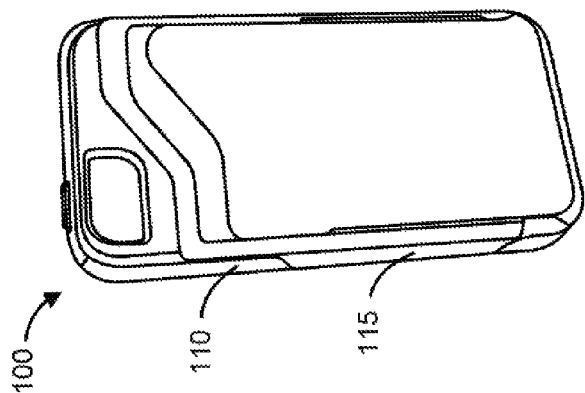

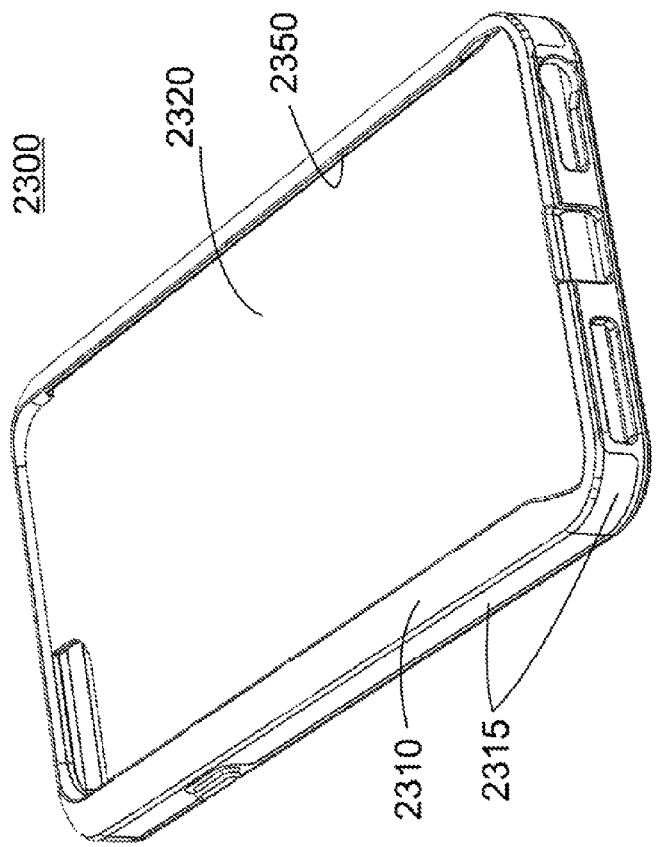
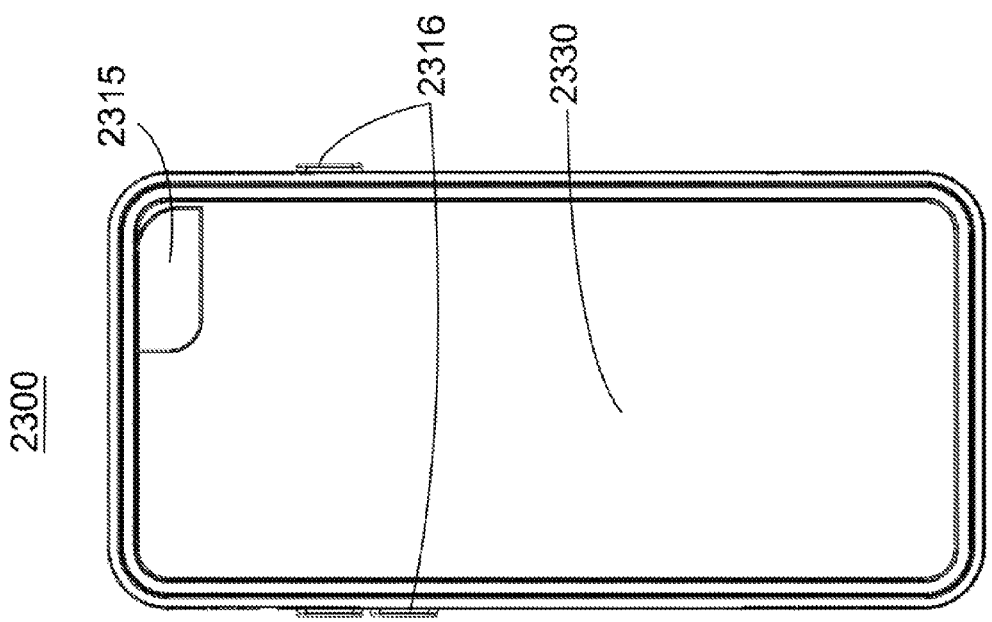
FIG. 23B
FIG. 23A

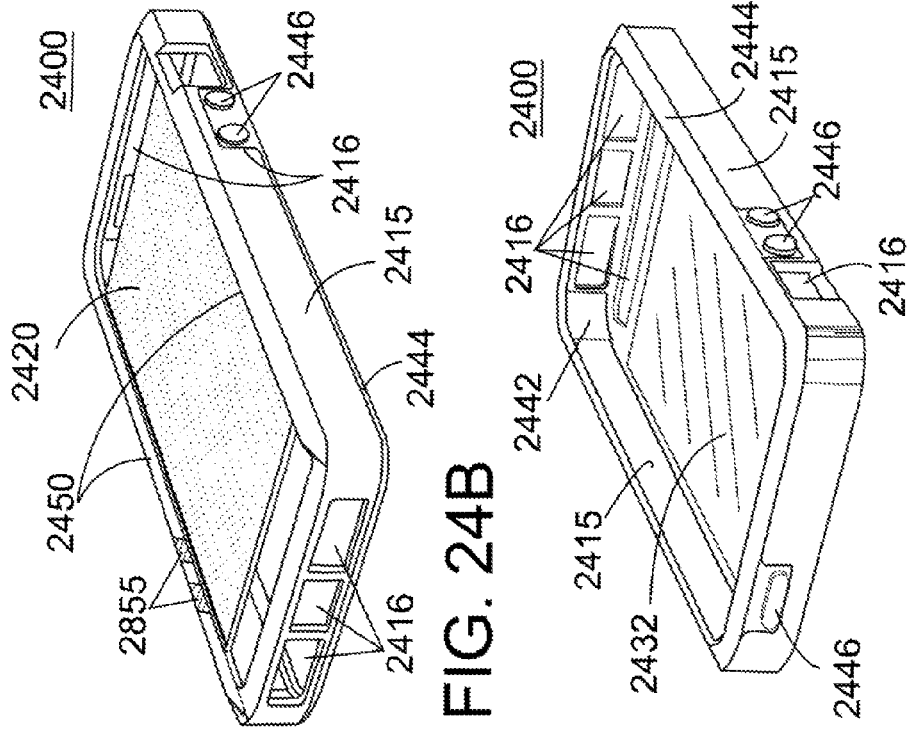
FIG. 24B
FIG. 24C
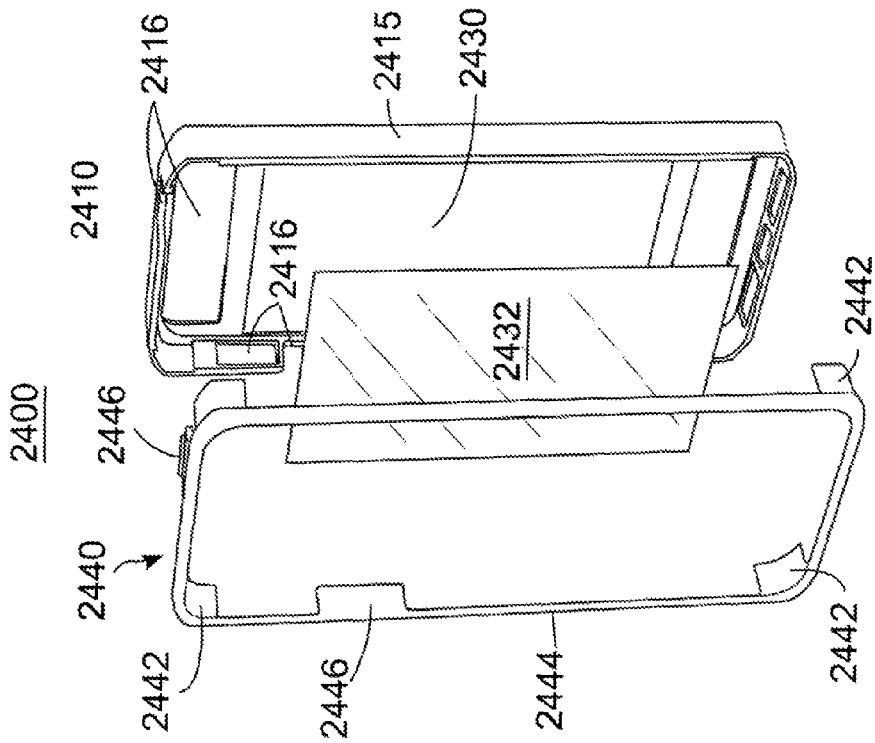
FIG. 24A

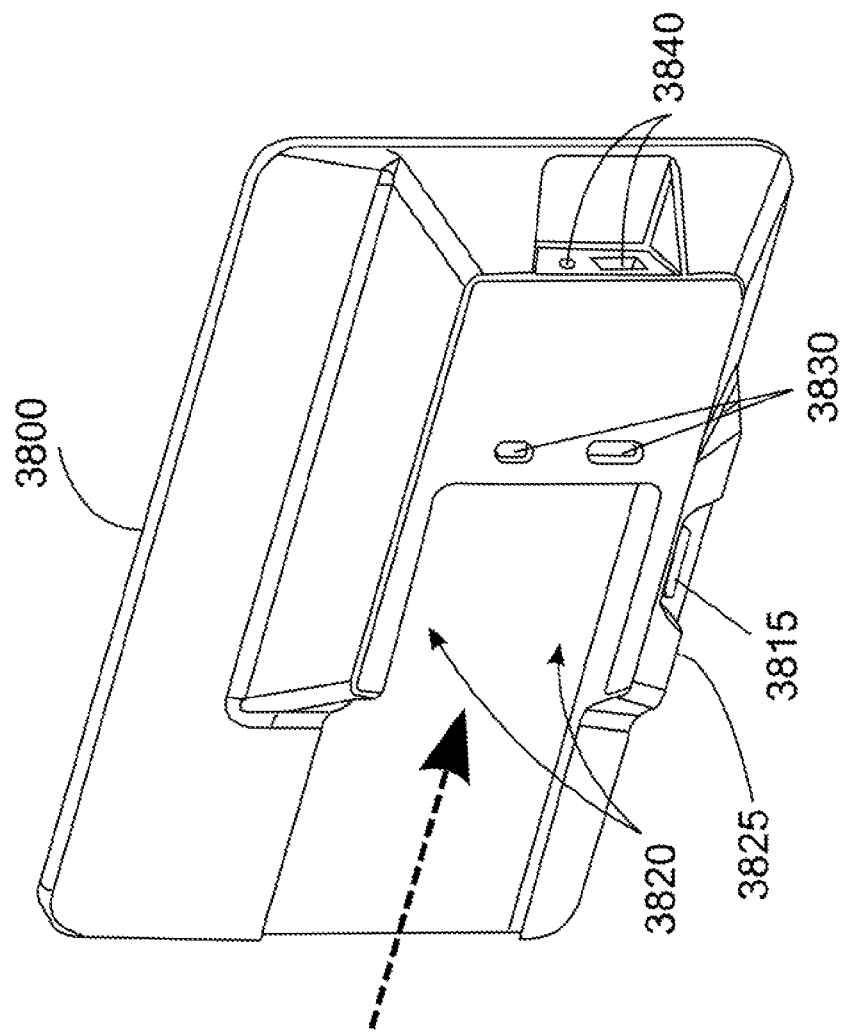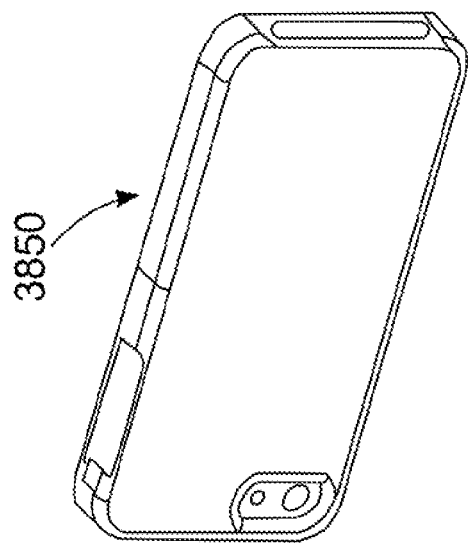
FIG. 38

ACCESSORY FOR USE WITH ELECTRONIC DEVICE AND COVER

CROSS REFERENCE TO RELATED APPLICATIONS

This application claims priority to U.S. Provisional Patent Application No. 62/128,415, filed Mar. 4, 2015, which is hereby incorporated by reference in its entirety.

BACKGROUND

Personal electronic devices are commonly used for communication and entertainment purposes. Examples of personal electronic devices include smartphones, tablets, audio players, video players, cameras, portable computers, two-way radios, and GPS receivers. As these devices become an increasingly important part of peoples' daily activities, it is desirable to create new protective cases that not only protect electronic devices from damage, but also serve other useful purposes. As personal electronic devices proliferate, there is a need to use such devices together while minimizing the effort to carry and connect them.

SUMMARY

In one example, an electrical accessory for use with a portable electronic device and with a protective cover for the portable electronic device is provided. The protective cover is adapted to receive and at least partially enclose the portable electronic device. The electrical accessory includes a body, an electrical connector, and electrical circuitry. The body includes a back portion and a bottom portion. The back portion is slidably attachable to a back side surface of the protective cover to removably affix the electrical accessory to the back side surface of the protective cover. The bottom portion is adapted to be proximate a bottom side surface of the protective cover when the electrical accessory is removably affixed to the protective cover. The electrical connector is affixed to the bottom portion of the body of the electrical accessory. The electrical connector is positioned to electrically interconnect to an electrical port of the portable electronic device when the electrical accessory is removably affixed to the protective cover and when the portable electronic device is installed in the protective cover. The electrical circuitry is connected to the electrical connector of the electrical accessory. The electrical circuitry is adapted to electrically interact with the portable electronic device through the electrical connector of the electrical accessory when the electrical accessory is removably affixed to the protective cover and when the portable electronic device is installed in the protective cover.

In another example, a modular accessory system includes a cover for an electronic device and an electrical accessory of the type described herein.

In another example, an electrical adapter may be a separate component from the electrical accessory and the cover.

In yet another example, a modular accessory for attachment to a case of a portable electronic device may include an outer casing. The outer casing may enclose an interior cavity and may have a first major exterior surface. The modular accessory may have two parallel sides at opposite edges of the first major exterior surface. Rails may be formed along the two parallel sides of the first major surface, and may each be structured to slidably engage a rail receiver of a case for a portable electronic device. The first major surface faces the case when the rails are engaged with the rail receivers.

The protective case may include a protective shell and at least two rail receivers. The protective shell may include a back portion and four sides, the back portion having a rear, external surface and a front, internal surface opposite the rear external surface. The four sides each extend in a substantially same direction at perimeter edges of the front, internal surface. The four sides are structured to contact and securely hold corresponding sides of the mobile electronic device when the mobile electronic device is at least partially covered by the protective shell. The front, internal surface is structured to contact a corresponding back portion of the mobile electronic device.

The at least two rail receivers are disposed along opposing edges of the rear, external surface and are structure. The rail receivers slidably receive and securely retain at least one modular accessory having rails that engage the rail receivers when a modular accessory is installed on the protective shell.

In accord with the disclosure, a protective case for a personal electronic device includes a protective shell and at least one removable accessory. The protective shell includes a rear, exterior surface, a front, interior surface, and one or more side walls. The rear, exterior surface having a substantially planar element. The substantially planar element has at least one retaining feature structured to receive and removably hold at least one accessory. The front, interior surface is disposed opposed the rear, exterior surface, and contacts a rear surface of the personal electronic device when the protective case coves at least a portion of the personal electronic device. The one or more side walls extend in a first direction at respective perimeter edges of the protective shell, and are formed to contact respective side portions of the personal electronic device. The at least one removable accessory includes a retention feature formed to join with the at least one retaining feature of the rear exterior surface of the protective shell.

BRIEF DESCRIPTION OF DRAWINGS

FIG. 6A shows a protective case with a first slot configured to receive and store a first card and a second slot configured to receive and store a second card. FIG. 6B shows a close up view of a portion of the protective case of FIG. 6A. FIG. 6C shows the protective case of FIG. 6A with a card partially inserted.

FIG. 14A shows a rear view of a protective case with a compartment to store items and pockets within an interior surface of the case, where the pockets are configured to capture and safely store one or more SIM cards. FIG. 14B shows a front perspective view of the protective case of FIG. 14A containing three SIM cards, each stored in a pocket disposed within an interior surface of the protective case. FIG. 14C shows a side perspective view of the protective case of FIG. 14A containing three SIM cards, each stored in a pocket disposed within an interior surface of the protective case, and a credit card disposed in a compartment formed in a sliding compartment door.

FIG. 17A shows a rear view of a protective case with a compartment, where the compartment is adapted to receive a credit card, identification card, or a storage tray containing a plurality of memory storing devices. FIG. 17B shows a front view of the protective case of FIG. 17A. FIG. 17C shows a side perspective view of the protective case of FIG. 17A. FIG. 17D shows memory storage devices which can be used with the protective case of FIG. 17A.

FIG. 23A shows a front view of a protective case adapted to receive a modular accessory. FIG. 23B shows a rear perspective view of the protective case of FIG. 23A.

FIGS. 24A-24C show an exploded front view, bottom rear perspective, and top front perspective views, respectively, of a protective case adapted to receive a modular accessory.

FIG. 38 illustrates a super-modular accessory according to a disclosed embodiment.

DETAILED DESCRIPTION

As provided above, an electronic device, such as a portable electronic device, may include a smartphone (such as an iPhone®), a personal digital assistant, a camera, an audio player, an audio recording device, a medical instrument, an electronic tool, a radio, an illumination device such as a flashlight, a firearm, a game console, a key fob, or the like, or any combination thereof. A disclosed case may in certain embodiments contact a back and at least two perimeter sides of a smart phone. In other embodiments, a case may contact all perimeter sides of the smartphone. In yet another embodiment, the case may contact the back and all perimeter sides of the smartphone.

In many instances, it can be desirable to have a protective case 100 that is capable of accessibly storing a wide variety of personal items, such as cash, keys, computer memory cards, payment cards (e.g. debit or credit cards), employee badge, and/or a driver's license; or of removably holding a number of interchangeable accessories, such as a storage accessory. The ability to store items in protective case 100 can allow a user to leave their wallet or purse at home when only relatively small items need to be transported.

The solutions described herein include a variety of protective cases, each having a compartment for storing items and/or for holding electronic components that can perform electronic functions of the case or to enhance function of an encased device. Unlike conventional wallets, which rely on leather or fabric sleeves to retain a payment or identification card and leave a portion of the card exposed, the solutions described herein do not leave the card exposed whatsoever and thereby provide greater security against theft or loss of the card. Also, the solutions described herein provide far greater protection from damage for stored items than traditional purses and wallets, and in some examples, also provide protection against liquids, dirt, and/or dust by incorporating a sealing compartment. Various examples of protective cases with compartments are presented in the accompanying figures and are described in detail below. Similarly, solutions described herein provide a case that securely, but removably, receives any of one or more interchangeable modular accessories.

Figure 1A:
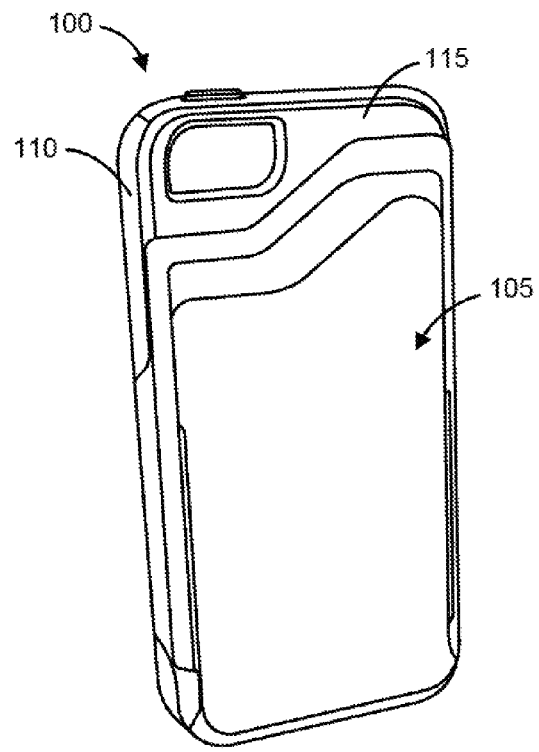
FIG. 1A shows a rear view of a protective case with a compartment for storing items.
Figure 1B:
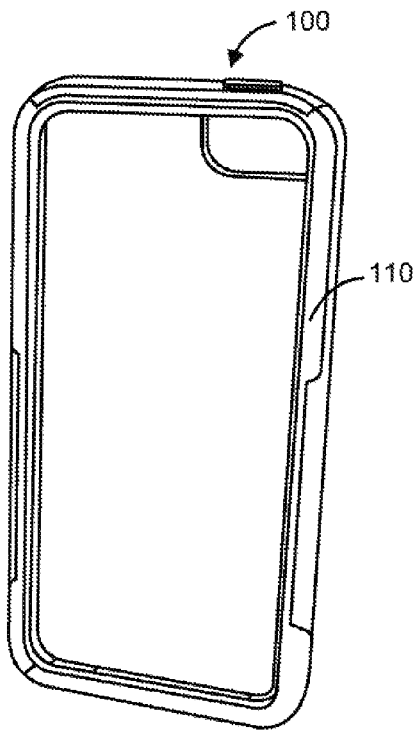
FIG. 1B shows a front perspective view of the protective case of FIG. 1A.
Figure 1C:
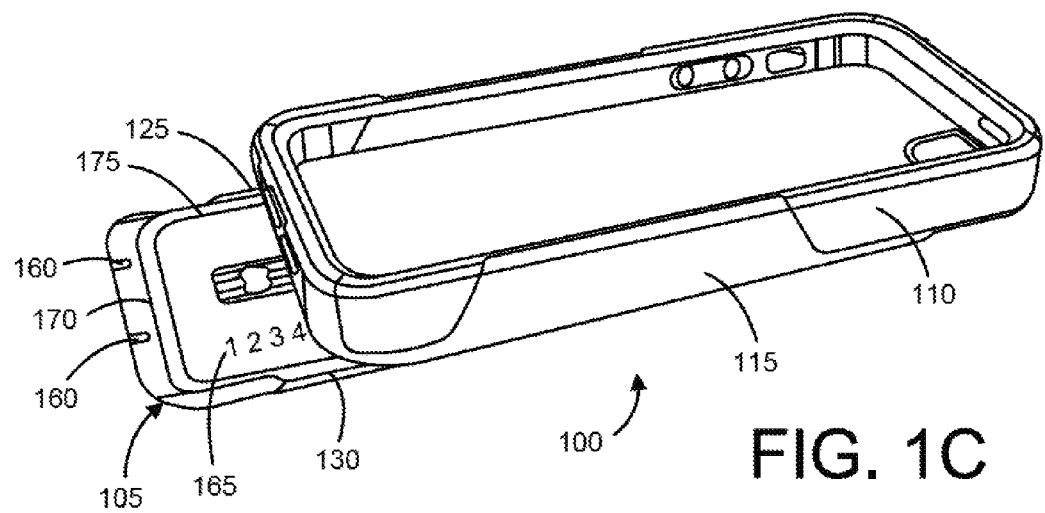
FIG. 1C shows a side perspective view of the protective case of FIG. 1A with a sliding drawer in an open position.
Figure 2:
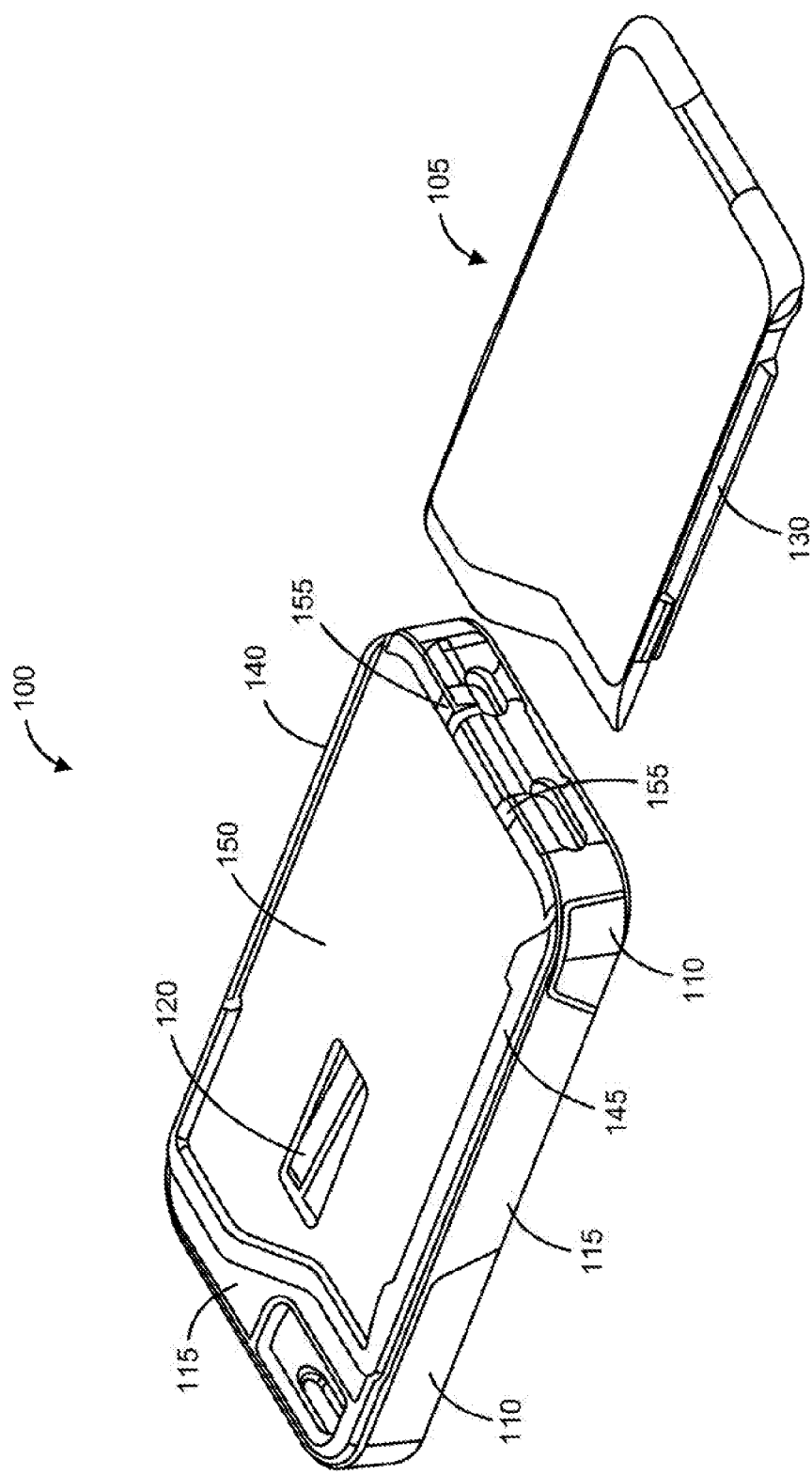
FIG. 2 shows a rear perspective view of the protective case of FIG. 1, where a sliding drawer is completely detached from a back side surface of the protective case.

As shown in FIGS. 1A-C and 2, a protective case 100 for a personal electronic device can include sliding drawer 105 configured to receive a card 165, such as a payment card or driver's license. The sliding drawer 105 can slidably attach to a back side surface 150, as shown in FIG. 2, of the protective case 100. The card 165 can reside in a compartment located within the protective case. In one example, the compartment can be a volume bounded, in part, by the inner surface of the sliding drawer 105 and the back side surface 150 of the protective case 100. The card 165 can be accessible when the sliding drawer 105 is in an opened position, as shown in FIG. 1C, and can be completely concealed when the sliding drawer is in a closed position, as shown in FIG. 1A. The card 165 can nest inside the sliding drawer 105 such that the card is visible to the user when the sliding drawer is opened and the user is viewing a display screen of the personal electronic device. This configuration can permit the user to retrieve the card 165 from the sliding drawer 105 while holding the electronic device is an orientation that permits the user to continue viewing and interacting with the display screen of the electronic device. In some instances, the user may be submitting payment information through a website accessed with the electronic device. To view a credit card number for entry, the user may simply open the sliding drawer, view the number, and enter the number into a payment filed on the website.

The sliding drawer 105 can have an inner surface 175 that is configured to accommodate a standard card. Specifically, the inner surface 175 of the sliding drawer 105 can define a rectangular cavity having a length of about 3.38 inches and a width of about 2.13 inches. In one instance, the dimensions of the inner surface 175 of the sliding drawer 105 can be slightly larger than the dimensions of a standard card to ease insertion and removal of the card into and from, respectively, the sliding drawer. For instance, the rectangular cavity within the sliding drawer can have a length of about 3.38-3.40, 3.38-3.43, 3.38-3.48, or 3.38-3.58 inches and a width of about 2.13-2.15, 2.13-2.18, 2.13-2.23, or 2.13-2.33 inches The sliding drawer 105 can include a relief 170, as shown in FIG. 1C, which can be about the size of a fingertip and can make the card easier to retrieve from the sliding drawer. The relief 170 can be centrally located along the bottom edge of the sliding drawer 105. Alternately, the relief can be located at the left or right side of the bottom edge of the sliding drawer 105 or along the right side edge or left side edge of the sliding drawer.

The sliding drawer 105 can attach to the protective case 100 using a rail system. In one example, as shown in FIGS. 1A-C and 2, the sliding drawer 105 can include a first rail 125 disposed along a first edge of the sliding drawer and a second rail 130 disposed along a second edge of the sliding drawer, where the first edge of the sliding drawer is opposite the second edge of the sliding drawer. The protective case 100 can include a first rail receiver 140 located proximate a first edge of the back side surface 150 and a second rail receiver 145 located proximate a second edge of the back side surface. The first rail receiver 140 can be configured to receive the first rail 125 on the sliding drawer 105, and the second rail receiver 145 can be configured to receive the second rail 130 on the sliding drawer.

In an alternate configuration, the sliding drawer 105 can include a first rail receiver disposed along a first edge and a second rail receiver disposed along a second edge, where the first edge of the sliding drawer is opposite the second edge of the sliding drawer. The protective case 100 can include a first rail located proximate a first edge of the back side surface 150 of the protective case and a second rail located proximate a second edge of the back side surface. The first rail can be configured to engage the first rail receiver, and where the second rail can be configured to engage the second rail on the sliding drawer when the sliding drawer is attached to the protective case.

The sliding drawer 105 can include one or more detents 160 configured to secure the sliding drawer in a closed position. As shown in FIG. 1C, the detents 160 can be raised semi-spherical detents that are configured to engage in correspondingly shaped recesses 155 located on the back side surface 150 of the protective case 100. Although the detents 160 are shown proximate a bottom edge of the sliding drawer 105 in FIG. 1C, this is not limiting. The detents 160 can be located in any suitable location. For instance, the detents 160 could be located proximate a top edge of the sliding drawer 105.

As shown in FIGS. 1A-C and 2, the protective case 100 can include a flexible cushion layer 110 that fits within a cavity of a structural layer 115. The flexible cushion layer 110 can absorb and dissipate impact forces associated with dropping the protective case onto the ground. The flexible cushion layer 110 can cover at least a back surface of the personal electronic device. The flexible cushion layer 110 can also cover a top surface and a bottom surface of the electronic device as well as left side surface and a right side surface of the electronic device. As a result of this surface coverage, the flexible cushion layer 110 can protect the electronic device from scuffs, scratches, or other surface damage.

The flexible cushion layer 110 can be made of any suitable material, such as a saturated or unsaturated elastomer. Examples of suitable materials include, but are not limited to, silicon rubbers and thermoplastic elastomers (TPE), including silicone-based thermoplastics. The flexible cushion layer 110 can have any suitable hardness. In one example, the flexible cushion layer 110 can have a hardness of 30-70, 30-50, or 40-50 Shore A. The flexible cushion layer 110 can be formed through an injection molding process or other suitable manufacturing process. The flexible cushion layer 110 can have a thickness of about 0.005 to 0.25, 0.005 to 0.1, 0.01 to 0.08, 0.01 to 0.06, 0.01 to 0.05, or 0.01 to 0.04 in.

The structural layer 115 can be made from any suitable material such as a thermoplastic polymer. The structural layer 115 can include metal, wood, polycarbonate (PC), nylon, composite (e.g. carbon fiber composite), or glass filled nylon. Alternately, any other material, or combination of materials, that provide suitable rigidity to the protective enclosure 100 can be used in manufacturing the structural layer 115.

The protective case 100 can include a retention spring 120 extending from a back side surface 150 of the protective case 100, as shown in FIG. 2. The retention spring 120 can be configured to provide a spring force against an inner surface 175 of the sliding drawer 105 to resist opening of the sliding drawer when the sliding drawer is in a closed position. The retention spring 120 can include a first end that is attached to the back side surface 150 and a second end that is opposite the first end. The second end of the retention spring 120 can include a detent or other suitable retention feature configured to engage a corresponding retention feature located on an inner surface 175 of the sliding drawer 105. In another example, the retention spring 120 can be configured to provide a spring force against a card 165 located in the sliding drawer 105 compartment, thereby pressing the card against the inner surface 175 of the sliding drawer and preventing the card from rattling within the compartment.

Figure 3:
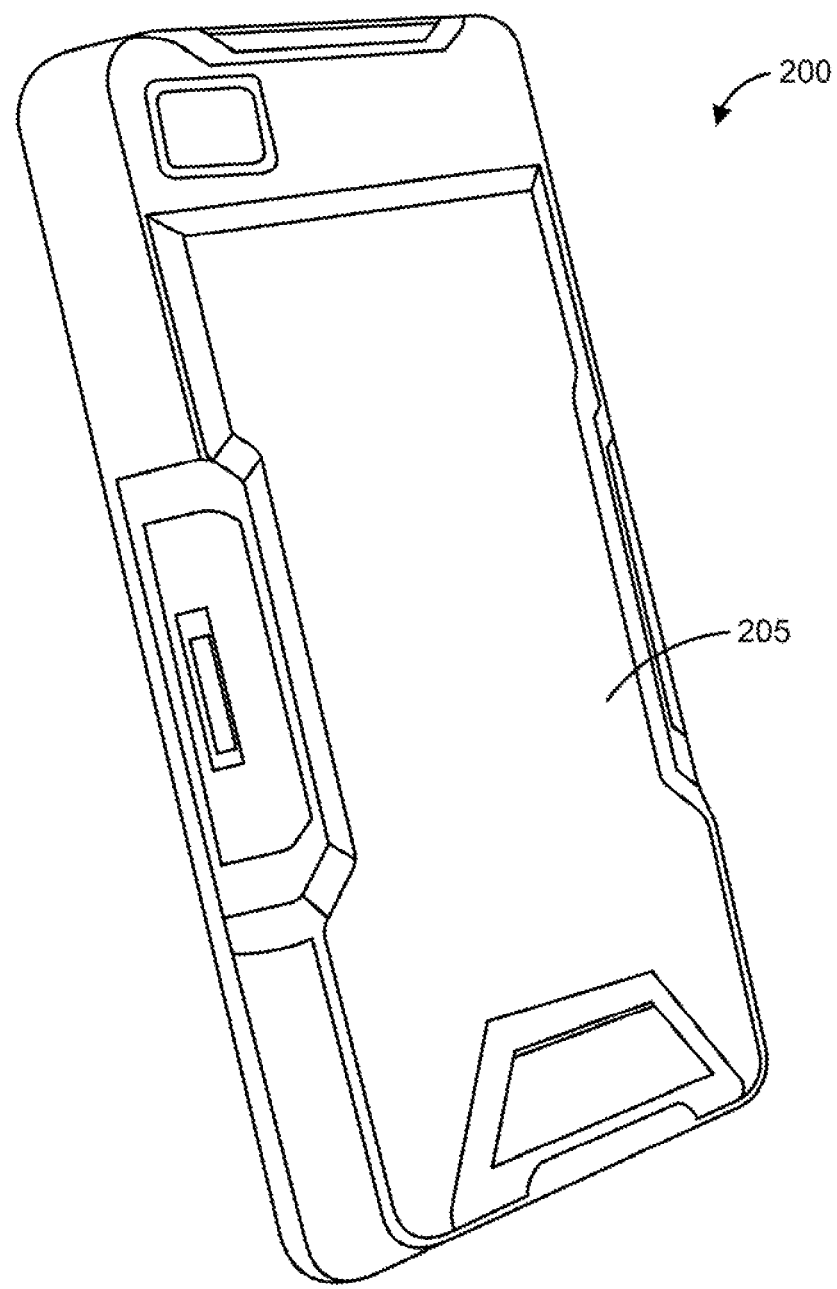
FIG. 3 shows a rear perspective view of a protective case with a compartment.
Figure 4:
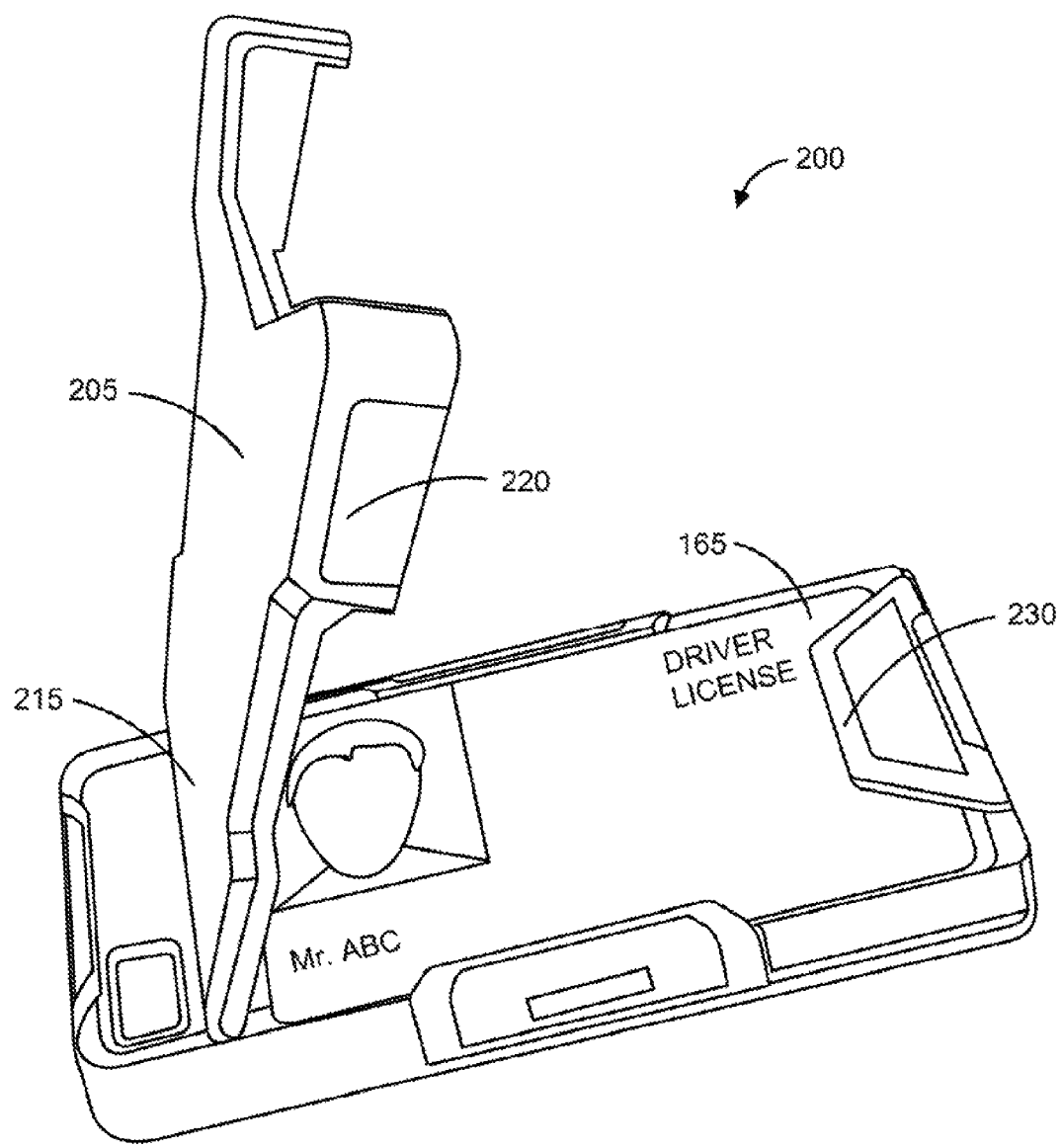
FIG. 4 shows a rear perspective view of the protective case of FIG. 3 with a compartment door in an open position revealing a driver's license stored within the compartment.
Figure 5B:
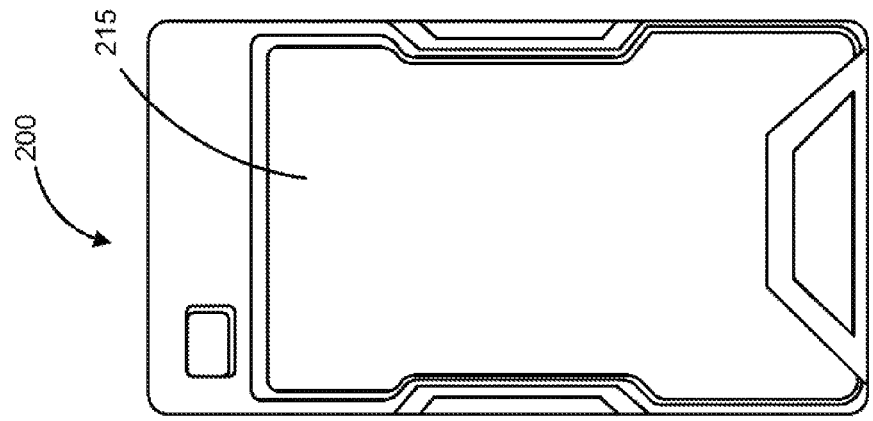
FIG. 5B shows a rear view of the protective case of FIG. 5A with the compartment door in a closed position.
Figure 5A:
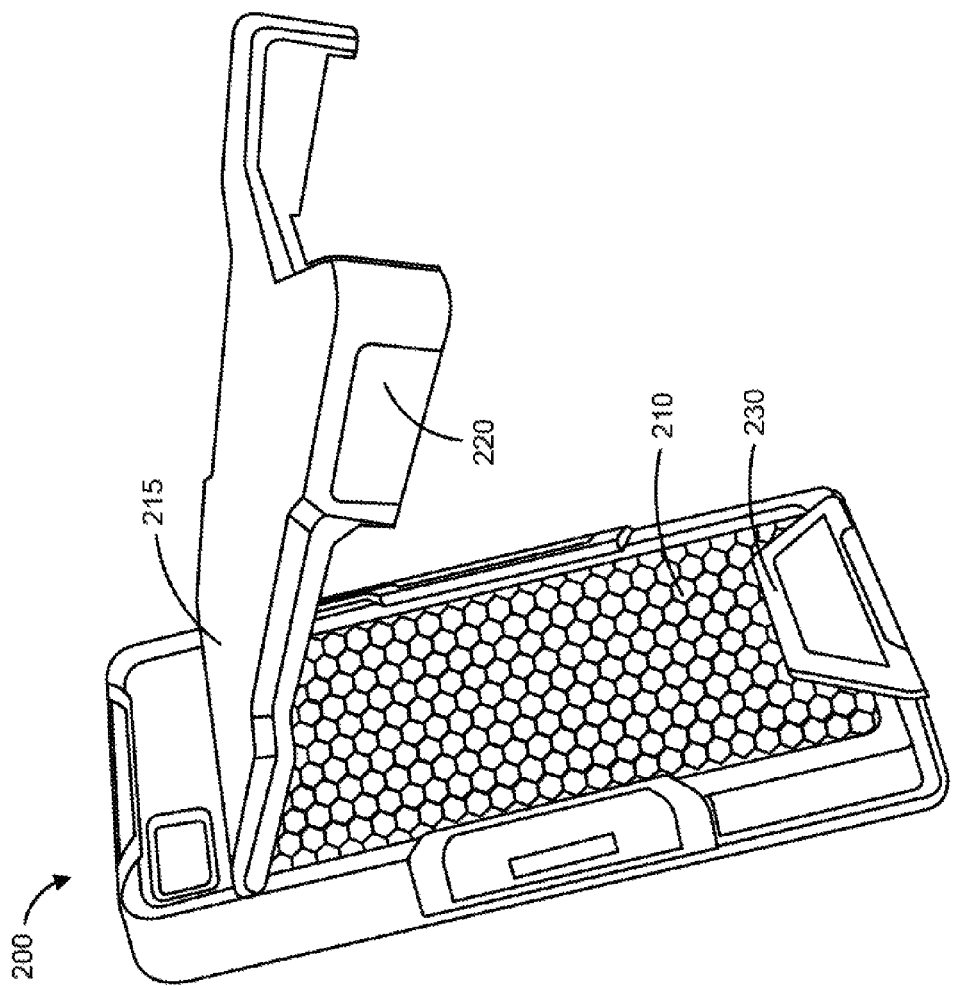
FIG. 5A shows a rear perspective view of the protective case of FIG. 3 with the compartment door in an open position.
Figure 5D:
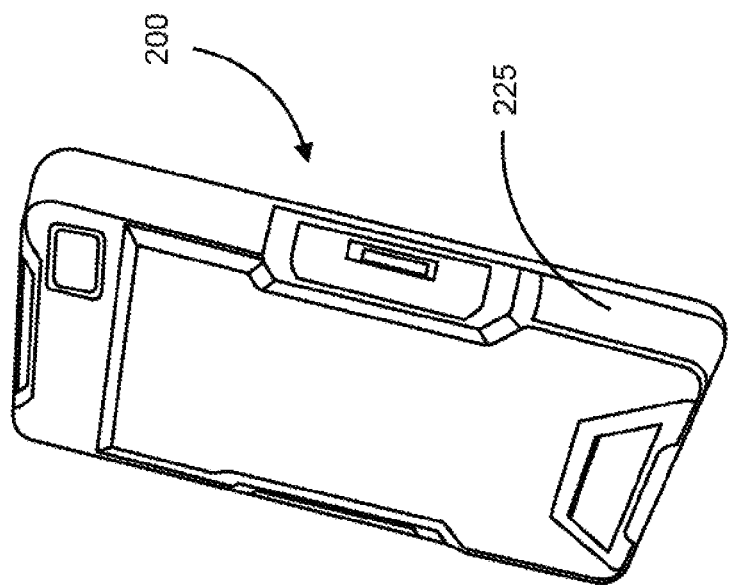
FIG. 5D shows a rear perspective view of the protective case of FIG. 5A with the compartment door in a closed position.
Figure 5C:
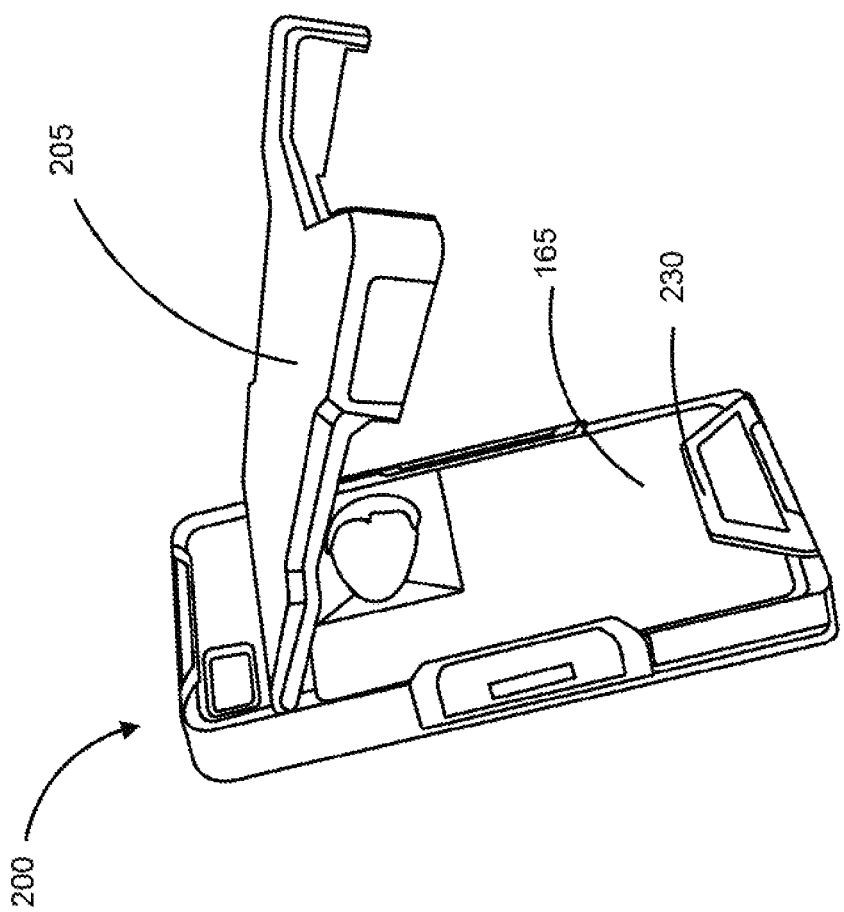
FIG. 5C shows a rear perspective view of the protective case of FIG. 5A with the compartment door in an open position exposing a driver's license stored within the compartment.

As shown in FIGS. 3-5, the protective case 200 can include a compartment door 205 located proximate a back side surface 210 of the protective case. The compartment door 205 can open to permit access to a compartment located within the protective case 200. The compartment can be configured to receive a card 165, as shown in FIG. 4. In another example, the compartment can be configured to receive cash or personal items such as, for example, a key, ring, cosmetics (e.g. powder), tools for cosmetics (e.g. cosmetic brushes), or lip balm. In one example, the protective case 100 can serve as a suitable replacement for a compact and can include a mirror, pressed or loose powder, and a powder application tool, such as a brush or puff. The protective case 100 can include a quantity of cosmetics (e.g. pressed powder) disposed within a cosmetics receptacle, such as a shallow container, formed in the compartment. A cosmetic tool for applying the cosmetics can be removably attached to an inner surface of the compartment. The cosmetic tool can be attached to the inner surface of the compartment with adhesive, hook and loop fastener, snap fit, keeper, or any other suitable method of attachment. In one example, the cosmetic tool can be stored into a long slender opening in the protective case, similar to the way a stylus is stored within certain handheld computers.

A mirror can be attached to an inner surface of the compartment door 205, sliding drawer 105, or to a back side surface 150 of the protective case (e.g. 100, 200). The mirror can be attached with adhesive or any other suitable fastener. The mirror can include a substrate material coated with a reflective material such as, for example, glass coated with a thin layer of silver or aluminum. To provide a durable mirror that can withstand drops without shattering, the mirror can be made of GORILLA GLASS coated with a thin layer of silver or aluminum. In other examples, the mirror can be made of polished metal or metal foil and may not include glass.

The compartment door 205 can be attached to the protective case 200 by a hinge 215. The hinge 215 can be a living hinge. In one example, the living hinge can be made of the same material as the compartment door 205, but can be significantly thinner to permit flexing. In another example, the living hinge can be overmolded onto the compartment door 205 and can include a thermoplastic elastomer.

The compartment door 205 can include a first recess 220 and a second recess 225. The first and second recesses (220, 225) can allow the user to secure an opposable grip on the compartment door 205. Specifically, the user can place a thumb in either the first or second recesses (220, 225) and a forefinger in the remaining recess. By pinching the compartment door 205 at the first and second recesses simultaneously, retention features on the compartment door can release from the back side surface 210 of the protective case 200, thereby permitting the user to open and access the compartment and also providing a multi-step process that prevents inadvertent opening of the compartment.

The protective case 200 can include a card clip 230, as shown in FIG. 4. The card clip 230 can provide a compressive force that presses the card 165 against the back side surface 210 of the protective case 200 when the card is stored in the compartment. The compressive force can prevent the card 165 from falling out of the compartment if the compartment door 205 opens inadvertently. In one example, the card clip 230 can be spring loaded to provide a suitable compressive force against the card 165. In another example, the clearance between the back side surface 210 and an inner surface of the card clip 230 can be sufficiently narrow to provide a suitable compressive force against the card 165. In this example, the clearance between the back side surface 210 and an inner surface of the card clip 230 may be less than the thickness of the card 165, and the card clip may deflect outwardly slightly to accommodate the card.

As shown in FIGS. 6-9, the protective case 300 can include a first slot 305 that serves as a compartment for storing a first card 165. The protective case 300 can include an ejection mechanism disposed within the protective case 300. The ejection mechanism can be connected to a dial 315. A recess 320 of the dial 315 may be offset from a central rotation axis of the dial 315 to aid in rotation of the dial via a user's finger. Rotation of the dial 315 in a first direction can cause the ejection mechanism to eject the first card 165 from the first slot 305 entirely. Alternately, rotation of the dial 315 in a first direction can cause the ejection mechanism to eject at least a portion of the first card 165 from the first slot 305, as shown in FIG. 6C. For instance, rotation of the dial 315 in a first direction can cause about 1-5%, 5-15%, 15-30%, 30-50%, or 50-75% of the first card 165 to be ejected from the first slot 305, which can permit the user to easily grasp and withdraw the first card form the first slot.

Figure 7A:
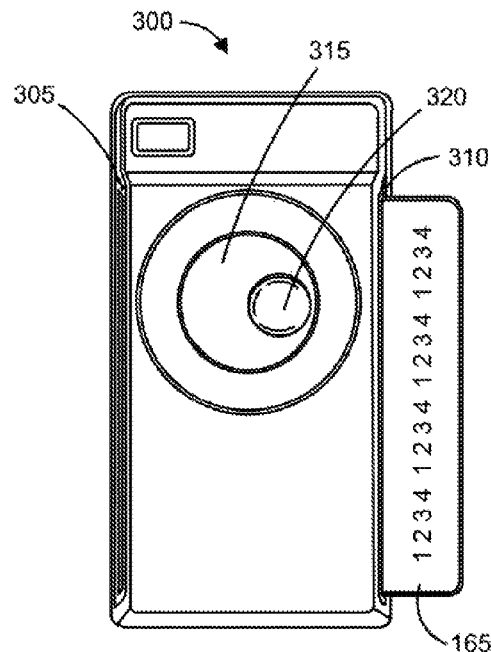
FIGS. 7A-7C show three protective cases, each having a slot configured to receive a card, and each having a mechanism for ejecting the card from the slot.

The protective case 300 can include a second slot 310 that serves as a compartment for storing one or more cards, such as card 165. Rotation of the dial 315 in a second direction, opposite the first direction, can cause the ejection mechanism to eject the second card 165 from the second slot entirely. Alternately, rotation of the dial 315 in a second direction, opposite the first direction, can cause the ejection mechanism to eject at least a portion of the second card 165 from the second slot 310, as shown in FIG. 7A. For instance, rotation of the dial 315 in a second direction can cause about 1-5%, 5-15%, 15-30%, 30-50, or 50-75% of the second card 165 to be ejected from the second slot 310, which can permit the user to easily grasp and withdraw the card from the second slot.

Figure 8:
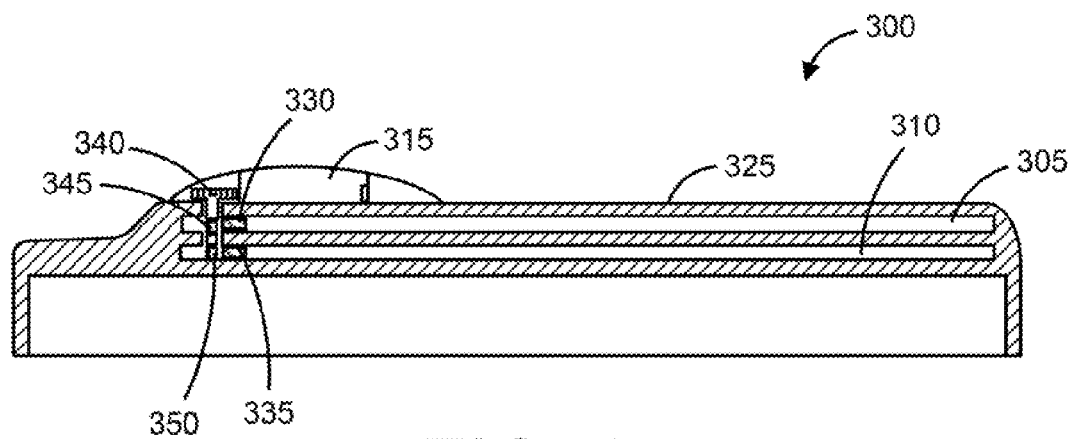
FIG. 8 shows a side cross-sectional view of the protective case of FIG. 6A taken along section A-A and exposing a first slot and a second slot within the protective case, where the first and second slots are each configured to receive and store a card.
Figure 9:
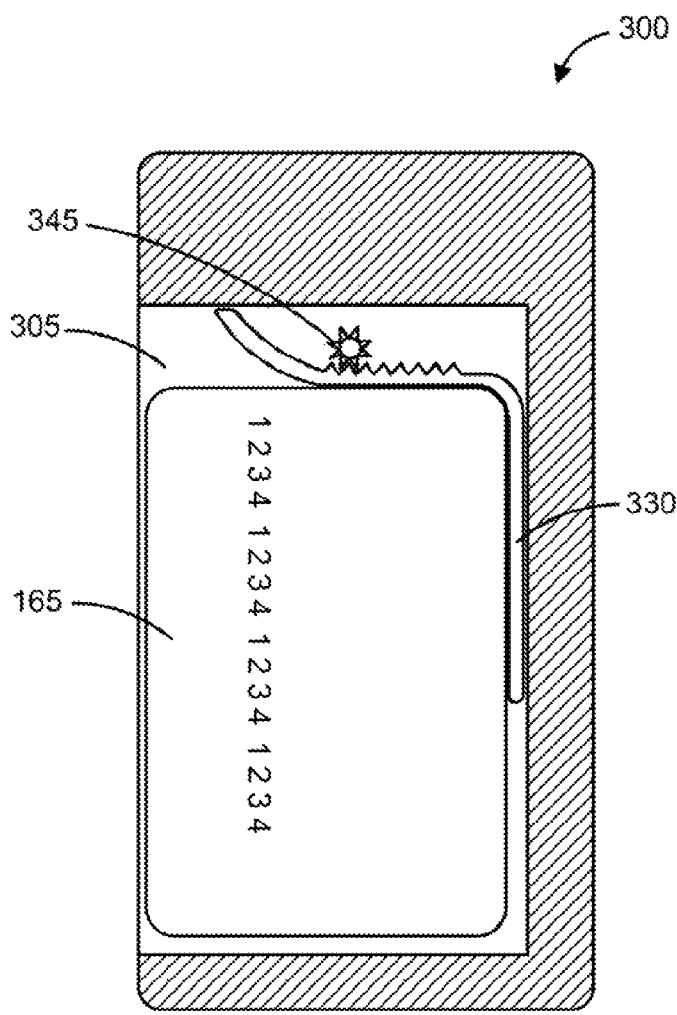
FIG. 9 shows a rear cross-sectional view of the protective case of FIG. 6A exposing a portion of a rack and pinion style ejection mechanism and a credit card positioned within the first slot, where the section is taken along a plane that is parallel to and offset from a rear planar surface of the protective case and perpendicular to both the top and bottom planar surfaces of the protective case.

FIG. 8 shows a side cross-sectional view of the protective case 300 of FIG. 6A taken along section A-A. FIG. 9 shows a rear cross-sectional view of the protective case 300 of FIG. 6A. The first and second slots (305, 310) can be arranged in a stacked configuration. In one example, the first slot 305 can be positioned between the back side surface 325 and the second slot 310, as shown in FIG. 8. In another example, the second slot 310 can be positioned between the back side surface 325 and the first slot 305. To maintain a thin protective case, the first and second slots (305, 310) can be separated by a thin divider.

Figure 10:
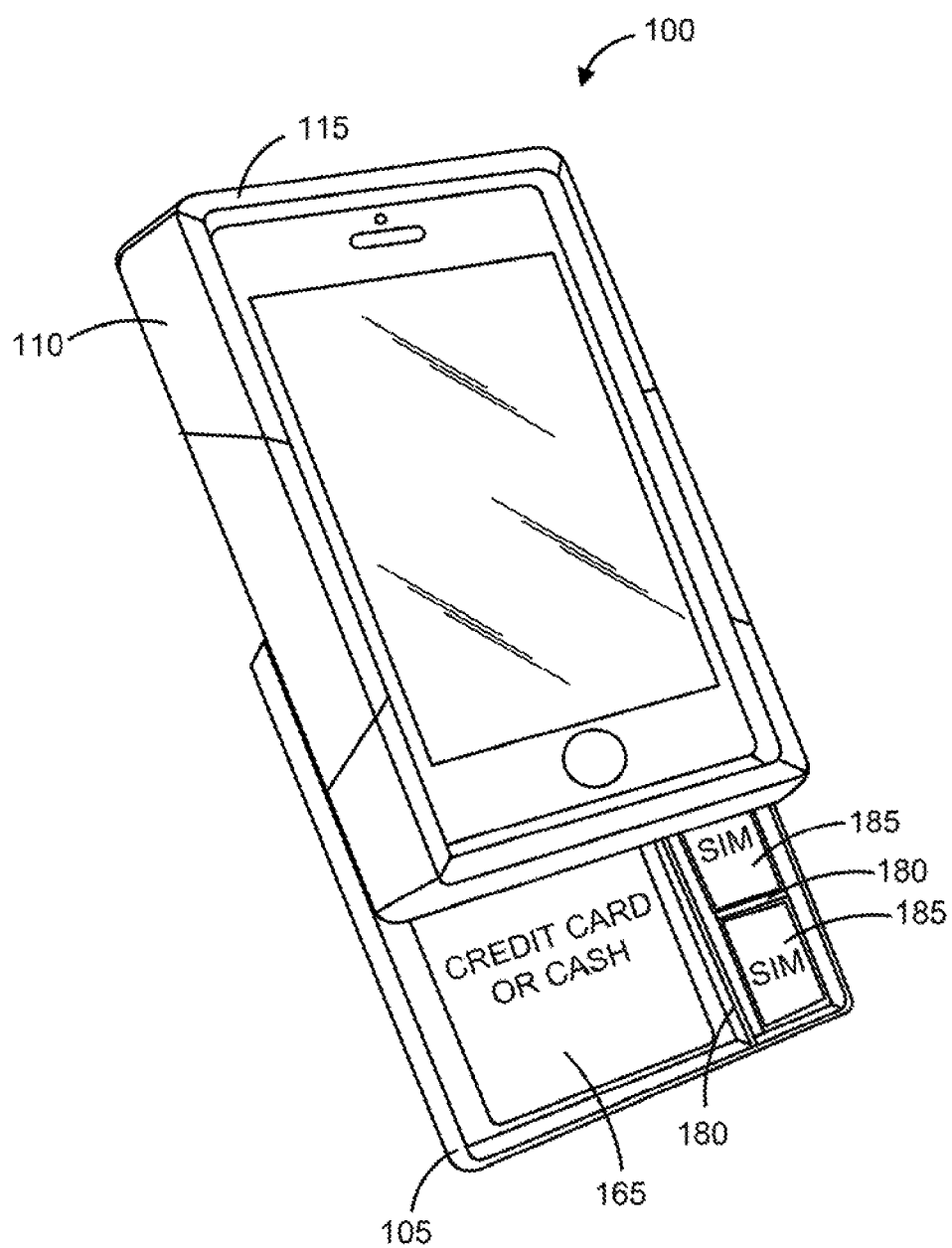
FIG. 10 shows a front perspective view of a protective case with a compartment door in a partially open position revealing dedicated locations for storing credit cards, cash, and subscriber identity module ("SIM") cards within the compartment.

The ejection mechanism can include any suitable mechanical components to convert rotational motion from the dial 315 into translational motion required to eject the card from the slot (e.g. 305, 310). In one example, shown in FIGS. 8 and 9, the ejection mechanism can include a rack and pinion system configured to convert rotational motion from the dial 315 into translational motion required to eject the card 165 from the slot (e.g. 305, 310). The dial 315 can include a first gear configured to engage a second gear 340, as shown in FIG. 8. The second gear 340 can be attached to a shaft that extends downward from the second gear and through the first and second slots (305, 310). The shaft can include a first pinion 345 configured to engage a first rack 330 disposed in the first slot 305, as shown in FIG. 9. The shaft can also include a second pinion 350 configured to engage a second rack 335 disposed in the second slot 310, as shown in FIG. 10. The first rack 330 can include a finger portion that engages a side edge of the card 165. In the example shown in FIG. 9, rotation of the first pinion 345 in a clockwise direction will cause the first rack 330 to travel leftward, causing the finger portion to apply a force against the side of the card 165, thereby causing at least a portion of the card to eject from the first slot 305.

The ejection mechanism can include a clutch or other suitable mechanism to prevent the first card from being ejected when the user rotates the dial 315 to eject the second card. For instance, the ejection mechanism can include a first clutch located between the shaft and the first pinion 345. The first clutch can disengage when the shaft is rotated in a first direction, resulting in the first pinion 345 remaining stationary and the first card 165 remaining in the first slot 305. Likewise, the ejection mechanism can include a clutch or other suitable mechanism to prevent the second card from being ejected when the user rotates the dial 315 to eject the first card. For instance, the ejection mechanism can include a second clutch located between the shaft and the second pinion 350. The second clutch can disengage when the shaft is rotated in a second direction, resulting in the second pinion 350 remaining stationary and the second card remaining in the second slot 310.

To prevent the cards from inadvertently exiting the slots (305, 310) during everyday use, each slot can be sized to provide a slight interference fit between the card and interior surfaces of the slot. In one example, the interior surface of the slot can be covered with a soft material or fabric, which can deflect as the card is inserted into the slot. During the ejection process, the ejection mechanism can apply sufficient force to the card to overcome resistance created by the interference fit.

Although a rack and pinion system is shown and described in detail, this does not limit the ejection mechanism. In another example, the ejection mechanism can include a pulley and sprocket system. In yet another example, the ejection mechanism can include a screw system that converts rotational motion to translational motion.

Figure 7B:
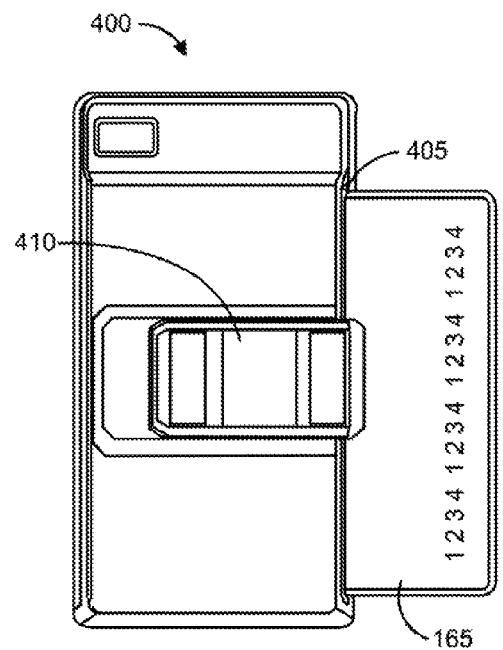

As shown in FIG. 7B, the protective case 400 can include an ejection mechanism that employs a slider. The slider 410 can include a catch configured to engage a side edge of the card 165 and push the card out of the slot 405 when the slider is actuated. Although only one slot 405 is shown, the protective case 400 can include a second slot configured to receive a second card.

Figure 7C:
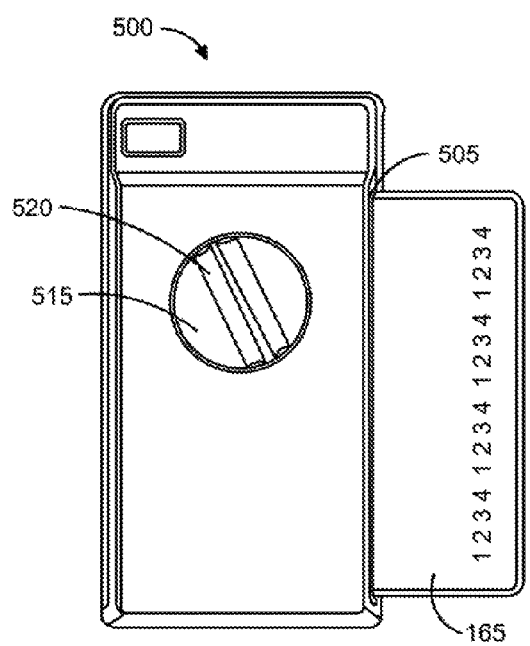

As shown in FIG. 7C, the protective case 500 can include a slot 505 configured to receive a card 165. The ejection mechanism can include a dial 515 with a raised portion 520. The raised portion 520 can make the dial easier to grasp and rotate, which can be desirable for certain users, such as those suffering from arthritis in their fingers. Although only one slot 505 is shown, the protective case 500 can include a second slot configured to receive a second card.

In one example, a protective case for a personal electronic device can include a sliding drawer configured to receive a card, where the sliding drawer is slidably attached to a back side surface of the protective case, where the card is accessible when the sliding drawer is in an opened position, and where the card is completely concealed when the sliding drawer is in a closed position. The protective case can include a retention spring extending from a back side surface of the protective case. The retention spring can be configured to provide a spring force against an inner surface of the sliding drawer to resist opening of the sliding drawer when the sliding drawer is in a closed position. The retention spring can be configured to press the card against the inner surface of the sliding drawer and prevent the card from rattling within the sliding drawer when the sliding drawer is in a closed position. The sliding drawer can include one or more detents configured to secure the sliding drawer in a closed position. The protective case can include a structural layer comprising a cavity, and a flexible cushion layer configured to cover at least a back surface of the personal electronic device and fit within the cavity of the structural layer.

In one configuration, the sliding drawer can include a first rail disposed along a first edge and a second rail disposed along a second edge, where the first edge of the sliding drawer is opposite the second edge of the sliding drawer, where the protective case includes a first rail receiver located proximate a first edge of the back side surface and a second rail receiver located proximate a second edge of the back side surface, where the first rail receiver is configured to receive the first rail on the sliding drawer, and where the second rail receiver is configured to receive the second rail on the sliding drawer.

In another configuration, the sliding drawer can include a first rail receiver disposed along a first edge and a second rail receiver disposed along a second edge, where the first edge of the sliding drawer is opposite the second edge of the sliding drawer, where the protective case includes a first rail located proximate a first edge of the back side surface and a second rail located proximate a second edge of the back side surface, where the first rail is configured to engage the first rail receiver, and where the second rail is configured to engage the second rail on the sliding drawer when the sliding drawer is attached to the protective case.

The sliding drawer can include an inner surface having a rectangular cavity configured to receive a card, where the rectangular cavity has a length of about 3.38-3.48 inches and a width of about 2.13-2.23 inches. The card can be a payment card or a driver's license.

A protective case for a personal electronic device can include a compartment door located proximate a back side surface of the protective case, a hinge attaching the compartment door to the back side surface of the protective case, and a compartment defined by a volume located between the compartment door and the back side surface of the protective case, where the compartment is configured to receive a card, where the card is accessible when the compartment door is in an opened position, and where the card is completely concealed when the compartment door is in a closed position. The hinge can be a living hinge and can be made of a thermoplastic elastomer. The protective case can include a card clip extending from the back side surface of the protective case and configured to provide a compressive force against the card when the card is inserted between the back side surface of the protective case and an inner surface of the card clip. The card clip can be spring loaded.

A protective case for a personal electronic device can include a first slot configured to receive a first card, and an ejection mechanism connected to a dial, where rotation of the dial in a first direction causes the ejection mechanism to eject at least a portion of the first card from the first slot. The protective case can also include a second slot configured to receive a second card, where rotation of the dial in a second direction opposite the first direction causes the ejection mechanism to eject at least a portion of the second card from the second slot. The first card can be a payment card, and the second card can be a driver's license.

A subscriber identity module (SIM) is an integrated circuit that securely stores the international mobile subscriber identity (IMSI) and related key used to identify and authenticate a subscriber on a mobile telephony telephonic device, such as mobile phone or computer. A SIM integrated circuit can be embedded into a removable plastic card called a "SIM card," which can be transferred between different mobile devices. Each SIM card can contain one or more of the following features: a unique integrated circuit card identifier (ICCID), international mobile subscriber identity (IMSI), security authentication and ciphering information, temporary information related to a local network, a list of services a user has access to, a password for a personal identification number (PIN) for ordinary use, and a personal unblocking code (PUC) also known as PIN unlock key (PUK) for PIN unlocking. SIM cards are available in several sizes, including full-size and mini, micro, and nano sizes.

When traveling from a first country to a second country, a user may need to remove a first SIM card from the electronic device and replace it with a second SIM card to permit the user to access a network in the second country. The second SIM card can also permit the user to have a local telephone number in the second country, which may be desirable for certain business reasons and for reducing call costs (e.g. by avoiding roaming costs). When the user removes the first SIM card, the user must find a safe place to store the first SIM card. Due to their small size, it is relatively easy to misplace or lose a SIM card, and due to their fragile nature, it is relatively easy to damage a SIM card if not stored carefully. To avoid this type of loss or damage, it can be desirable to have a convenient place to store a SIM card immediately after it is removed from the electronic device. In certain instances, a protective case for an electronic device can be adapted to store and protect one or more SIM cards.

FIG. 10 shows a front perspective view of a protective case 100 for an electronic device such as, for example, a smartphone or computer. The protective case 100 can include a sliding drawer 105, which is shown in an opened position revealing locations for a credit card, driver's license, cash, and one or more SIM cards 185. The sliding drawer 105 can include one or more partitions 180 that subdivide the inner surface 175 of the sliding drawer 105 to accommodate one or more of the items mentioned above. In one example, the sliding drawer 105 can include partitions 180 arranged to provide snap in locations for one or more SIM cards 185. Alternately, the inner surface 175 of the sliding drawer 105 can include any suitable feature or mechanism to retain each SIM card 185 and prevent each SIM card from moving around within the compartment or potentially falling out of the compartment when the sliding drawer 105 is opened.

Figure 11:
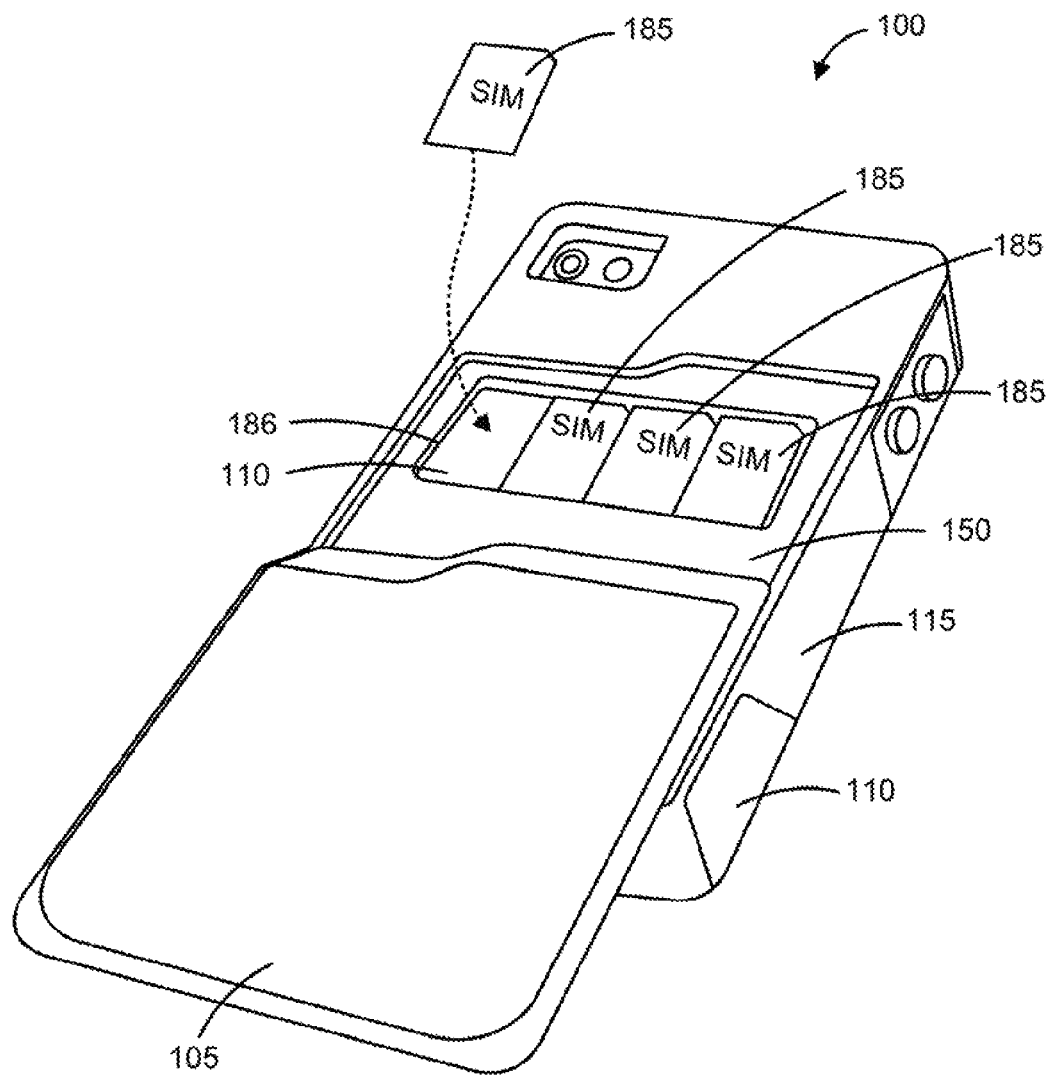
FIG. 11 shows a rear perspective view of a protective case with a compartment door in an open position revealing four pass through locations adapted to receive one or more SIM cards against a flexible cushion layer.

FIG. 11 shows a rear perspective view of a protective case 100 for an electronic device such as, for example, a smartphone or computer. The protective case 100 can include sliding drawer 105, which is shown in an opened position revealing one or more SIM cards 185 disposed within an opening 186 in a back side surface 150 of the protective case 100. The opening 186 can be adapted to receive one or more SIM cards 185. As shown in FIG. 11, the opening (or pocket) 186 can pass through a structural layer 115 of the protective case 100 and thereby allow one or more SIM cards to rest against the flexible cushion layer 110, which may help to protect the SIM cards from drop-induced damage. This configuration may also provide more room inside the sliding drawer for storing items such as credit cards, cash, or keys.

Figure 12A:
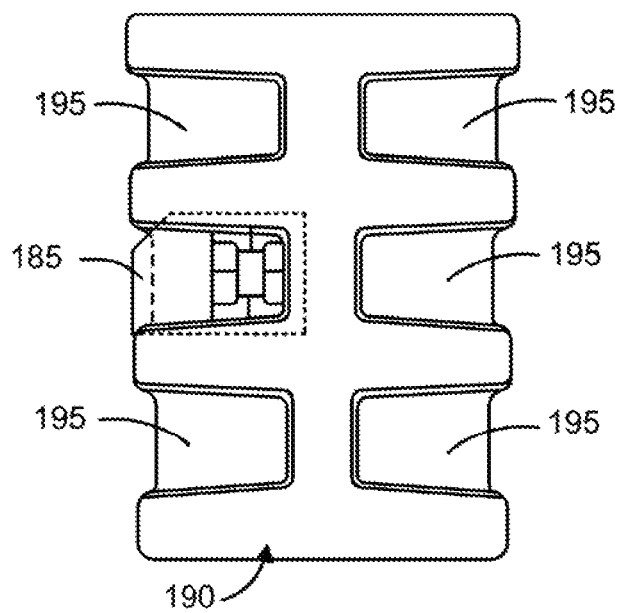
FIG. 12A shows an enlarged front view of a SIM card storage unit and FIG. 12B shows a front perspective view of a protective case with a compartment door in an open position revealing a removable SIM card storage unit positioned within a compartment in the protective case.
Figure 12B:
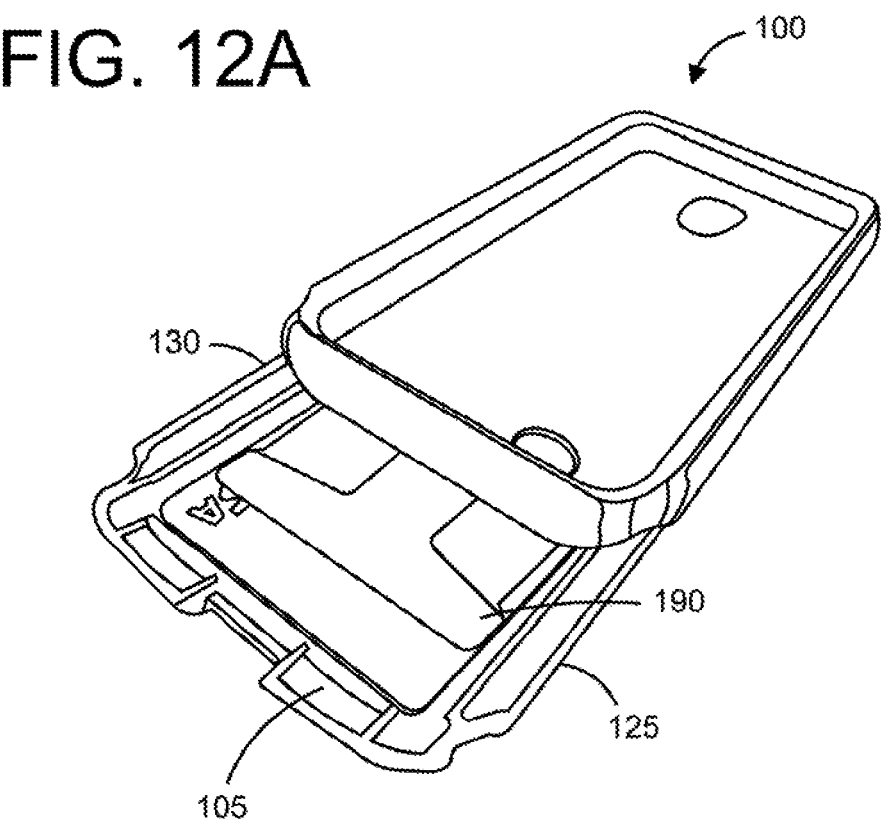

FIG. 12A shows a front view of a SIM card storage tray 190. FIG. 12B shows a front perspective view of a protective case 100 with a compartment in an opened position revealing the removable SIM card storage tray 190. The SIM card storage tray 190 can include one or more storage slots 195 adapted to receive one or more SIM cards 185. In one instance, a SIM card 185 can slide into a storage slot 195 and be held in place by a friction fit. The SIM card storage unit 190 can be adapted to fit within a compartment in the protective case 100. For instance, the SIM card storage tray 190 can have a length and width that are similar to a credit card 165, but the SIM card storage tray 190 may be thicker than a credit card 165 to accommodate and protect the one or more SIM cards 185.

The SIM card storage tray 190 can be removable from the protective case 100. A user may choose to keep the SIM card storage unit 190 in the sliding drawer 105 when traveling internationally to provide quick access to the one or more SIM cards stored therein, but the user may choose to remove the SIM card storage unit 190 from the sliding drawer when not traveling and not frequently changing SIM cards. The removable SIM storage tray 190 can protect the one or more SIM cards from damage and can be stored, for example, in a suitcase or dresser drawer when not stored in the protective case 100. Removing the storage unit 190 from the compartment can free up space for cards, cash, or personal items. Consequently, having a removable SIM card storage tray 190 can increase the functionality of the protective case 100 by allowing the carrying capacity of the protective case to be modified depending on whether or not frequent changing of SIM cards is anticipated.

In one example, a protective case 100 for a personal electronic device can include a sliding drawer adapted to receive a SIM card storage tray 190, as shown in FIGS. 12A-12B. The SIM card storage tray 190 can include one or more storage slots 195 each adapted to receive a SIM card. The sliding drawer 105 can be slidably attached to a back side surface of the protective case 100. The SIM card storage tray 190 can be accessible when the sliding drawer 105 is in an open position, and the SIM card storage tray can be concealed when the sliding drawer is in a closed position.

Figure 13:
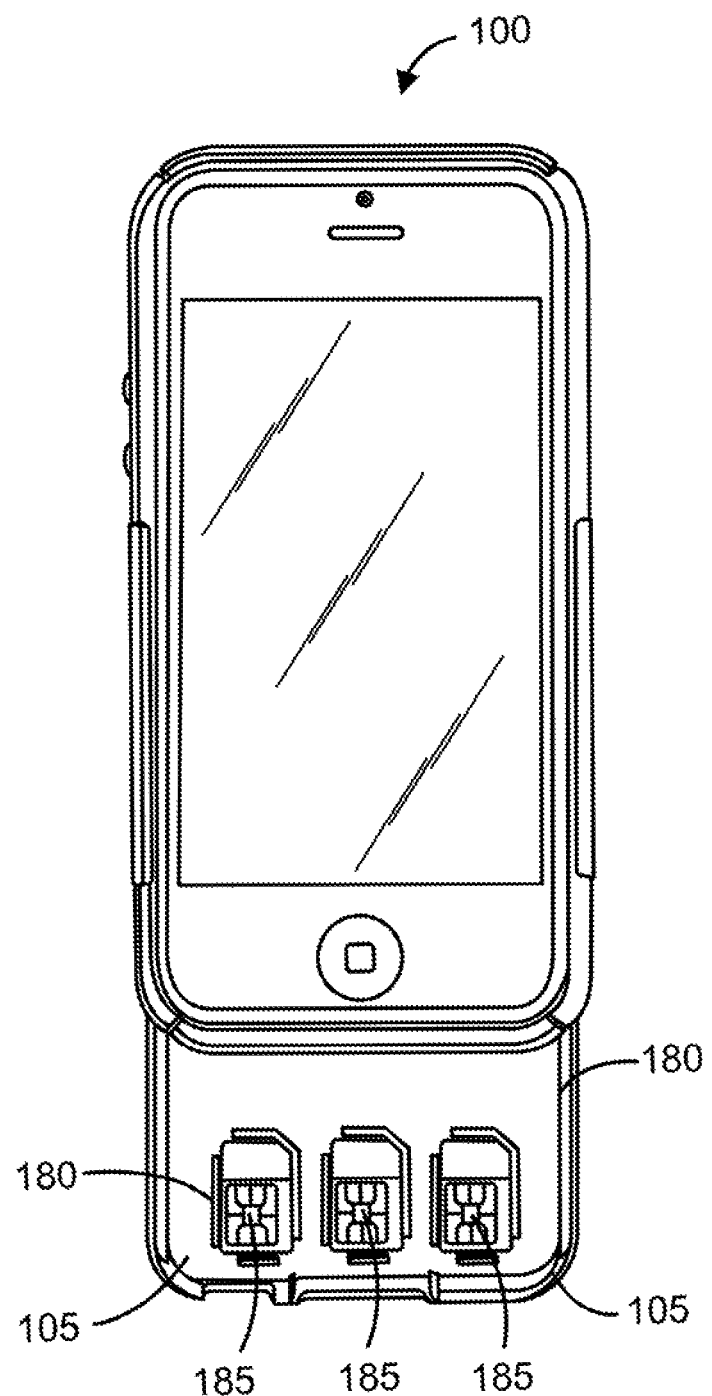
FIG. 13 shows a protective case having a compartment door in an open position exposing three SIM cards arranged side by side within a compartment.

FIG. 13 shows a protective case 100 with a sliding drawer 105. The sliding drawer 105 is shown in an opened position revealing three SIM cards 185 separated by partitions 180. The partitions 180 can allow the SIM cards to be snapped into place for storage and protection. The partitions 180 can provide a friction fit that suitably retains each SIM card in place, but also permits each SIM card to be removed relatively easily with a finger or a removal tool. For instance, at least one corner of each SIM card may be exposed, as shown in FIG. 13, thereby permitting a user to free each SIM card using a finger.

FIGS. 14A-C show several views of a protective case 100 that is adapted to store one or more SIM cards 185. The SIM cards 185 can be stored within the protective case 100 behind the electronic device. The inside surface of the protective case 100 can include one or more openings each adapted to receive a SIM card 185. As shown in FIG. 13, the protective case 100 can include three openings each adapted to receive a SIM card 185. The openings can be formed in the flexible cushion layer 110. Each opening can be slightly smaller than the outer dimensions of the SIM card, thereby permitting the SIM card to be pressed into the opening and be retained by friction.

Figure 15B:
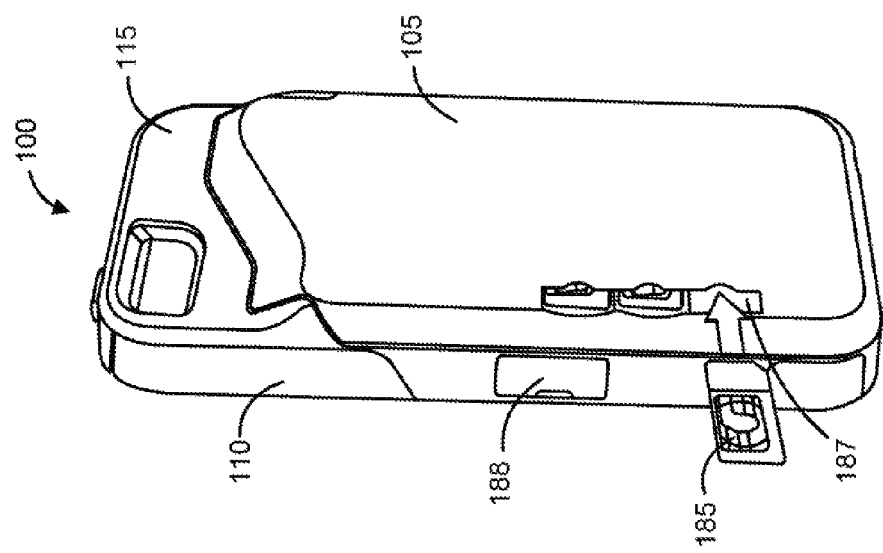
FIG. 15B shows a rear perspective view of the protective case of FIG. 15A.
Figure 15A:
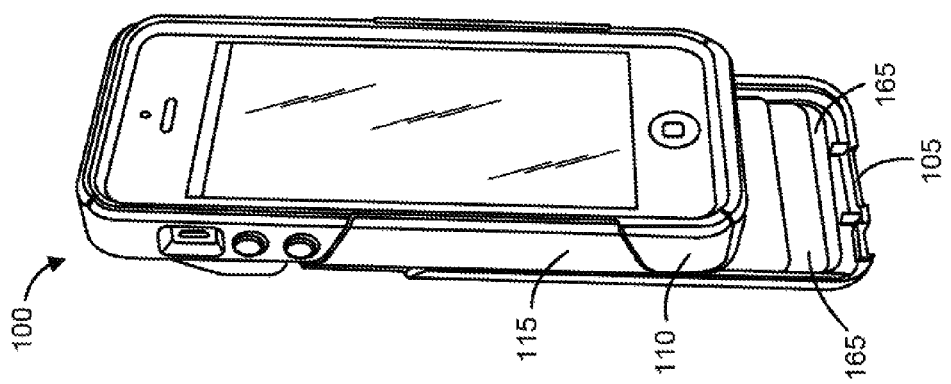
FIG. 15A shows a front perspective view of a protective case with a compartment, where the case includes dedicated storage slots for SIM cards in a rear portion of the case.

FIG. 15A shows a front perspective view of a protective case 100 for an electronic device. The protective case 100 is adapted to receive and store one or more SIM cards 185. Specifically, the protective case 100 can include one or more storage slots 187 that are adapted to each receive a SIM card 185. The one or more storage slots 187 can be formed in the structural layer 115 of the protective case 100. In one example, each storage slot 187 can provide a friction fit that is suitable to retain each SIM card. In another example, each storage slot 187 can include a spring-loaded mechanism, which can be any of the various types of spring-loaded mechanisms commonly used in flash and SD card slots in digital cameras and portable computers.

Removing the electronic device from the protective case 100 exposes the device to potential damage from, for example, drops. Therefore, it can be desirable to change the SIM card 185 in the electronic device without removing the electronic device from the protective case 100. To accomplish this, the protective case 100 can provide access to the SIM card slot in the electronic device. For example, as shown in FIG. 15B, the protective case 100 can include an access flap 188 that allows a user to exchange the SIM card without removing the protective case. The access flap 188 can be formed in the flexible cushion layer 110 of the protective case 100 and can be attached to the flexible cushion layer by, for example, a living hinge.

Figure 16:
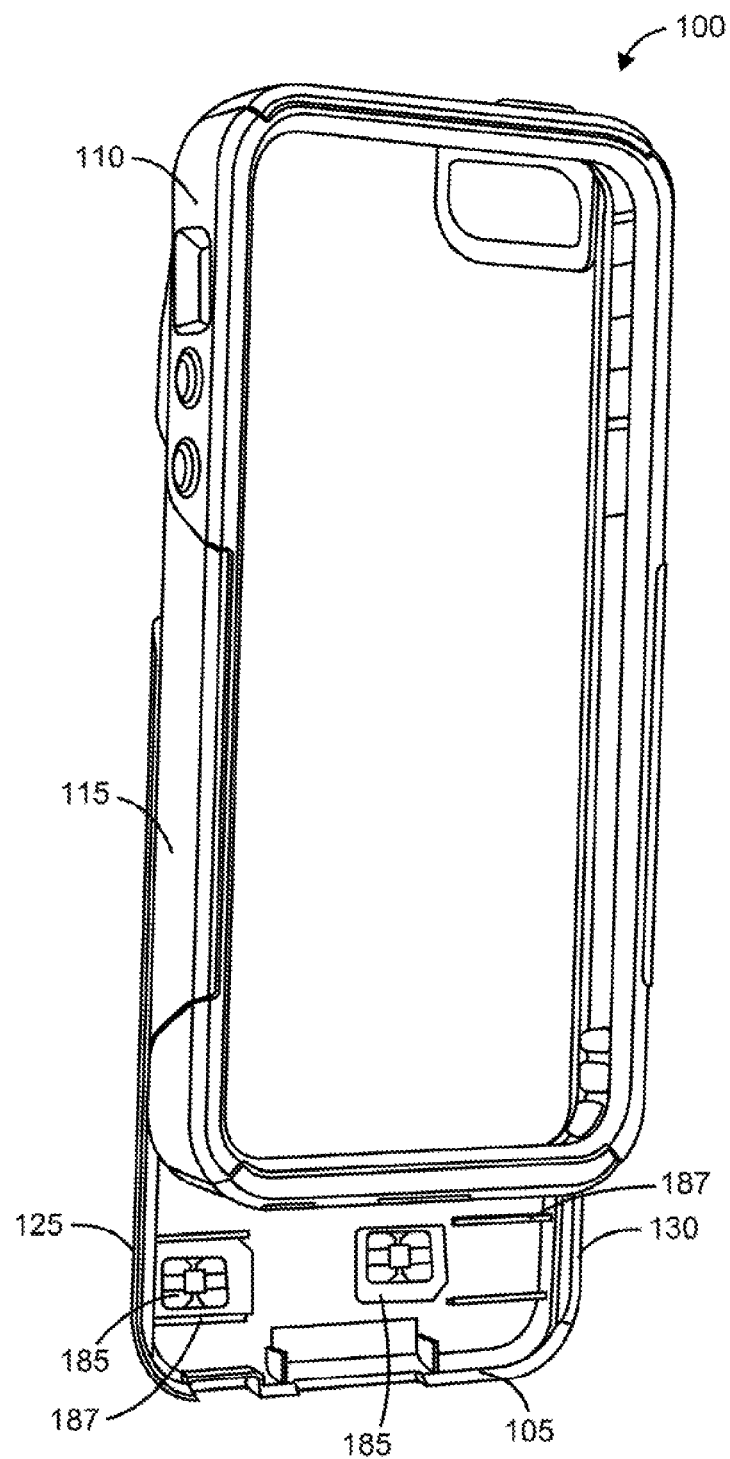
FIG. 16 shows a front perspective view of a protective case with a compartment, where the case includes storage slots for one or more SIM cards in the sliding drawer.

As shown in FIG. 16, the protective case 100 can include a sliding drawer or door 105 that is adapted to receive one or more SIM cards 185. The sliding drawer 105 can include one or more storage slots 187 each adapted to receive a SIM card 185. Each SIM card 185 can slide into a corresponding storage slot 187 located on the inner surface 175 of the sliding drawer 105. When a SIM card 185 is installed in the storage slot 187, a slight interference fit may be provided between opposing storage slot rails and the SIM card to ensure the SIM card does not unwantedly exit the storage slot and bounce around within the compartment where it might suffer damage under certain conditions. The rails of the storage slot can be formed by suitable manufacturing process, such as an injection molding process.

Figure 18:
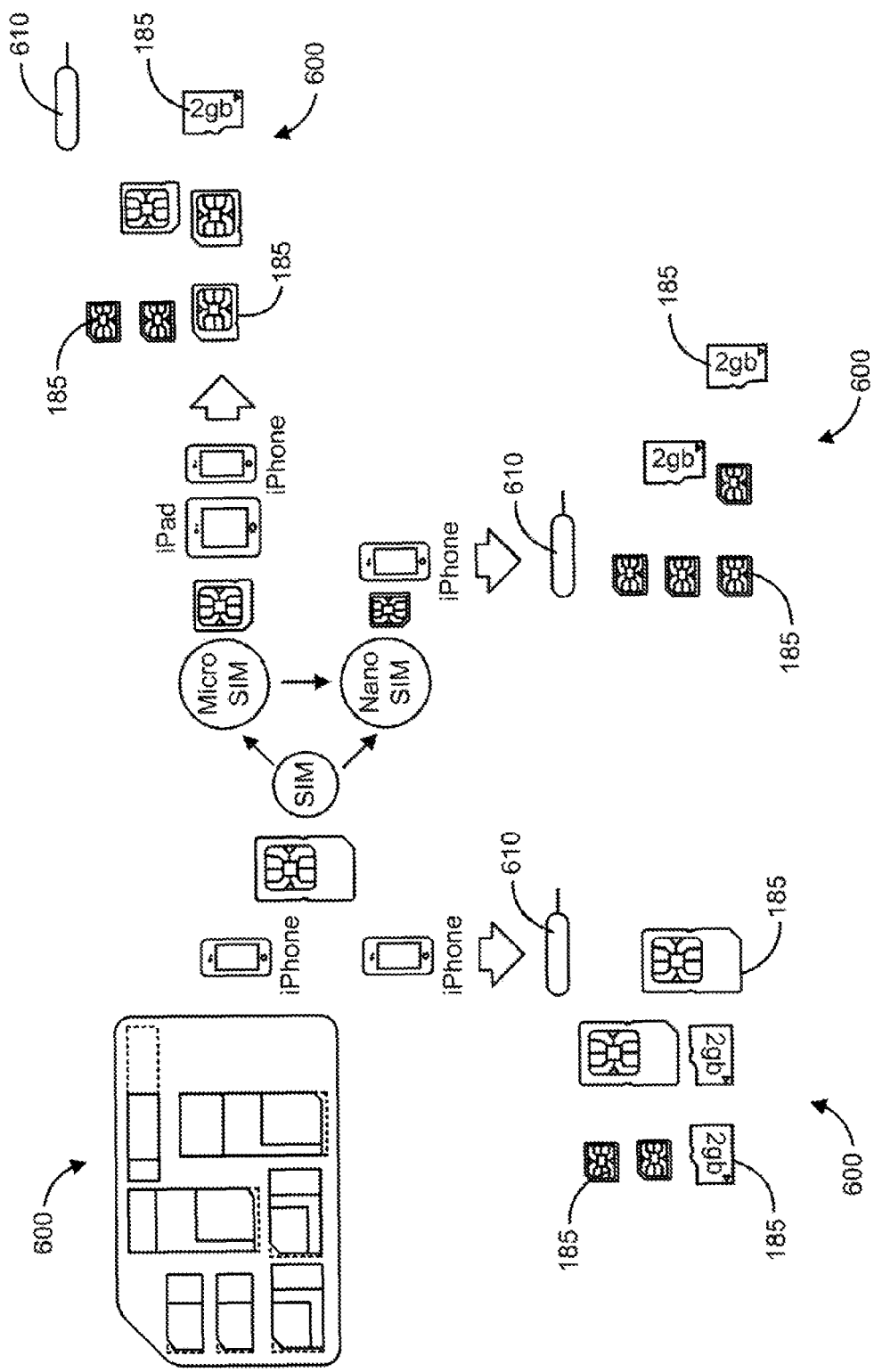
FIG. 18 shows a storage tray that is adapted to receive one or more of a SIM card, micro SIM card, nano SIM card, and micro SD card.
Figure 19:
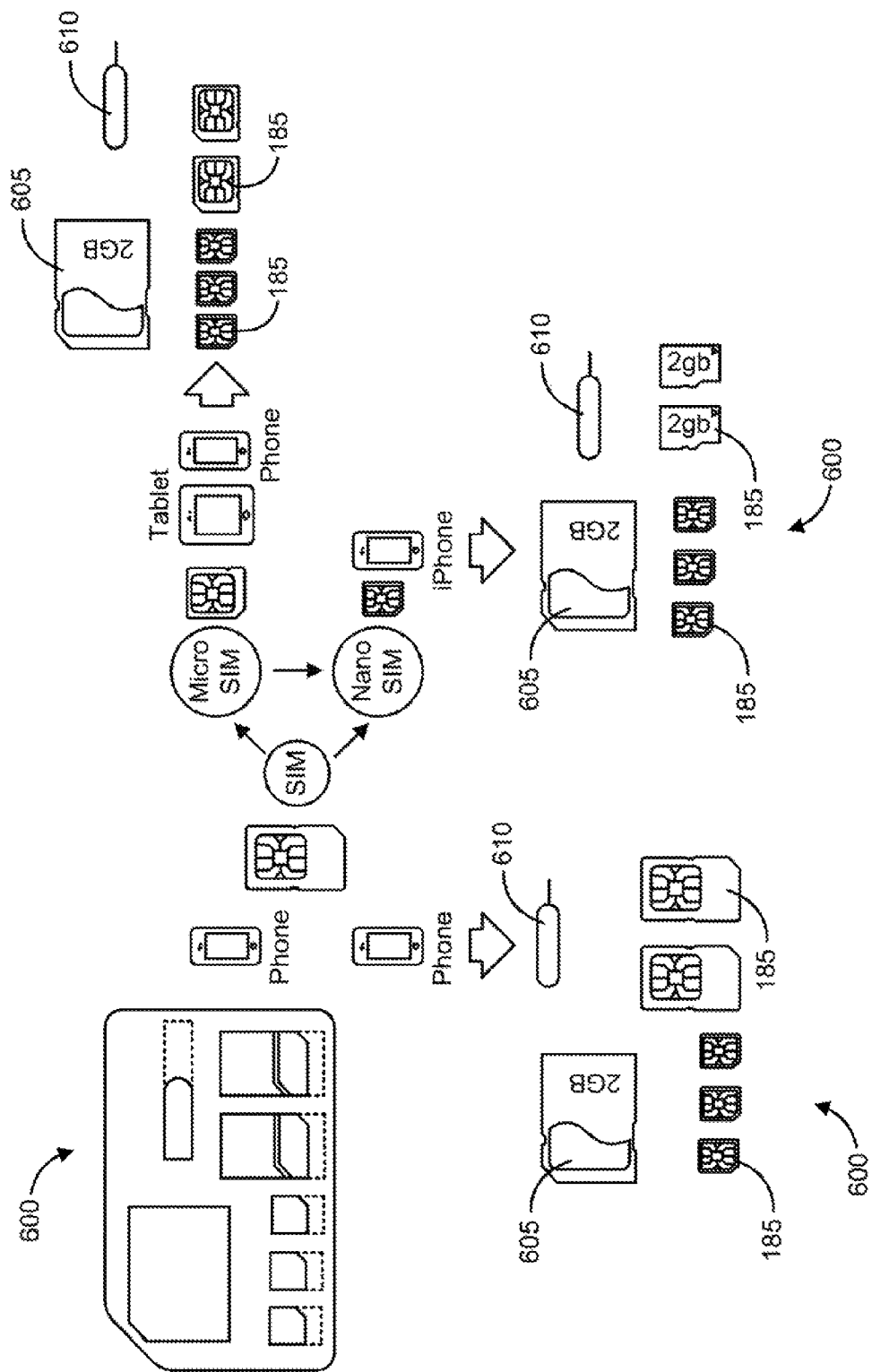
FIG. 19 shows a storage tray that is adapted to receive one or more of a SIM card, micro SIM card, nano SIM card, SD card, and micro SD card.
Figure 20:
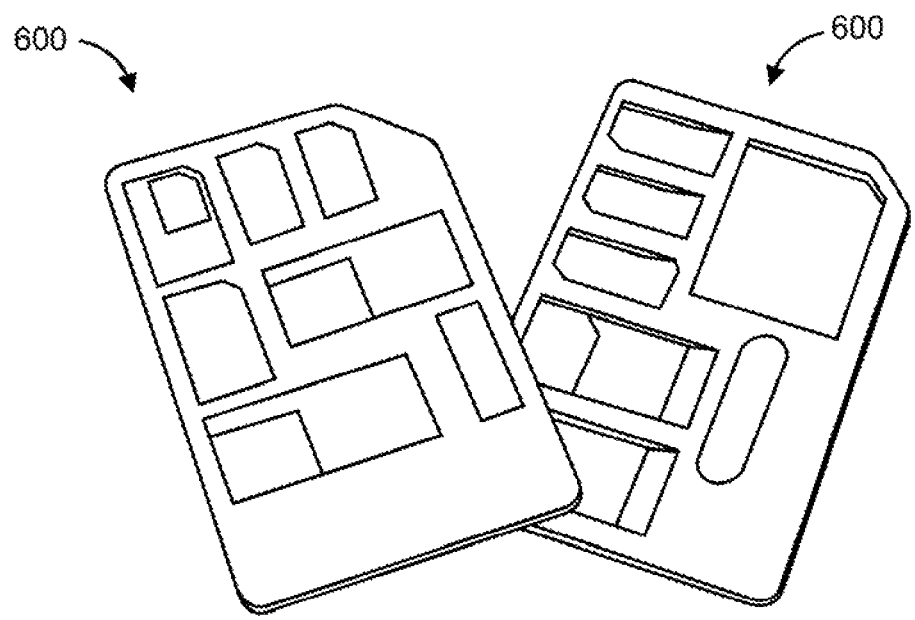
FIG. 20 shows a front perspective view of a storage tray that is adapted to receive one or more of a SIM card, micro SIM card, nano SIM card, SD card, and micro SD card.
Figure 21:
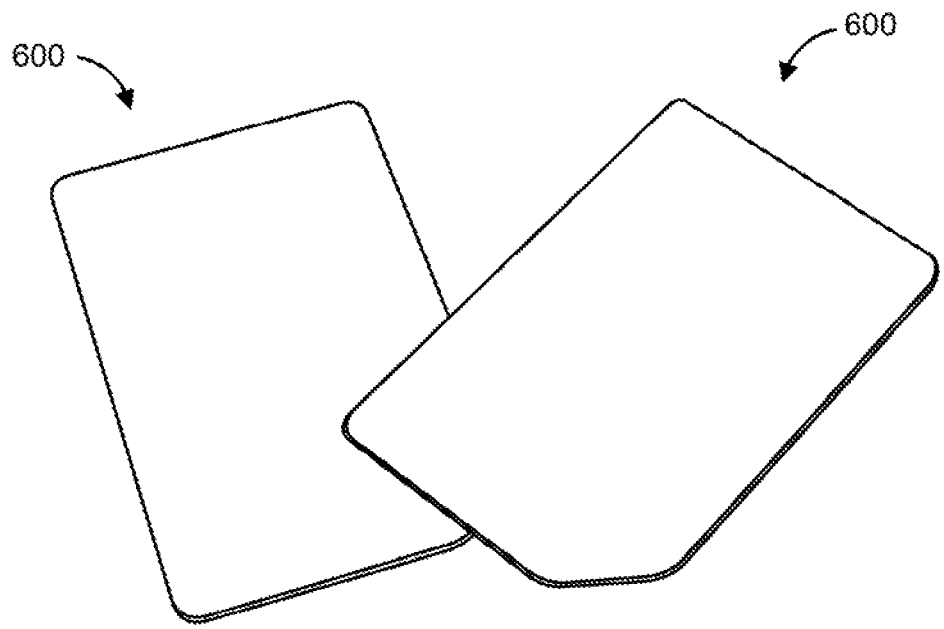
FIG. 21 shows a rear perspective view of a storage tray that is adapted to receive one or more of a SIM card, micro SIM card, nano SIM card, SD card, and micro SD card.

A storage card 600 is shown in FIGS. 17C and 17D. The storage card 600 can be adapted to receive and store a variety of items, such as a SIM card 185, a removable memory card 605 (e.g. secure digital memory card), or a SIM eject tool 610 (e.g. paper clip). The storage card 600 can have a similar length and width as a credit card and can fit within a storage compartment of a protective case 100. FIGS. 18 and 19 show a variety of configurations of SIM cards 185, removable memory cards 605, and SIM eject tools 610 attached to various storage cards 600. FIG. 20 shows a front perspective view of two storage cards 600, and FIG. 21 shows a rear perspective view of two storage cards. The front surface of the storage cards 600 may include one or more pockets adapted to receive one or more types of SIM cards, removable memory cards, or tools (e.g. SIM eject tools).

Figure 22B:
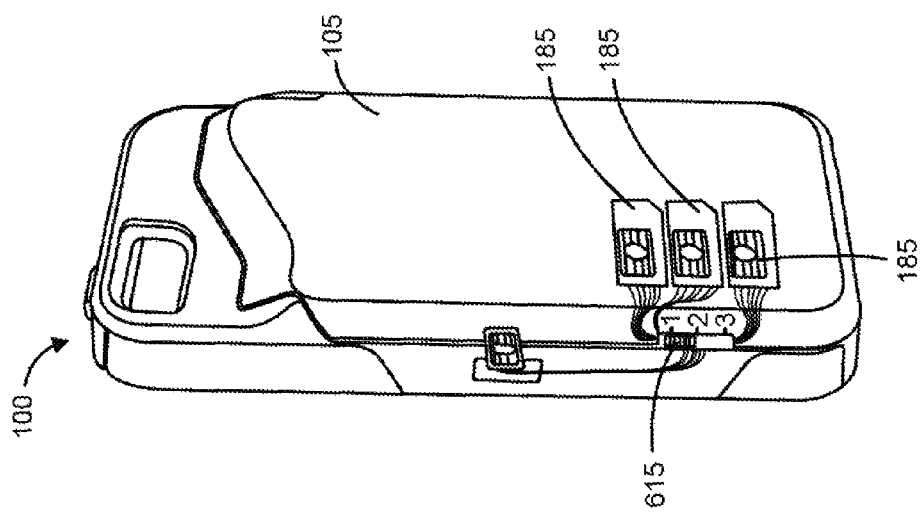
FIG. 22B shows internal components of the protective case of FIG. 22A.
Figure 22A:
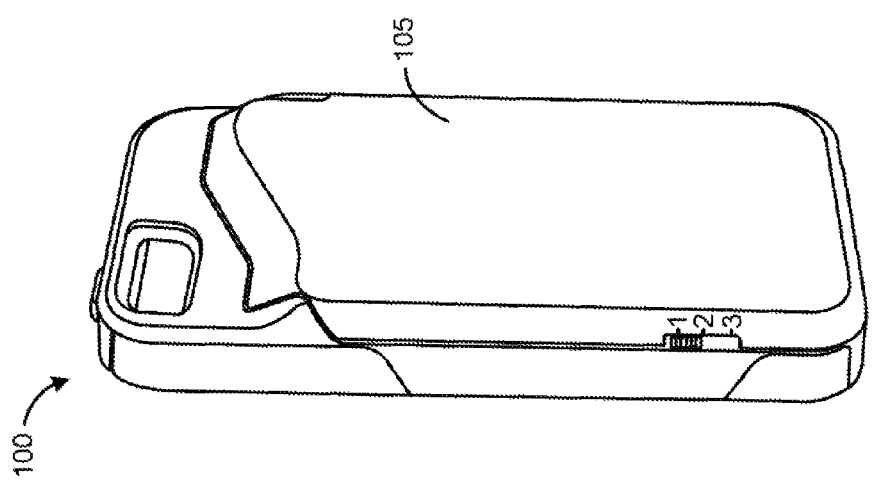
FIG. 22A shows a rear perspective view of a protective case that is adapted to receive and electrically connect one or more SIM cards to a SIM port of an electronic device housed in the protective case.

FIGS. 22A and 22B show a protective case 100 adapted to receive one or more SIM cards 185. To avoid the step of physically exchanging SIM cards, the protective case 100 can include one or more SIM cards 185 that are electrically connected to a SIM port on the electronic device. A user can select from among the one or more SIM cards 185 using a selector switch 615 located on an outer surface of the protective case 100. For instance, when the user is travels from a first country to a second country, the user can use the selector switch to electrically connect a SIM card that is compatible with a network in the second country to the SIM port on the electronic device. This allows the user to easily select a SIM card without needing to remove the electronic device from the case and physically exchange the SIM cards.

In one example, a protective case 100 for a personal electronic device can include one or more storage slots each adapted to receive a unique SIM card 185. The one or more storage slots can each be electrically connected to a selector switch 615 that allows a user to manually select which SIM card should be electrically connected to the electronic device housed within the protective case (see, e.g., FIGS. 22A and 22B). This feature allows a user to travel between countries and, instead of having to manually remove and replace the SIM card during each journey, the user can simply use the selector switch 615 to choose the appropriate SIM card depending on location.

In one example, a protective case 100 for a personal electronic device can include a first slot 305 configured to receive a first card, such as a payment card (e.g. credit, debit, or gift card) or identification card (e.g. student identification card, driver's license, employee badge, medical insurance card, or Social Security card). The protective case 100 can include an ejection mechanism connected to a dial (see, e.g. FIG. 7A), where rotation of the dial in a first direction causes the ejection mechanism to eject at least a portion of the first card from the first slot 305, thereby permitting a user to easily retrieve the first card form the first slot. In some examples, the protective case 100 can also include a second slot 310 configured to receive a second card, where rotation of the dial in a second direction opposite the first direction causes the ejection mechanism to eject at least a portion of the second card from the second slot, thereby allowing a user to easily retrieve the second card from the second slot. In some instances, the dial can include a finger recess to enhance ease of use of use.

A protective case 100 for a personal electronic device can include a sliding drawer 105 comprising an inner surface having a rectangular cavity configured to receive a credit or identification card 165. The rectangular cavity can have a length of about 3.38-3.48 inches and a width of about 2.13-2.23 inches. The sliding drawer 105 can be slidably attached to a back side surface 150 of the protective case 100. The credit or identification card 165 can be accessible when the sliding drawer 105 is in an open position, and the credit or identification card can be concealed when the sliding drawer is in a closed position. The protective case 100 can include a compartment gasket disposed in a gasket channel that extends around the perimeter of the back side surface of the protective case. The compartment gasket is configured to provide a watertight seal against a sealing surface of the sliding drawer 105 when the sliding drawer is in a closed position.

The protective case 100 can include a retention spring 120 extending from a back side surface 150 of the protective case 100. The retention spring 120 can be configured to press the card 165 against an inner surface of the sliding drawer and prevent the card from rattling within the sliding drawer when the sliding drawer is in a closed position. The retention spring can be configured to provide a spring force against an inner surface of the sliding drawer 105 to resist opening of the sliding drawer when the sliding drawer is in a closed position.

In some examples, the protective case 100 can include a mirror that is adhered to or formed on an inner surface of the sliding drawer 105, the mirror being visible when the sliding drawer is in an open position and being concealed when the sliding drawer is in a closed position.

In some examples, the sliding drawer 105 can include a first rail disposed along a first edge and a second rail disposed along a second edge, where the first edge of the sliding drawer is opposite the second edge of the sliding drawer. The protective case 100 can include a first rail receiver located proximate a first edge of the back side surface and a second rail receiver located proximate a second edge of the back side surface. The first rail receiver can be configured to receive the first rail on the sliding drawer, and the second rail receiver is configured to receive the second rail on the sliding drawer to effectively couple the sliding drawer 105 to the back side surface 150 of the protective case 100.

In other examples, the sliding drawer 105 can include a first rail receiver disposed along a first edge and a second rail receiver disposed along a second edge, where the first edge of the sliding drawer is opposite the second edge of the sliding drawer. The protective case 100 can include a first rail located proximate a first edge of the back side surface and a second rail located proximate a second edge of the back side surface. The first rail can be configured to engage the first rail receiver, and the second rail can be configured to engage the second rail on the sliding drawer to effectively couple the sliding drawer 105 to the back side surface 150 of the protective case 100.

In some examples, the compartment can be a liquid-tight compartment that prevents water-sensitive items stored in the compartment from being damaged if the protective case (e.g. 100, 200) is submersed in water or is exposed to precipitation. In some examples, a waterproof compartment can be combined with any of the waterproof protective cases ("housings") that are described in U.S. patent application Ser. No. 14/029,739, filed on Sep. 17, 2013, which is hereby incorporated by reference in its entirety. Specifically, as shown in FIGS. 1A and 1B of U.S. patent application Ser. No. 14/029,739, a housing 1 for an electronic device can include a top member 2 having a perimeter portion forming a proximal end portion, a distal end portion, and opposing side portions. The top member 2 can include a front surface 25a and a back surface 25b spanning from the proximal end portion to the distal end portion and across the opposing side portions of the top member. The housing 1 can also include a bottom member 3 that is configured to couple with the perimeter portion of the top member 2. The bottom member 3 of the housing 1 can include a front surface, a back surface, and a side wall that extends around at least a portion of a perimeter of the bottom member. The side wall of the bottom member 3 can include an inner surface and an outer surface. The perimeter portion of the bottom member 3 can include a channel 10 and a gasket 15, such as a compressible O-ring, positioned at least partially therein, as shown in FIG. 3A of U.S. patent application Ser. No. 14/029,739. The top member can have a flexible overmold and a first clasping mechanism 27 that runs along a portion or the entire perimeter of the top and/or bottom member.

As can be seen with respect to FIG. 3A of U.S. patent application Ser. No. 14/029,739, the front 25 and back 35 surfaces of the top 2 and bottom 3 members of the housing 1 include a perimeter portion 20 and 30, respectively. As depicted, the top member 2 includes a perimeter portion 20. The perimeter portion 20 can include an interior perimeter portion 20a and an exterior perimeter portion 20b. The interior perimeter portion 20a can be made of a rigid material, such as a polycarbonate material or other polymer material, and can be configured for associating with an enclosed device so as to secure the device within the housing 1 and to dampen the transference of shock from the outer side of the housing to the interior of the housing. The exterior perimeter portion 20b can be composed of a flexible material, such as a thermoplastic elastomer (TPE), and can be positioned above and along a side of the interior perimeter portion 20a. The outer perimeter portion 20b may function to reduce the magnitude of a shock force resulting from an impact.

As can be seen with respect to embodiments shown in FIGS. 2D, 3A, and 3D in U.S. patent application Ser. No. 14/029,739, the top member 2 can include a first clasping mechanism 27, and the bottom member 3 can include a second clasping mechanism 37. The first and second clasping mechanisms (27, 37) can extend along the respective perimeters of the top and bottom housings (2, 3). During assembly of the housing 1, the first and second clasping mechanisms 27, 37 can be configured to engage one another in such a manner so as to couple the top 2 and bottom 3 members of the housing 1 together to form a waterproof housing.

The second clasping mechanism 37 of the bottom member 3 can interface with the first clasping mechanism 27 of the top member 2 to maintain the top member and the bottom member coupled together to form a waterproof housing 1. The waterproof housing 1 can also include a waterproof compartment that includes either a compartment door 205 or a sliding drawer 105 as described herein. A compartment gasket (similar to the gasket 15 shown in FIG. 3A of U.S. patent application Ser. No. 14/029,739) can be formed around a perimeter of the sliding drawer 105 or the compartment door 205, and the compartment gasket can be configured to provide a watertight seal against a rear surface of the protective case when the waterproof compartment is closed. Either a dynamic member (e.g. door or drawer) or a stationary member (e.g. protective case body) can contain a compartment gasket. In some examples, the compartment gasket may be positioned in a gasket channel located proximate the perimeter of the sliding drawer 105 or compartment door 205. In other examples, the compartment gasket may be positioned in a gasket channel located on a rear surface of the protective case (e.g. 100, 200). In some examples, the opposed member that does not include a gasket channel may have an impinging member that extends downwards from an interior surface of a perimeter member. The impinging member can be insertable into the gasket channel to compress against the compartment gasket when the top and bottom members are coupled together so as to seal the interface there between. In various embodiments, a gasket channel need not be included. Rather, the top or bottom member may be coated with a sealing member, and the impinging member on the opposed surface of the top or bottom member interacts directly with the sealing member to seal the interface. A clasping mechanism, such as an internal or external clasping mechanism, for instance, a circumferential clasping mechanism, e.g., within the channel, may be included, to secure the top member against the bottom member and thereby further seal the interface between the two.

Many electronic devices include an interactive touch screen made from, in part, sheet toughened glass and an array of touch sensors (e.g. capacitive or inductive touch sensors). Many users prefer the feel of making direct contact with their finger to the touch screen surface as opposed to making direct contact with a transparent polymer sheet that covers the touch screen surface. To eliminate the need for a polymer screen cover disposed over the device's touch screen to achieve a waterproof case, the protective case (e.g. 100, 200) can instead include a top member gasket 15a that is configured to seal against a perimeter of a front surface of the electronic device, as shown and described in U.S. patent application Ser. No. 13/517,583, filed Jun. 13, 2012, which is hereby incorporated by reference in its entirety. The top member gasket 15a can be positioned within a top member channel 10a and can function such that as the top member 2 is installed on an electronic device, the top member gasket 15a contacts a surface of an electronic device, such as a top surface of the touch screen, and is thereby compressed against the surface of the electronic device forming a seal therewith. The seal is further secured by the top member 2 being coupled to the bottom member 3 so as to form the housing 1. The seal generated by the coupling of the top member 2 with the electronic device and/or the further coupling of the top member 2 with the bottom member 3 is a secure, substantially waterproof and/or water resistant and/or substantially shockproof and/or substantially shock resistant seal between the member 2 and the top surface of the electronic device, such as a top surface of a touch-sensitive display.

Any of the waterproof protective cases (housings) described in U.S. patent application Ser. No. 13/517,583 can be combined with a waterproof compartment as described herein to provide a fully waterproof protective case (e.g. 100, 200) that includes a waterproof storage compartment, and permits direct interaction with the electronic device's touch screen. The waterproof compartment can include either a compartment door 205 as shown in FIGS. 3-5, or a sliding drawer 105, as shown in FIGS. 1 and 2. A compartment gasket (similar to the gasket 15 shown in FIG. 3A of U.S. patent application Ser. No. 14/029,739 or similar to the gasket 15a shown in FIGS. 4C-4J of U.S. patent application Ser. No. 13/517,583) can be formed around a perimeter of the sliding drawer 105 or the compartment door 205 or around a perimeter of the back surface of the bottom member 3.

The compartment gasket can be configured to provide a watertight seal between the sliding drawer 105 (or compartment door 205 in other examples) and the rear surface of the housing 1 when the waterproof compartment is in a closed position. Either a dynamic member (e.g. door or drawer) or the stationary member (e.g. protective case body) can contain a compartment gasket. In some examples, the compartment gasket may be positioned in a gasket channel located proximate the perimeter of the sliding drawer 105 or compartment door 205. In other examples, the compartment gasket may be positioned in a gasket channel located on a back surface of the bottom member 3 of the housing (e.g. 100, 200). In some examples, the opposed member that does not include a gasket channel may have an impinging member that extends downwards from an interior surface of a perimeter member.

The impinging member can be insertable into the gasket channel to compress against the compartment gasket when the top and bottom members are coupled together so as to seal the interface there between. In some embodiments, a gasket channel need not be included. Rather, the top or bottom member (2, 3 in Ser. No. 13/517,583 or Ser. No. 14/029,739) may include a sealing member (e.g. an overmolded gasket or a form-in-place gasket), and the impinging member on the opposed surface of the top or bottom member can interact directly with the sealing member to seal the interface. A clasping mechanism, such as an internal or external clasping mechanism (e.g. a circumferential clasping mechanism) may be included, to secure the top member against the bottom member and thereby further seal an interface between the two members to form a liquid-tight housing.

In examples shown in U.S. patent application Ser. No. 14/029,739, a waterproof housing 1 for a personal electronic device can include a top member 2 having a perimeter portion forming a proximal end portion, a distal end portion, and opposing side portions. The top member 2 can include a first clasping mechanism 27 extending around at least a portion of the perimeter portion of the top member. The housing 1 can include a bottom member 3 having a perimeter portion forming a proximal end portion, a distal end portion, and opposing side portions. The bottom member 3 can have a front surface and a back surface spanning from the proximal end portion to the distal end portion and spanning across the opposing side portions of the bottom member. The bottom member 3 can include second clasping mechanism 37 extending around at least a portion of the perimeter portion of the bottom member.

The housing can include a gasket (e.g. 15) positioned in a channel (e.g. 10) located in the perimeter portion of the bottom member 3. The perimeter portion of the top member 2 can be configured to press against and compress the gasket in the gasket channel when the first clasping mechanism 27 engages the second clasping mechanism 37 when top member 2 is coupled to the bottom member 3 to form the waterproof housing 1. The waterproof housing (e.g. 1, 100, 200) can also include a waterproof compartment proximate a back surface of the bottom member 3. The waterproof compartment can be defined by a volume located between an inner surface of a compartment door 205 or sliding drawer 105 and the back surface of the bottom member 3. The waterproof compartment can be configured to store one or more items other than the personal electronic device (e.g. payment card, identification card, SIM card, memory card, keys, cosmetics, or cash). The one or more stored items can be accessible when the compartment door 205 or sliding drawer 105 is in an open position, and the one or more stored items can be concealed when the compartment door or drawer is in a closed position.

In examples shown in U.S. patent application Ser. No. 13/517,583, the waterproof housing 1 can further include a top member gasket 15a extending from an inner perimeter portion of the top member 2. The top member gasket 15a can be configured to contact and compress against a top surface of the personal electronic device to form a liquid-tight seal therewith when the personal electronic device is installed in the top member 2 and when the top member is coupled to the bottom member 3 to form the waterproof housing 1.

In some examples, the waterproof compartment 1 can include a slot formed on an inner surface of the sliding drawer 105 (see, e.g. FIGS. 10, 13, and 16) or formed on an inner surface of the compartment door 205, depending on the configuration and functionality of the protective case. The slot can receive and retain a SIM card, computer memory card, payment card, or identification card.

In some examples, the waterproof case or housing (1, 100, 200) can include a mirror attached to or formed on an inner surface of the compartment door 205 or sliding drawer 105 or attached to a back side surface of the protective case. The housing can also include a quantity of cosmetics disposed within a shallow receptacle formed in an inner surface of the waterproof compartment. In some instances, a cosmetic tool for applying the quantity of cosmetics can be removably attached to the inner surface of the waterproof compartment.

The compartment can provide enhanced security for stored payment cards. In some examples, the compartment can include a shielding material that protects any payment cards having magnetic strips or electronic components from being damaged or interfered with by magnetic fields originating outside of the compartment or protective case. The magnetic shielding can also protect any payment cards having magnetic strips or electronic components from being damaged or interfered with by magnetic fields produced by the personal electronic device housed in the protective case or housing (e.g. 1, 100, 200).

In some instances, the shielding material can cover all internal surfaces of the compartment and can include, for example, a thin layer of metal foil, magnetic shielding polyester (PET) film, metalized fabric, metalized glass fiber (MGF), or a thin layer of metallic paint. In some instances, the shielding material can be integrated or mixed into the material used to form the compartment door 205 or sliding drawer 105 of the compartment and, therefore, may not be a separate component from the door or drawer.

When a payment card or electronic component is stored within the closed compartment, the shielding material can prevent information that is stored within or on any payment card or electronic component (e.g. RFID chip) from being inadvertently or maliciously read by a wireless card reader. This security feature can prevent a user's payment card information from being acquired by another person unbeknownst to the user. This feature can also prevent a mobile point of sale from inadvertently acquiring the user's payment card information as a result of the user's payment card being in close proximity to the mobile point of sale even though the user has not initiated or approved a commercial transaction.

Cases described above include a system for connecting a case (100) to a sliding drawer (105). Included in that system were described a first rail 125 disposed along a first edge of the sliding drawer and a second rail 130 disposed along a second edge of the sliding drawer. These rails 125, 130 of the sliding drawer 105 may respectively engage first and second rail receivers 140, 145 of the protective case 100. An alternate described embodiment reverses the rails and rail receivers, where the sliding drawer 105 includes first and second rail receivers (not illustrated) placed along the first and second edges of the sliding drawer 105, which rail receivers may engage first and second rails of the protective case 100. In a number of configurations illustrated in the figures and described below, this rail connection system, among other attachment structures, may be used to attach a number of modular accessories in addition to the sliding drawer 105, as described in further details below. In addition (or alternatively) to a sliding drawer as described above, a modular accessory may include electrical components that enable the modular accessory to enhance existing features of a case or an encased electronic device and/or provide new features. For example, the modular accessory may provide power, communication, storage memory, security, protection, and/or other features and functionality as described further below. The case itself may also include various components which may cooperate with such modular accessory to enhance the functionality of an electronic device encased by the protective case and/or of the modular accessory, also described in greater detail herein.

FIGS. 23A and 23B show a front and rear view of a case 2300, such as protective case (1, 100, 200), for an electronic device. The case 2300 may at least partially cover or enclose the electronic device as described above and in descriptions incorporated by reference. The case 2300 may include a physical connection system 2350 that permits secure attachment of one or more modular accessories. As described in detail below, the case 2300 may further provide features for facilitating or directly conveying wired and/or wireless communication, such as electrical power and/or data communication between a physically connected modular accessory and the case and/or between a physically connected modular accessories and an electronic device installed in the case, as described in greater detail below.

The physical and electrical structure and configuration described below may enhance the function of an electronic device enclosed or partially covered by the case, and the case with (and in some cases without) electronic device may be used with one or more modular accessories described below. More specifically, modular accessories attachable to the disclosed case may include features not otherwise available to the electronic device. For example, a modular accessory, connected by a disclosed physical connection system to a disclosed case, may provide, to an electronic device installed in the case, additional sensing, communication, power duration, power harvesting, physical or data storage, audio input or output, alternative communication protocols, and the like as described further below with reference to specific modular accessories. To begin, alternative structures for the case are discussed, followed by general discussion of a modular accessory and various specific implementations. It will be appreciated that the general descriptions of the case and modular accessory are applicable with minor variation to embodiments not specifically disclosed.

The case 2300 may include a protective shell having a back portion 2310 and at least one side 2315. In some embodiments the case may include two, three, or four sides 2315. The back portion 2310 may have a rear, external surface 2320 and a front, internal surface 2330 that is opposite the rear, external surface. Each of the sides 2315 may extend from a respective edge of the back portion of the case. The sides 2315 may each extend in the same direction away from the plane of the back portion 2310. In some implementations, the sides 2315 may be integrally formed with the back portion 2310. In some implementations each side 2315 may join another of the sides. For example, an embodiment having four sides 2315 may be joined such that the sides together form a perimeter wall. The sides 2315 may be structured to contact and securely hold corresponding sides of the electronic device. In particular, when at least two sides of the case 2300 are formed on opposite edges of the back portion 2310, the two sides may hold the electronic device therebetween, and may be formed to apply pressure against the corresponding sides of the electronic device when the electronic device is at least partially covered by the case 2300.

A front, internal surface 2430 of a back portion 2410 of a case 2400 that receives a surface of the electronic device may include a cushion portion 2432 as illustrated in FIG. 24. The cushion portion 2432 may be compressed against the encased electronic device when the case receives an impact, absorbing and/or distributing the force of the impact over a wide area and thereby reducing force received directly at the encased electronic device.

A back portion 2410 and sides 2415 may be formed to receive or include a front portion 2440 of the case, which front portion may be compressible. The front portion 2440 may include an external rim 2444 that separates a front portion of an encased device (e.g., phone) from a surface on which the case may be placed. The front portion 2440 may also corner impact cushion members 2442 may be formed disposed at inside corners of the case. It will be acknowledged that the corner impact cushion members 2442 may in other embodiments (not shown) be disposed at external corners of the case, or may be formed in corner spaces formed between sides 2415 of the back portion 2010. The front portion 2440 may also include button covers 2446 formed to fit in corresponding notches or openings 2416 of the sides 2415 of the case 2400. Notches or openings 2416 may in some implementations be left open to accommodate direct access to buttons, switches, speaker openings, camera, flash, electrical and/or audio ports, and the like.

A case may include a rear external surface 2420 that separates a rear surface of an encased electronic device from an attached modular accessory or external resting surface. The rear external surface 2420 may provide impact and scratch protection to the rear surface of the electronic device. The rear surface may be transparent, translucent, or opaque. In some embodiments (not illustrated), the rear surface may include patterns, designs, brands, and the like. As discussed above and below in further detail, the case may include a cavity between the rear external surface 2420 and front, internal surface 2430. In some embodiments the cavity may include a graphical element (photo, drawing, branding, etc.) which, when the rear external surface 2420 is transparent, may be viewable through the rear surface. The rear external surface may include a texture that may enhance grip or may provide visual appeal.

The back portion 2410 and/or the front portion 2440 of the case 2400 may be formed of a rigid material as describe above with respect to FIGS. 1 and 2. The case may additionally, or alternatively include a cushion cover or flexible member (not shown) that surrounds all or part of the rigid shell. In an alternative embodiment the case may be formed mostly, or entirely of a flexible material. In another embodiment the case may further include a front cushion portion that connects to the back and sides.

As mentioned above, the case may include a case-based portion of a physical connection system for attaching a modular accessory to the case. The case portion of the physical connection system may include one or more physical connectors structured to mate with complementary physical connectors of a modular accessory.

Figure 25:
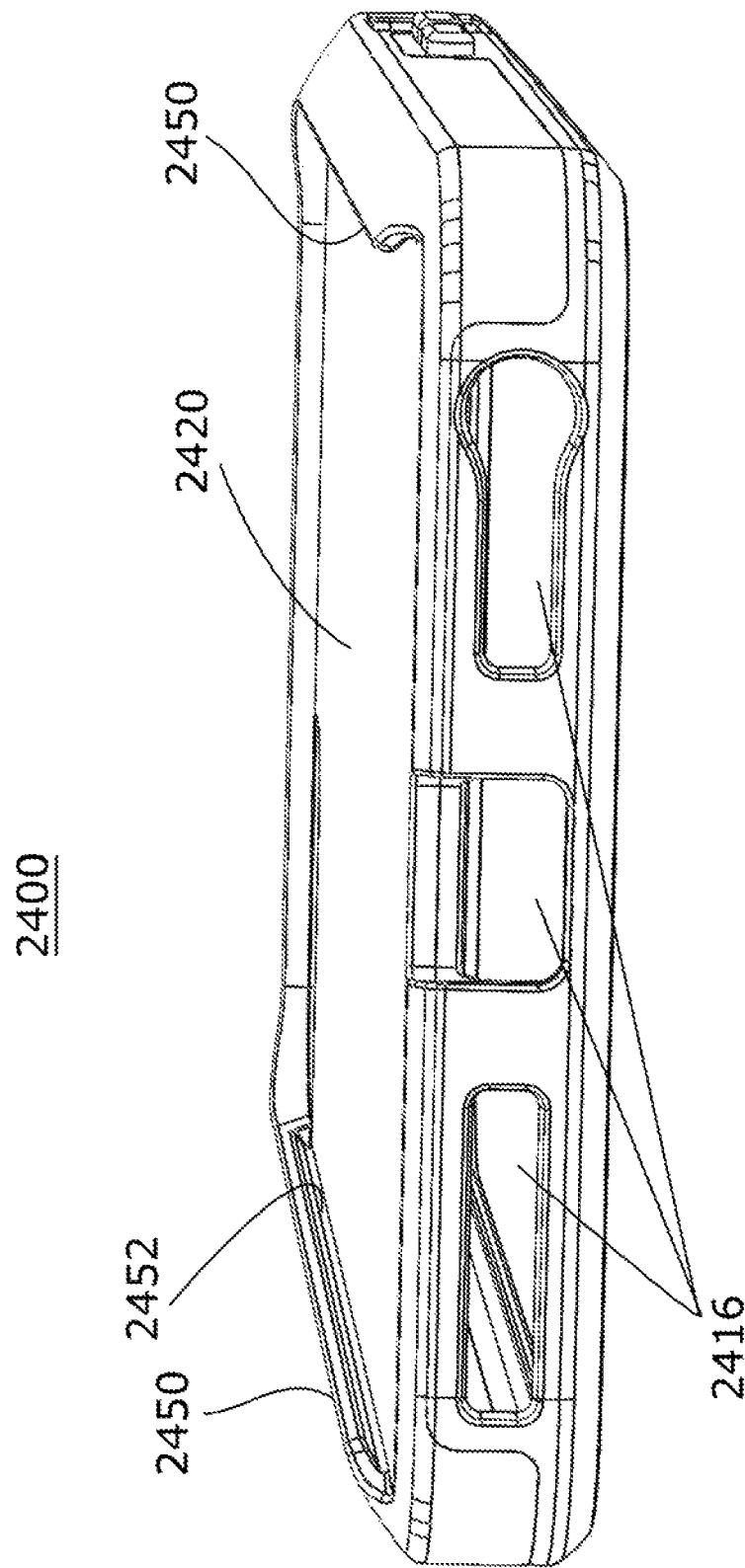
FIG. 25 shows a bottom perspective view of a protective case adapted to receive a modular accessory.

In an illustrated embodiment, the physical connector(s) of the case may include at least two rail receivers 2450 disposed along opposing edges of the rear, external surface of the case. As illustrated in the bottom perspective view of FIG. 25, the rail receivers 2450 may be structured to form a channel 2452 to slidably receive and securely retain at least one modular accessory.

Figure 26:
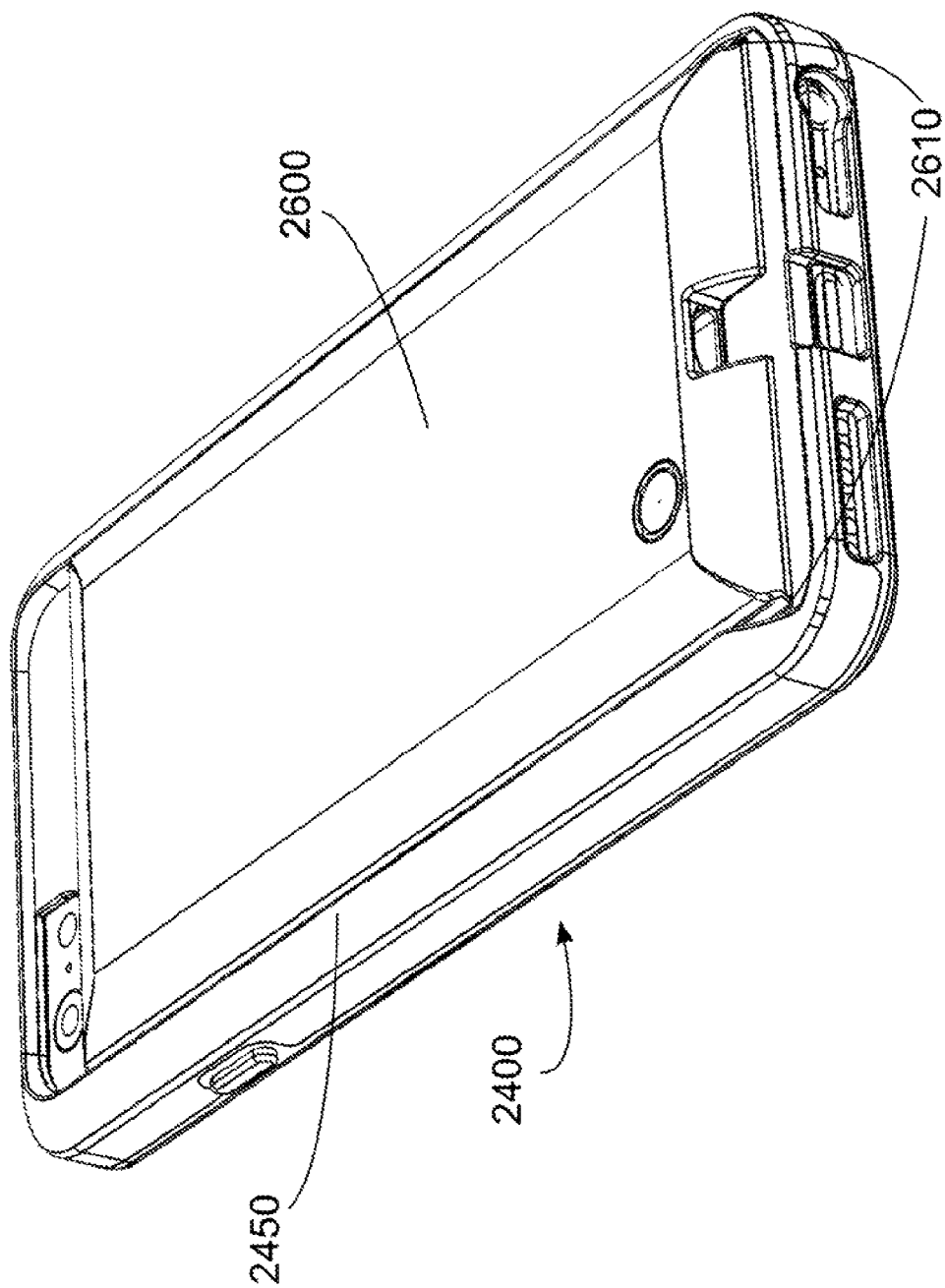
FIG. 26 shows a rear perspective view of a protective case with modular accessory according to the disclosure.

FIG. 26 shows the case 2400 together with a modular accessory 2600 such as the above-described sliding drawer and/or modular accessories described in detail below. Each modular accessory 2600 may include accessory-based (i.e., located on the accessory) physical connectors that engage the case-based (i.e., located on the case) physical connectors. The physical connectors may be implemented, in some embodiments, as a rail and rail-receiver system such as that described above (e.g., rails 120, 125, 130 and rail receivers 140, 145). For example, rails 2610 of modular accessory 2600 may engage rail receivers 2450 of the case when the modular accessory 2600 is installed on the case 2400, e.g., on a protective shell of the case. Again, the reader will appreciate that placement of the rails 2610 and rail receivers 2450 may be reversed. That is, the case may include rails, while the modular accessory may include complementary rail receivers.

Figure 27:
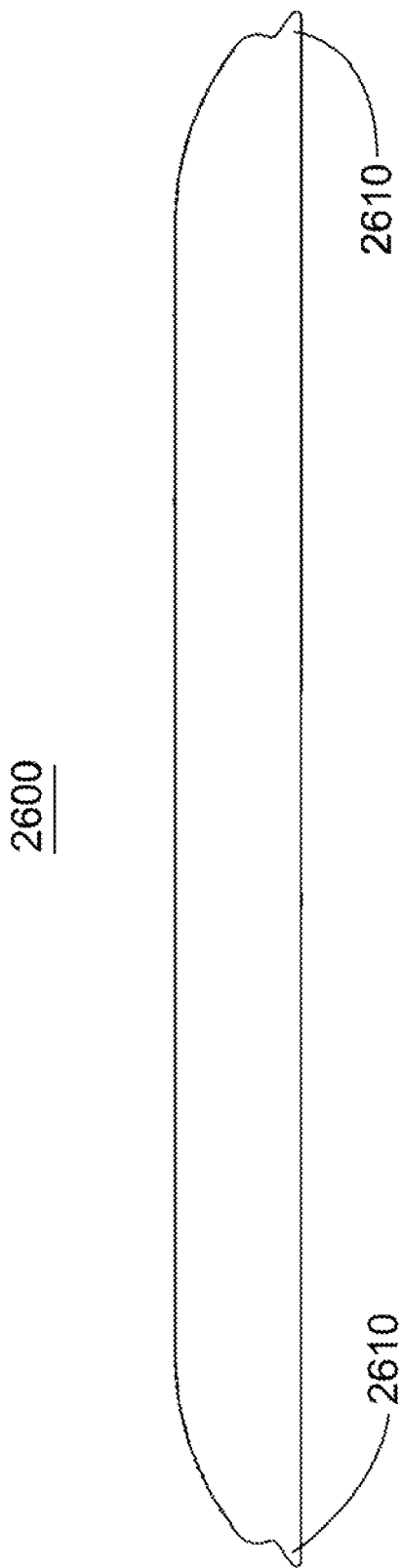
FIG. 27 shows an end view of a modular accessory having a physical connection system.

FIG. 27 shows an end view outline of a modular accessory 2600 to more clearly show the position of the rails 2610 on the two sides of the modular accessory. It should be noted that FIG. 27 does not illustrate internal details of the modular accessory.

Although a rail system is illustrated with a generally rectangular-shaped smartphone and protective case in mind, it is recognized that the present disclosure may apply to other shapes with little modification. For example, parallel rails or rail receivers may be placed on a surface of a non-rectangular case and/or non-rectangular modular accessory. Moreover, a rail and rail receiver system may employ non-parallel rails/receivers, such as semi-circular rails and rail receivers (requiring a twisting engagement). The case (e.g., 2400) in the figures may have a generally rectangular shape, as seen when viewing a major surface of the case. The case 2400 may, as illustrated in, e.g., FIG. 25, have rail receivers (channels, tracks) 2450 formed along the longitudinal edges of the case. It is recognized that the rail receivers may alternatively be formed along transverse edges of the case.

A physical connection system such as the rail and rail receivers described above may include one or more retention structures to prevent unintentional detachment of the modular accessory from the case. For example, the physical connection system may include one or more recesses along the rail or rail receiver structured to accommodate a protrusion from the respective rail receiver or rail. The protrusion and recess when engaged may provide sufficient interference to prevent unintentional sliding of the modular accessory while permitting forced sliding of the accessory. In some embodiments, the case may include a button or switch for releasing such retention structure of the physical connection system. For example, a button may be formed in the case and attached to a protrusion in the case which when pressed or pulled may disengage the protrusion from a recess in the modular accessory. It is recognized that a retention mechanism may be formed anywhere along the case or modular accessory where the two touch when connected.

Other structures (not shown) for securing a modular accessory to the case are disclosed. For example, the case may include a single rail having a T-shaped cross section, the rail formed to slidably receive a complementary T-shaped channel of the modular accessory. Formation of the T-shaped rail and complementary channel may be reversed; the rail being formed on the modular accessory and the channel being formed in the case. In another implementation, the modular accessory may include L-shaped rails at outermost edges, the L-shaped rails formed to slidably engage channels formed at the sides of the case.

The physical attachment system of the case and modular accessory may alternatively include hooks and receptacles, clasping mechanisms such as buckles, straps, adhesives, one or more tabs and corresponding slots and/or the like (not shown).

The case may include openings for access to features of the electronic device. For example, the electronic device may include interactive controls such as a button, slider, switch, keyboard, camera lens, flash, indicator, sensor, antenna, or the like. The electronic device may include one or more ports, such as audio, power, and/or data ports which may include an electrical plug or electrical receptacle or other electrical contact of the electronic device. The rigid shell may be formed to have openings that correspond to some or all such feature(s) for access thereto. In some instances, the case may include a flexible membrane covering one or more of the openings. The flexible membrane may have a form similar to a corresponding feature of the electronic device, or may have a different form. For example, the flexible membrane may have a shape corresponding to a volume rocker switch of a smartphone. The membrane may be sealed to the rigid shell, for example at edges of the corresponding opening in the case. The flexible membrane may be formed as part of the above-described cushion portion or cushion cover or may stand alone as a cover dedicated to a particular opening in the case.

Figure 28:
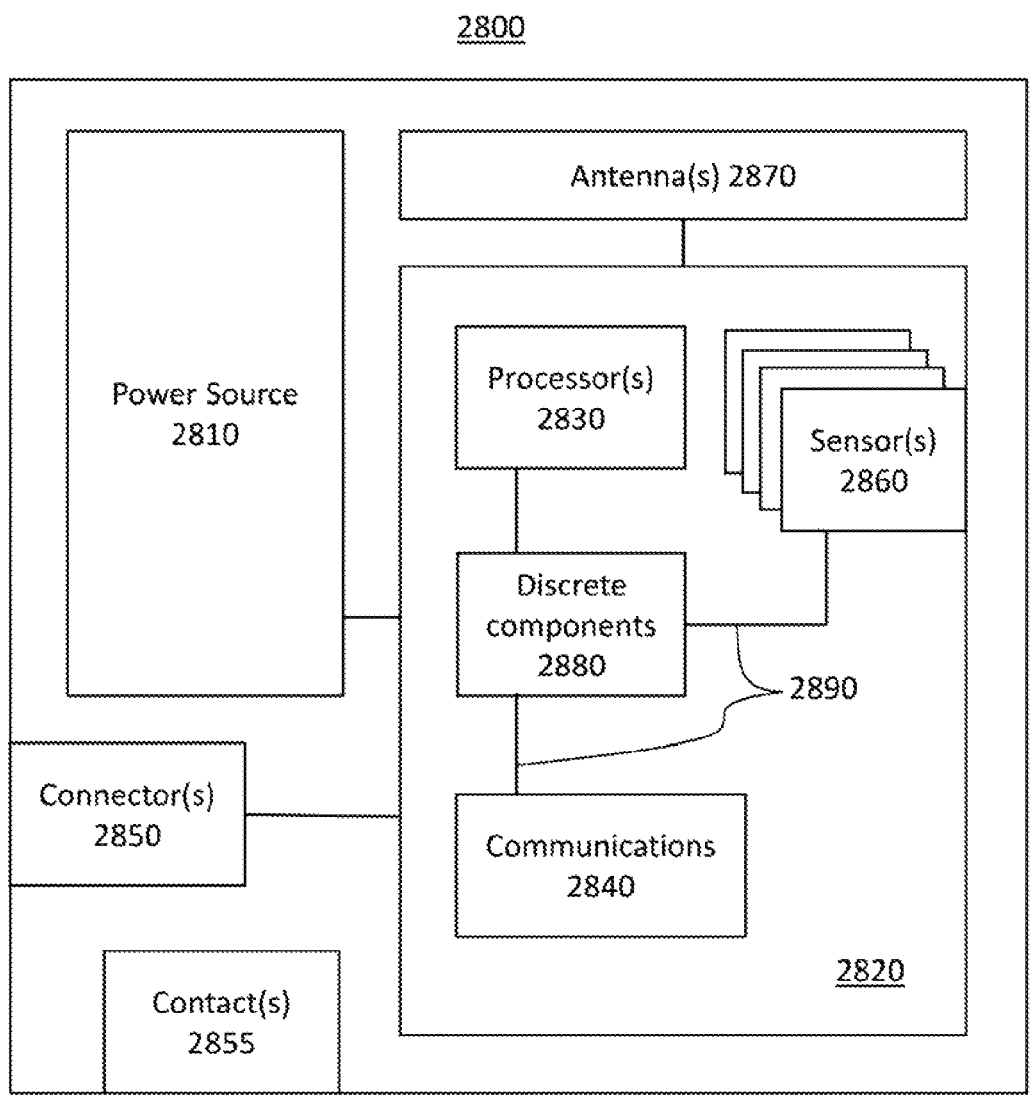
FIG. 28 is a block diagram showing electronic components of a protective case according to the disclosure.

As discussed above, the case 2400 may include at least one cavity between the rear external surface 2420 and front, internal surface 2430. In some embodiments, the cavity may include electronic components 2800, as illustrated in FIG. 28, such as one or more of a power source 2810; a printed circuit board 2820; one or more integrated circuits (such as a microprocessor(s) 2830 and/or communication circuit(s) 2840), electrical connectors 2850, one or more sensors 2860, one or more antennas 2870, and/or discrete electronic components 2880 (resistors, capacitors, inductors, coils, magnets, lights, transducers, and/or the like); and/or electrical wiring/microstrip 2890, at least partially disposed in the cavit(ies) formed in the case. The block diagram of FIG. 28 is not intended to limit the size, layout or interconnection of the electronic components 2800. For example, antenna(s) 2870 and connector(s) 2850 are illustrated as separate from the printed circuit board 2820, but in some configurations may be mounted to the printed circuit board. It should also be understood that not all of the components are required in the electronic circuitry of the case. For example, a simple battery case may in some embodiments not require a processor, sensors, communications circuitry and/or discrete electronic components.

One or more of the electronic components 2800 may extend from the cavity through an opening in a wall of the cavity. For example, an electrical connector 2850 may be disposed at one of the sides of the case and extend through an opening in the cavity in a position corresponding to a complementary electrical port of an encased electronic device. Such electrical connector 2850 may, together with other components other than those in the case, convey power and/or data between the electronic device and electrical components internal to the case and/or between the electronic device and electrical components external to the case, such as electrical components of a modular accessory 2600.

A power source 2810 of the case 2400 may include one or more rechargeable or non-rechargeable batteries, capacitors (including at least super- or ultra-capacitors), fuel cells, solar cells, and/or kinetic energy harvesting devices. The power source 2810 may in some embodiments be removable from the case independent of a modular accessory, or may be fixed within the case. The power source may have any of various sizes, including but not limited to a common power cell size as defined by ANSI C18.1M, Part 1-2001, or may have uncommon or custom size and shape. For example, a case power source 2810 may include a "flat" battery that approximates the perimeter shape of the case while maintaining a thickness of a few millimeters. A battery used as the power source may have any of various chemistries, including, but not limited to lithium ion, lithium polymer, lithium phosphate, nickel-cadmium, lead-acid, nickel metal hydride, or the like.

One or more electrical contacts 2855 may be formed in the case 2400 for contacting an electrically conductive portion of a modular accessory. (See also FIG. 24B.) For example, one or more of the physical connectors 2450 of the case may include at least one electrical contact 2855 positioned to align with an electrical contact of the modular accessory when the accessory is attached to the case. The electrical contact(s) 2855 of the case may thereby convey an electrical signal to or from the modular accessory. The electrical contact(s) 2855 of the case may be disposed in or along at least one of the above-described rail receivers.

Additionally, or alternatively, the electrical contacts 2855 may be disposed in the rear, external surface 2420 of the case 2400 (not shown). In another embodiment, the case may include a portion wherein electrically conductive material (e.g., electronic components/circuitry, a conductive strip, wire, or conductively doped portion of the case material) is disposed in the case between an electrical connector of the case, and the electrical contact(s) may be formed in the case for at least temporarily conveying an electrical signal to/from a modular accessory. The electrically conductive material of the case may include electronic components or electrical circuitry, and the electronic components 2800 may selectively intercept an electrical signal conveyed between the electrical connector 2850 of the case engaged with the electronic device and the electrical contact 2855 at the exterior surface of the case for electrical connection to a modular accessory.

In some embodiments, the electronic components 2800 may be accessible at an interior side of the case. For example, removing the electronic device from the case may expose all or part of the cavity, or may expose only a particular electrical component. The arrangement may permit access to case electronic components 2800 and/or may permit an electrical connection between the electrical components of the case and a connector or electrical contacts on the back or side of the encased electronic device. For example, in some smartphones a back housing portion of the phone may be removed to expose battery terminals, SIM card terminals, memory card terminals, security feature terminals, sensor connection terminals, antenna terminals, or the like. Electrical connection between the case electrical components 2800 and such terminals may therefore permit use of those terminals to enhance communication, battery life, data communication, etc. Those of ordinary skill in the art will recognize that the cavity need not include electronic components in some embodiments, and the cavity may, as described elsewhere herein, be used for storage of anything that will fit within the cavity's volume.

In other embodiments the cavity and any electrical components therein may be inaccessible to an end user, even when the electronic device is removed. In some embodiments a transparent or translucent window or light pipe may permit light to traverse the window. For example, a photodiode in the cavity may receive light through such window, and/or light from an LED in the cavity may be seen through the window or light pipe.

Further as described above, the case may provide a measure of protection against impacts, crushing, scratching and/or other damage to which the electronic device would otherwise be susceptible. In some instances, the case may provide a seal to prevent ingress of dust and/or water to at least portions of the electronic device and thus prevent dust and/or moisture from contacting at least those portions the electronic device. For example, the case may render the electronic device waterproof to a specified depth, such as in compliance with an International Protection rating of IP65, IP66, IP67 or IP68 via seals and/or clasping mechanisms structured to keep water out of the case. The case may provide a rigid shell that contacts one or more of a perimeter of the electronic device and a major surface of the electronic device without substantially preventing ingress of dust and/or water.

Figure 29:
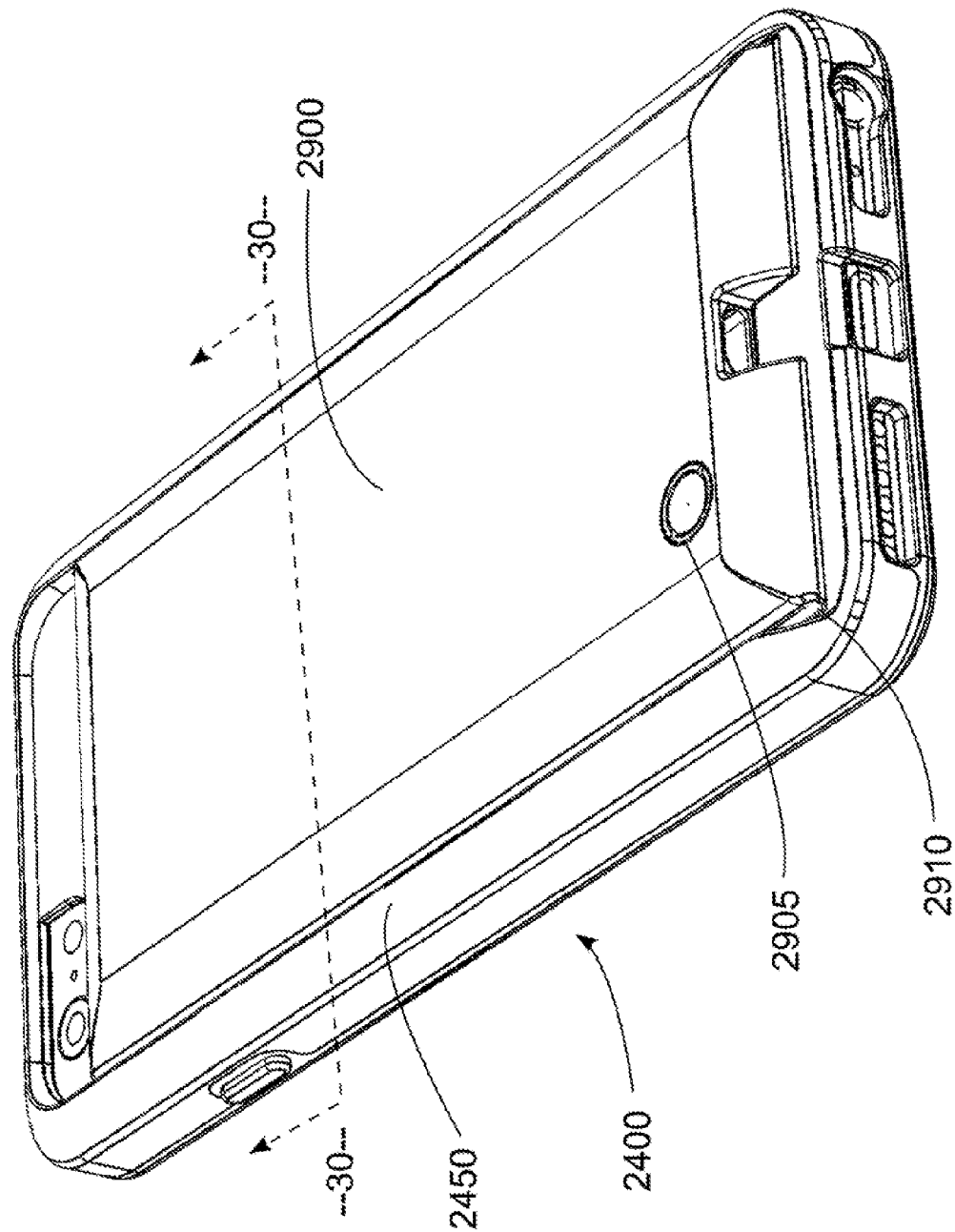
FIG. 29 shows a rear perspective view of a protective case with modular accessory according to the disclosure.
Figure 30:
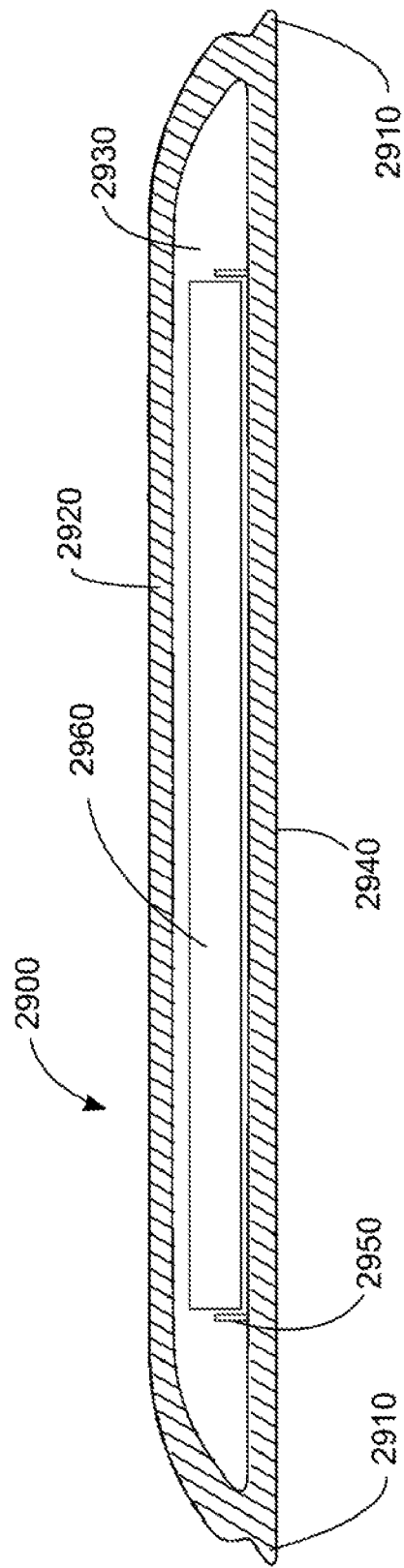
FIG. 30 is a cross-sectional view of the modular accessory of FIG. 29 along 30-30 according to the disclosure.

FIGS. 29 and 30 illustrate a modular accessory 2900 for attachment to a case such as a case 2300, 2400 described above. FIG. 29 illustrates a modular accessory 2900 as attached to a case 2300, 2400, while FIG. 30 provides a cross-sectional view of a modular accessory 2900. The modular accessory 2900 may include an outer casing 2920 and an interior cavity 2930. The outer casing 2920 of the modular accessory 2900 may include a first major exterior surface 2940 that may be substantially planar to facilitate attachment to a substantially planar surface of the case. The modular accessory 2900 may also include one or more ridges 2950 and a load 2960 (e.g., electronic components). The ridges 2950, when implemented, may retain elements in place in the interior cavity 2930, such as the load 2960. It will be appreciated that term "substantially planar," with respect to the first major exterior surface 2940 may include reasonable deviations from absolute planarity. For example, the first major exterior surface 2940 of the modular accessory may include a concave or convex curve in one or more axes to complement an opposite curve of a receiving surface in certain embodiments of the case.

The modular accessory 2900 may include an accessory-based (i.e., disposed on the modular accessory) portion of a physical connection system for attaching the modular accessory to the case. The accessory-based portion of the physical connection system may include one or more physical connectors or receptacles structured to mate with complementary physical connectors of the case. One variation, in which the physical connection system includes rails 2910, is described immediately below. It will be acknowledged by the reader that other embodiments of physical connection may be employed.

FIG. 30 illustrates that the modular accessory may include, as physical connector(s), at least rails 2910 disposed along opposing edges of the first major surface 2940 of the modular accessory 2900. The rails 2910 may be structured to slidably engage rail receivers (such as 2350 or 2450) of the case, which rail receivers may engage the rails 2910 when the modular accessory 2900 is installed on the case, e.g., on a protective shell of the case. The rails 2910 may each engage a channel (e.g., 2452 seen, e.g., in FIG. 25) of the rail receivers 2450 into which the rails 2910 of the modular accessory may slide, thus securing the modular accessory 2900 to the case (e.g., 2400). The rails 2910 may be disposed at two parallel sides of the outer casing 2920 at opposite edges of the first major exterior surface 2940 of the modular accessory, and may be formed integrally with the outer casing 2920. One of ordinary skill will acknowledge that placement of the rails and rail receivers may be reversed. That is, the case may include rails, while the modular accessory may include complementary rail receivers.

Figure 31:
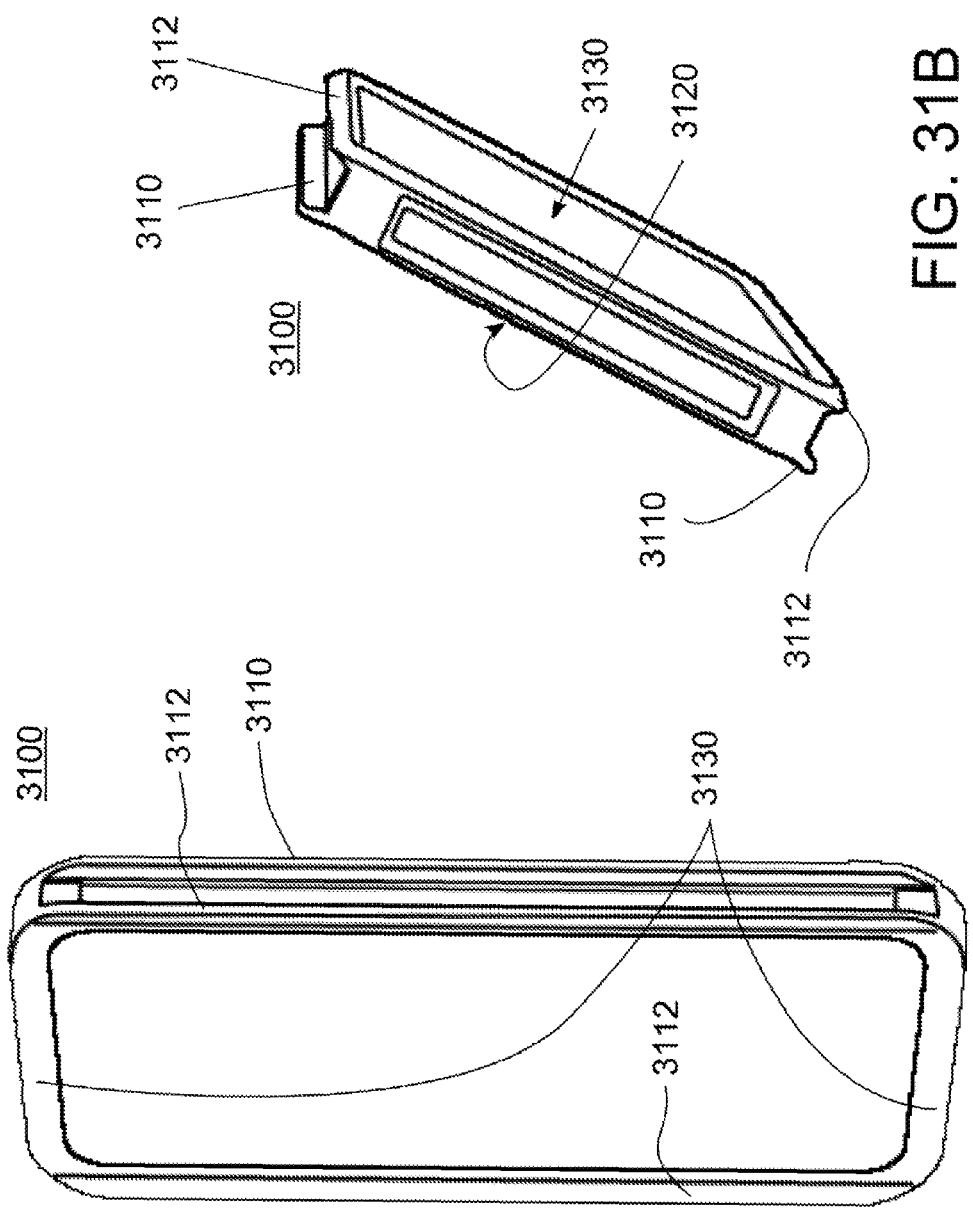
FIGS. 31A and 31B are, respectively, side perspective and bottom perspective views of a protective case having a physical connection system according to another disclosed embodiment.

In some implementations, such as illustrated in FIGS. 31A and 31B, a case 3100 may include multiple sets of rails, permitting a modular accessory having rail receivers to be joined to the case in multiple positions and/or orientations. For example, a rear-of-case set of rails 3110 may permit attachment of a modular accessory having rail receivers to be attached to the back 3120 of the case, while a front-of-case set of rails 3112 may permit attachment of a modular accessory having rail receivers to the front 3130 of the case. For example, a modular accessory may act be placed to protect a touchscreen of an encased device, or may permit the user to easily carry more than one battery, etc.

Figure 32:
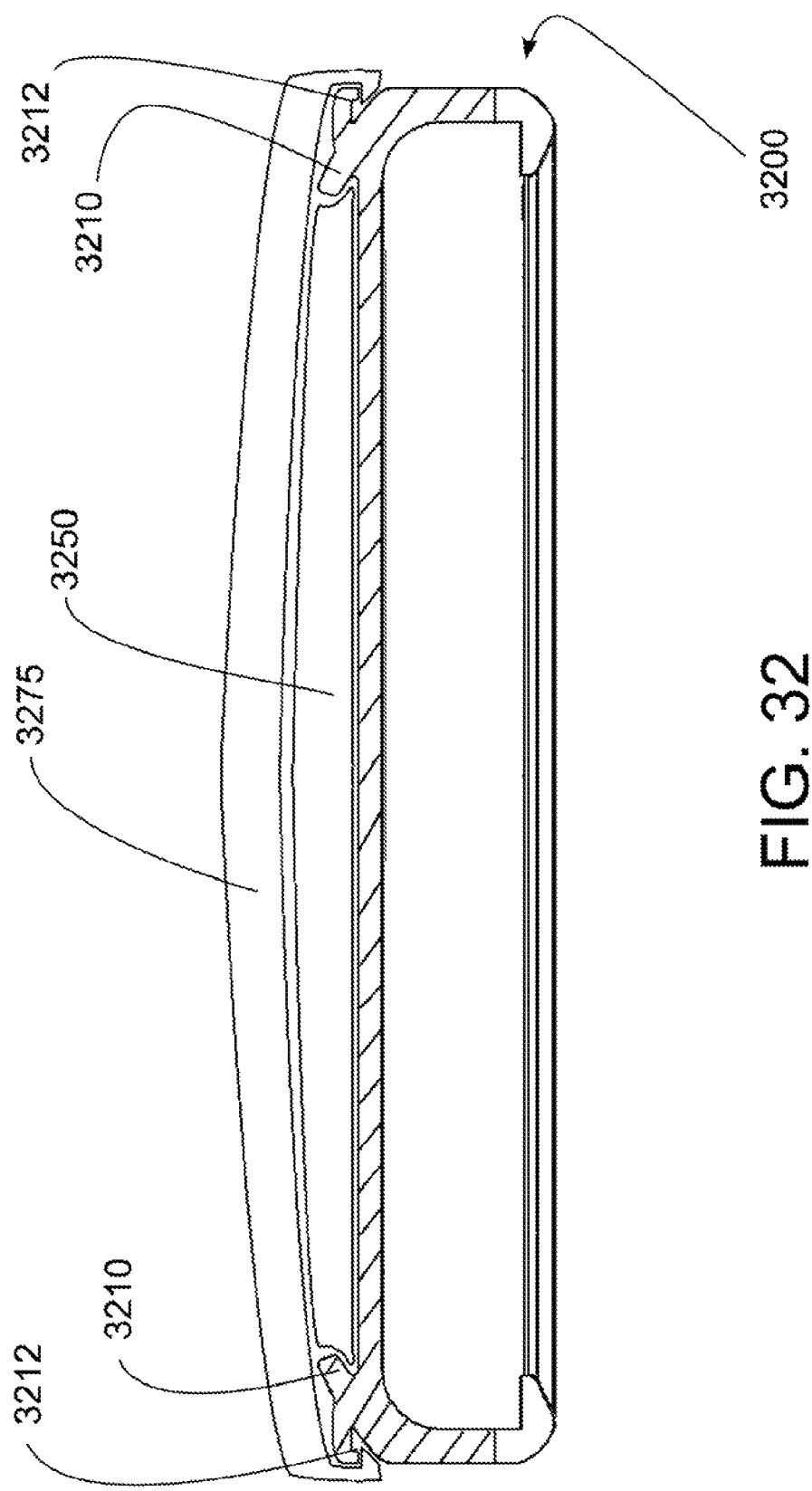
FIG. 32 is a cross-sectional view of a protective case adapted to simultaneously receive at least two modular accessories.

Further still, as shown in the cross-section view of FIG. 32, the case 3200 may incorporate both rail receivers 3210 and rails 3212 proximate each other. This arrangement may permit attachment of an "inner" modular accessory 3250 (e.g., having a thin profile) to be mounted to the case using a set of case-based rail receivers 3210, while mounting an "outer" modular accessory 3275 to the case over the inner accessory 3250 by using the case-based rails 3212.

In another embodiment, the physical connection system may implemented by a flexible cover (not shown) that fits over at least part of the case and at least one modular accessory. That is, a modular accessory may be placed on the case and a flexible cover may fit over the modular accessory and a portion of the case, thereby holding the modular accessory against the case. The modular accessory may have a size and/or shape that extends to boundaries of the case and is thus sufficiently held in place by the flexible cover alone. Alternatively, in an embodiment utilizing a flexible cover to secure the modular accessory, the case may include guide ridges (not shown) that extend from a surface of the case and provide a boundary within which the modular accessory fits, the guides preventing the modular accessory to slide around on the case when covered by the flexible cover.

Figure 33C:
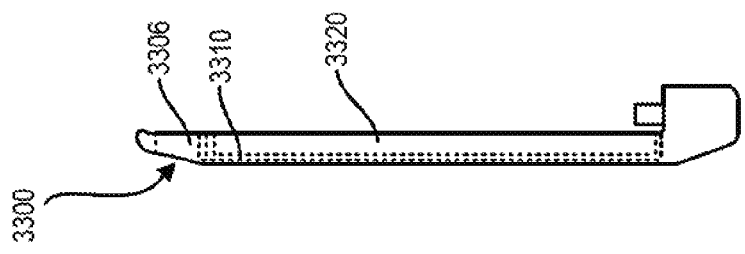
FIG. 33C illustrates a side view of the modular accessory of FIG. 33B.
Figure 33B:
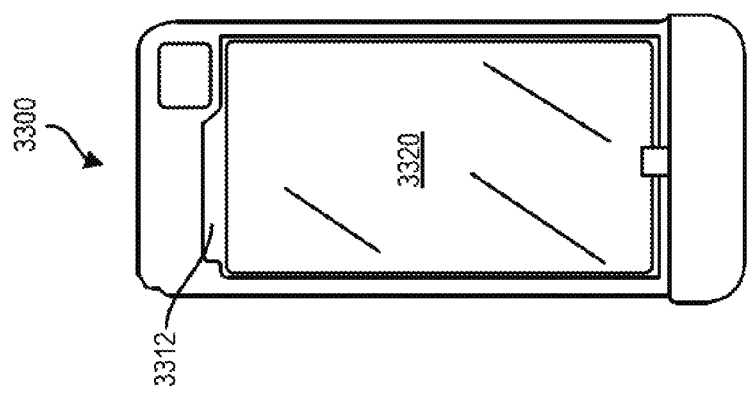
FIGS. 33A and 33B illustrate front views of a disclosed modular accessory embodiment having a cavity accessible from an interior surface of the modular accessory.
Figure 33A:
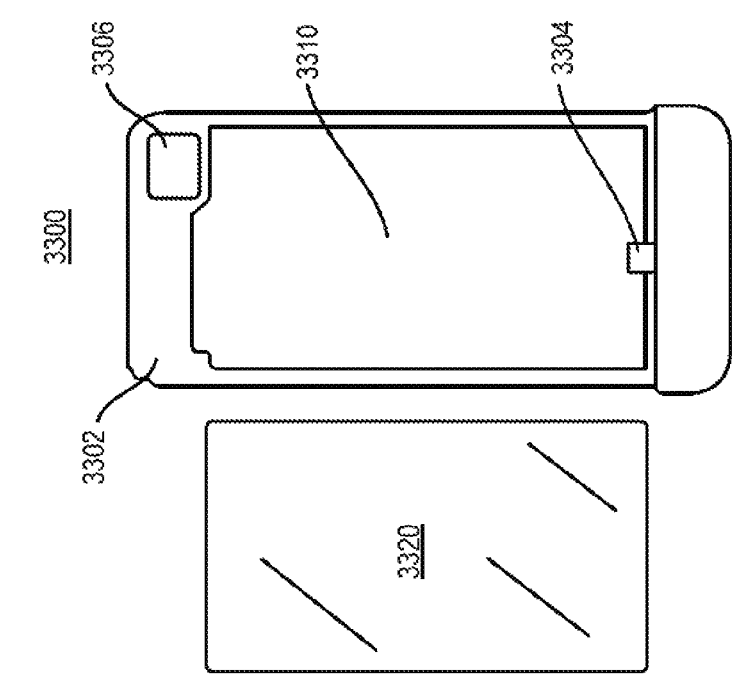

In another embodiment, the modular accessory may include a cavity on an interior surface that faces the electronic device (e.g., phone) on which the case may be fitted. For example, FIGS. 33A-C show an embodiment in which a cavity 3310 of a modular accessory 3300 is exposed on an interior side 3302 of the modular accessory, which interior side may face a rear surface of a case (not shown). FIG. 33A shows a modular subassembly 3320 that may occupy the cavity 3310 and front view of the modular accessory 3300. The cavity 3310 may be sized to accept one or more removable subassemblies 3320, where each subassembly may be sized to closely fit within boundaries of the cavity 3310, as illustrated, or may fit only a portion of the cavity 3310. One subassembly 3320 may be a battery, while other subassemblies may include features such as those described below with respect to various modular accessories.

The modular accessory 3300 may include an electrical connector 3304 for electrical connection of the modular accessory to an electronic device encased by a protective case (such as any of those described herein) to which the modular accessory may be attached. The subassembly 3320 may include a connector and/or contacts for electrically connecting the subassembly 3320 to corresponding contacts or connector of the modular accessory 3300. A cutout 3306 may permit optical exposure of features (such as a camera and/or flash or other sensors) of an encased electronic device. FIG. 33B illustrates a front view of modular assembly 3300 with the subassembly 3320 installed in the cavity 3310. FIG. 33C illustrates a side view of modular assembly 3300. An extension 3312 of the cavity 3310 may permit a user to easily remove the subassembly 3320 by fitting a fingertip or tool into the extension to lift or pry out the subassembly 3320.

The described arrangement using a subassembly may permit a user to install a fresh battery subassembly 3320 in the modular accessory 3300 anytime, avoiding a need to recharge a non-removable battery of the modular accessory in order to use other electrical functions of the modular accessory. This arrangement may also permit a relatively inexpensive means for battery replacement, as a replaceable battery subassembly may not in some implementations require its own housing.

Embodiments of the modular accessory such as 2900, 3300 may include a load (2960 in FIG. 30) in the interior cavity 2930, 3310 of the modular accessory. The load may include one or more electronic components 3400 as shown by the block diagram in FIG. 34. The electronic components 3400 may include one or more of a power source 3410; a printed circuit board 3420; one or more integrated circuits (such as a processor 3430 and communications circuitry 3440), one or more electrical connectors 3450 and/or electrical contacts 3455, sensors 3460, antennas 3470, discrete electrical components 3480 (e.g., resistors, capacitors, inductors, coils, magnets, lights, transducers, and/or the like); and electrical wiring/microstrip 3490.

As an integrated circuit, a processor 3430 may include one or more microprocessors, microcontrollers, programmable logic devices, digital signal processors, graphics processing units and/or the like. A communication circuit 3440 may include devices configured to assemble data in transferable increments (e.g., packets) via wired or wireless data communication protocols. Such protocols may include, but are not limited to, Wireless Fidelity (Wi-Fi), Universal Serial Bus (USB), Lightning, Thunderbolt, Bluetooth, Bluetooth Smart (aka Bluetooth Low Energy, or BLE), near field communications, (NFC), ANT+, ZigBee, and/or proprietary protocols. Integrated circuits may also include memory devices such as read only memory, random access memory, secure digital memory, and the like.

One or more of the electronic components of a modular accessory may extend from the interior cavity through an opening in a wall of the cavity. For example, an electrical connector 3450 of the modular accessory may be exposed at a side of the modular accessory through an opening in the cavity 2930, 3110. An electrical connector 3450 of the modular accessory may, for example, be disposed to mate with charging and/or data cable for transferring power and/or data between the modular accessory and an electronic device installed in an attached case, or between the modular accessory and an external device or power source. Such electrical connector 3450 may, together with other components internal or external to the case, convey power and/or data between the electronic device and electrical components internal to the case and/or between the electronic device and electrical components external to the case.

One or more electrical contacts 3455 of the modular accessory may be disposed at or along a portion the physical connector(s) of the modular accessory (e.g., rails 2910) or at any position adjacent the case (e.g., 2400) for contact with corresponding contacts of the case (e.g., 2855). For example, a rail 2910 of the modular device for engagement with a rail receiver 2450 of the case 2400 may include an electrical contact 3455 that, when the rails of the modular accessory engage the rail receivers of the case, physically contacts a complementary electrical contact 2855 of the case (see e.g., FIG. 24B). As discussed above with respect to the case, this electrical contact 2855 of the case may also or alternatively be directly or indirectly electrically connected to a port or other connector of the electronic device.

In some embodiments a modular accessory may include elements related to power storage, power harvesting, and/or power transfer. In general these may be visualized in FIG. 34 as element 3410. A power-related modular accessory may include an indicator (2905 in FIG. 29) that visibly indicates one or more of an amount of power stored in a power storage device or a power transfer status (e.g., charging, discharging, power level, etc.). Circuitry of a power-related modular accessory may include the communications circuit 3440 that may communicate data to the electronic device, e.g., for processing by the electronic device and/or presentation by a display of the electronic device.

Figure 34:
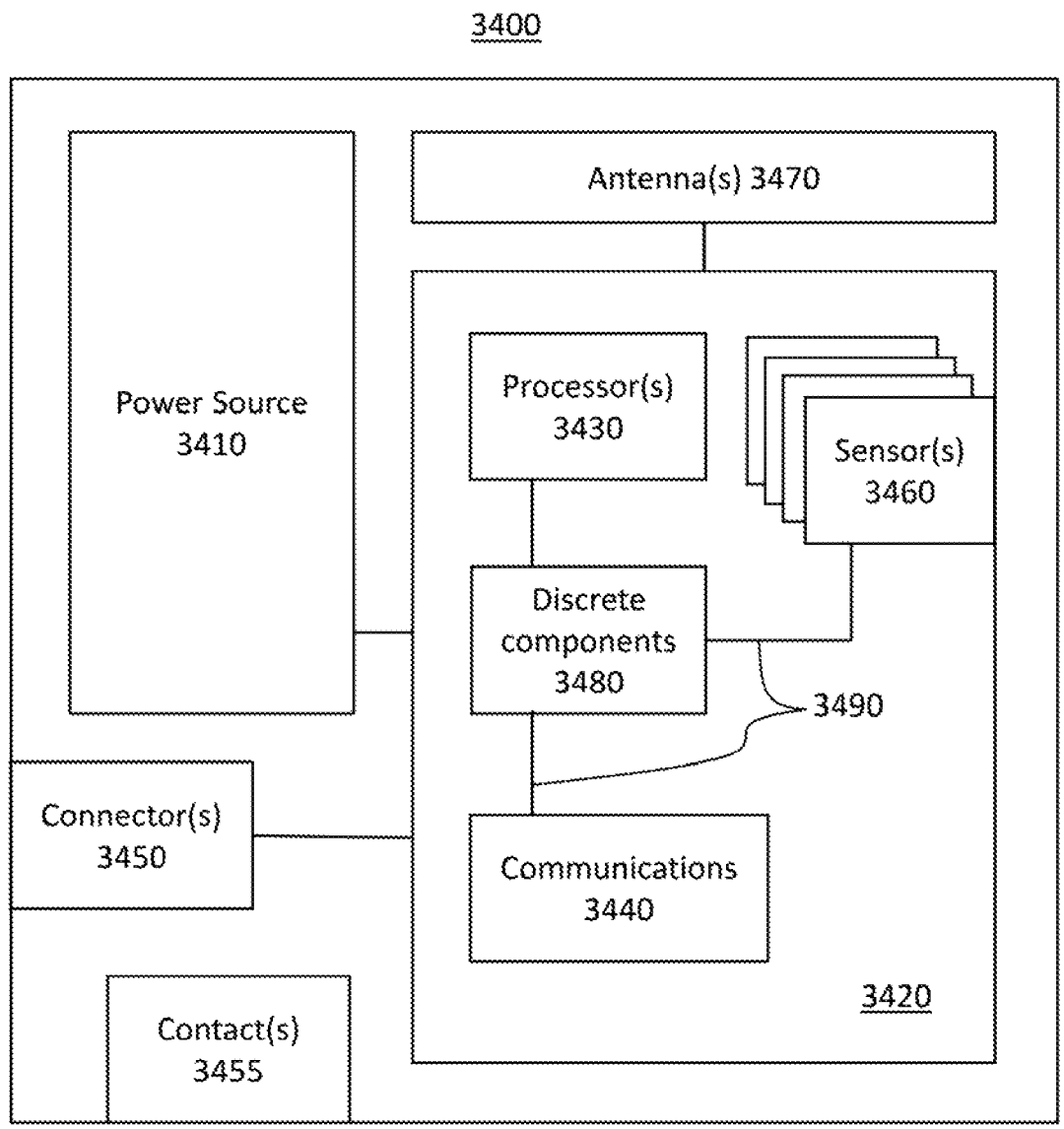
FIG. 34 is a block diagram showing electrical components for use in a modular accessory.

A power storage device, illustrated for example as 3410 in FIG. 34, of a power-related modular accessory may include one or more batteries. The modular accessory may be structured to permanently enclose a rechargeable battery and circuitry for charging the rechargeable battery. Alternatively, the modular accessory may include an opening and cover/lid therefore, which cover/lid may be removed from the opening to expose a portion of the interior cavity that includes terminals for accepting one or more batteries. The opening thus permits insertion and removal of the one or more batteries. In another embodiment, the modular accessory may include a battery, capacitor, or super-capacitor, or ultra-capacitor having a chemistry and/or configuration that facilitates rapid charging from an external source. This quick charge modular accessory may include receptacle for attaching a charging cable. Additionally, or alternatively, the quick charge modular accessory may include a plug for direct connection to an A/C power source such as a wall outlet. Such plug may be retractable, foldable, or even removable for user convenience.

A power harvesting modular accessory may include solar, kinetic, or other power harvesting components as well as a power storage device (e.g., rechargeable battery) for storage of harvested electrical power. In one variation the power harvesting modular accessory may include a fuel cell. In many embodiments power harvested may be sourced for storage in a power source 2810 of the case or may be stored in a power source 3410 of the modular accessory for transfer to the case or an encased electronic device, and/or may be consumed by electronics of the modular accessory itself.

A power transfer modular accessory may include circuitry (e.g., including some or all of electrical components 3400) for transferring power wirelessly between an external wireless power source and a battery of the modular accessory, or between an external wireless power source and a battery of the case, or between an external wireless power source and a battery of an encased electronic device. For example, the modular accessory may include an antenna such as antenna 3470 (commonly, but not limited to, a coil) for receiving electromagnetic energy in accord with a wireless power transfer protocol, and a processor and related circuitry configured to communicate power via one or more of wireless power transfer protocols of the Wireless Power Consortium (WPC), Power Matter Association (PMA), Alliance for Wireless Power (A4WP), and/or others. The modular accessory may include a wireless power transmitter, including a transmission antenna (e.g., 3470 which for power transfer is commonly, but not necessarily a coil) configured to wirelessly release power stored in a battery of the modular accessory, and/or may include a wired power conveyance structure.

For example, some electronic devices may have built-in circuitry for receiving wireless power transfer. In some wireless power transfer schemes, any intermediate circuitry or even non-circuitry that increases a distance between a wireless power receiver and transmitter, may reduce the efficiency of a wireless power transfer to the point of non-usefulness. A modular accessory having wireless power transfer features may thus include structure for increasing the efficiency, or at least minimizing a reduction in wireless power transfer efficiency. One structure may include use of two wireless power transfer antennas disposed on or in opposite surfaces of the modular accessory, the two antennas being connected together to convey a received wireless power transfer from one antenna to another. One of the antennas may be placed in close proximity to an external power transmitter, while the other of the antennas may be disposed in close proximity to a wireless power receiver of the case or electronic device. Intermediate circuitry may be utilized to actively or passively adjust reactance, impedance, and/or other electrical characteristics that affect efficiency in an antenna.

A health and fitness modular accessory may include sensors for monitoring health and fitness characteristics of the user. For example, the modular accessory may include one or more of a heart rate monitor, a connection and circuitry for a radiological probe (e.g., ultrasound), Doppler, a radio for connection with external sensors (e.g., via ANT+ or other wireless communication radios), proximity sensor(s), glucometer, insulin pump, pulse-oximeter, blood pressure, thermometer, blood pressure monitor, EKG, ECG, weight scale, vein illuminator, dermatological light, nebulizer, and/or camera with receptacle for nasal or ear specula, breathalyzer and the like. The health and fitness modular accessory may additionally, or alternatively include circuitry, such as a global positioning system (GPS) receiver, to obtain time and position information for use with monitoring a variety of positional based health statistics. The health and fitness modular accessory may in some embodiments include an air quality monitoring circuit which may be configured to monitor one or more of airborne pathogens, ionization level, particulate levels, pollen, carbon monoxide, and the like.

The health and fitness modular accessory may include circuitry for collecting, storing, processing, and/or communicating data collected from the health and fitness sensors and components to the electronic device or via electronics of the case. In addition to, or as an alternative to wired communications, e.g., via a USB connection, communication circuitry of a health and fitness modular accessory (and of any other modular accessory) may be configured to utilize protocols in accord with one or more wireless communication standards, such a Bluetooth, Bluetooth Low Energy (BLE), Wi-Fi, near field communications (NFC) and the like for wireless communication with an electronic device installed in a case attached to the modular accessory.

An audio-oriented modular accessory may include one or more microphones, speakers, headphones, and/or radios. For example, a modular accessory may include a high-fidelity microphone or array of microphones for capturing audio. The modular accessory with microphone(s) may further include an analog to digital converter and/or other processing circuitry for processing audio captured by the microphone(s). Such embodiment may enable capture of audio signals with higher fidelity than possible with the electronic device alone.

In another embodiment, an audio-oriented modular accessory may include one or more audio speakers, such as a flat panel speaker. Each speaker may be a separate element attached to the modular accessory. In another embodiment the modular accessory may itself constitute the speaker, where an internal exciter causes a surface of the modular accessory to produce sound. In another embodiment, the modular accessory may include at least two speakers, at least one of which may be removed from the modular accessory for separation in playback of a multichannel audio signal. The separable speaker(s) may electrically attached by wire, or may include a battery and circuitry for wireless receipt, amplification, and playback of an audio signal. Such speaker, in some implementations, may be sized for use in or on a user's ear(s) (e.g., earbuds).

An audio-oriented modular accessory having playback structures such a speakers may connect to the electronic device via a dedicated audio port, such as the audio jack found in many mobile phones, or may receive audio data in a digital form to be converted for analog playback by a digital to analog converter (DAC) and amplified prior to speaker delivery. A premium audio playback modular accessory may include one or more high fidelity DACs, parameter-matched discrete components, and in some embodiments may even accommodate one or more vacuum tubes for a pre-amplification stage.

In another embodiment, an audio-oriented modular accessory may include circuitry for receiving and tuning a frequency modulated (FM) radio signal, an amplitude modulated (AM) radio signal, a shortwave radio signal, and/or a weather band radio signal. The received and tuned radio signal may be directed to the electronic device for playback or processing therein. Alternatively, the modular accessory may include circuitry for amplifying and playing back the received, tuned radio signal directly.

Figure 35B:
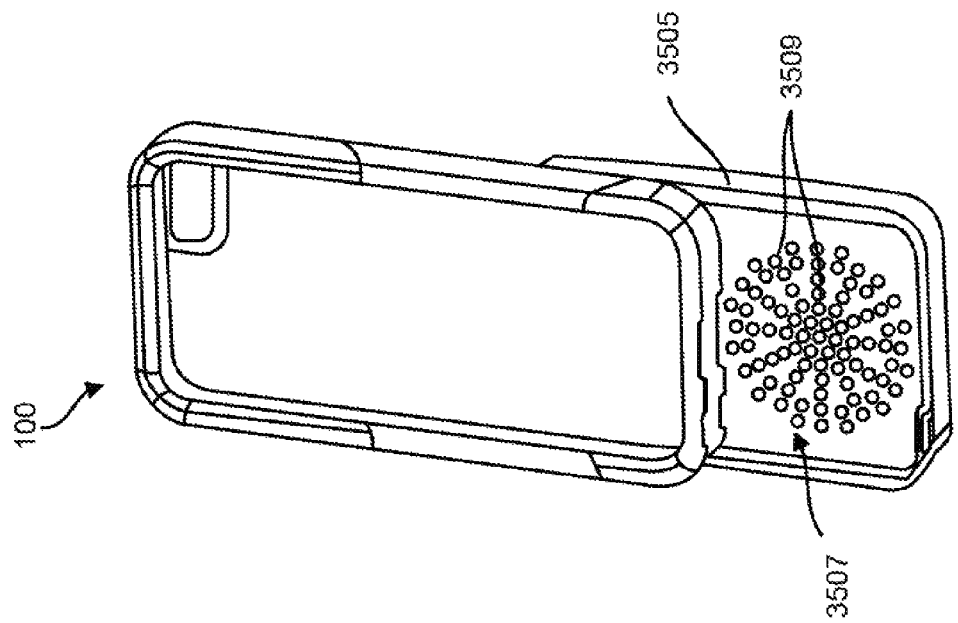
FIG. 35B shows a front view of the protective case of FIG. 35A.
Figure 35A:
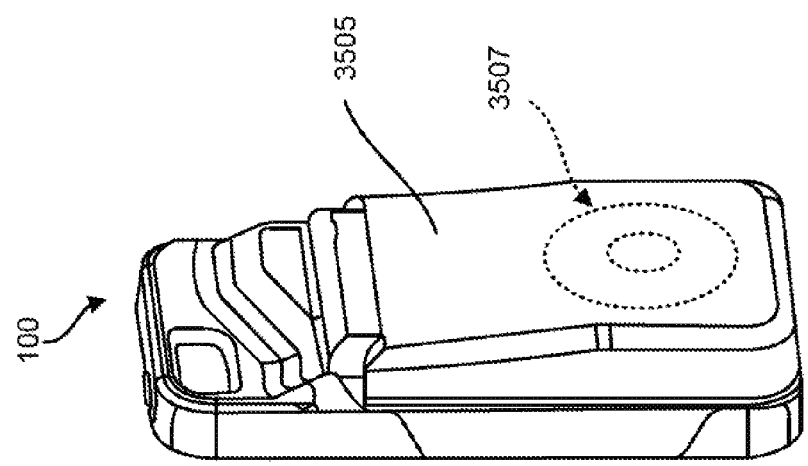
FIG. 35A shows a back perspective view of a protective case with modular accessory having a speaker.

According to some embodiments, the audio-oriented modular accessory may be implemented as an enhanced sliding drawer, similar to the sliding drawer described above with respect to, e.g., FIGS. 1-2. FIGS. 35A and 35B show a case 100 having a sliding drawing 3505 that includes a speaker 3507. The speaker 3507 is shown facing toward the case, but in other implementations may face away from the case. The case-facing orientation may permit the speaker to be protected from elements and collection of dust through a grill (3509). As discussed above, the speaker itself may be selected from several types, including traditional cone-and-magnet voice coil type speaker. Other types may accommodate a thinner profile.

A visual-oriented modular accessory may include a graphics projector, such as to project an image or video. For this purpose, the visual-oriented modular accessory may include one or more of a small image-generating device, such as an LCD panel, a light source to project the image and lens for focusing and/or expanding the image to be projected.

In another embodiment, a visual-oriented modular accessory may include a display panel, distinct from a display panel of an electronic device encased by a case to which the modular accessory is attached. The display panel of a modular accessory may be a low power (such as a bi-stable) display, such as e-ink. Or in some embodiments, the modular accessory may include a high-resolution color LCD or LED display panel. In either instance, the modular display panel may include image processing circuitry to receive an image and cause the display panel of the modular accessory to display at least a portion of the received image.

A modular accessory having a low-power (e.g., e-ink) display panel may receive simple images that need not change with great frequency. For example, the display may present a time of day, a shopping list, a to-do list, a favorite quote, a graphic, or the like. The image to be displayed may be received from an associated electronic device encased by the case to which the modular accessory is attached. In another implementation, the visual-oriented modular accessory may include a memory device and circuitry to receive and store a limited number of images and to cycle through such stored images. A button may be included in the modular accessory to effect changes to the displayed content.

In embodiments in which the display panel of the modular accessory may receive data from the encased electronic device with which the modular accessory is attached via a case, the display may be changed at any time. The electronic device may execute an application that communicates images to the visual-oriented modular accessory. Such application may communicate with other applications executed by the electronic device in order to receive data to be displayed by the modular device display. For example, an application for providing graphic information to the modular accessory display may obtain data from a contacts list, a task list, a photo gallery, a calendar, a time-of-day application, a weather application, or the like.

In the instance of a monochrome e-ink display, the application may analyze an image to be displayed and process the image for enhanced viewability on the monochrome display. For example, the application may cause the electronic device to process an image based on various luminance and/or chrominance thresholds to convert the image to a black and white representation.

Carrying an electronic device is, or is becoming, ubiquitous. Portable phones, for example, are carried by a large and growing percentage of people globally. Another very common electronic device, though less frequently portable, is a television set. Most television sets and other types of audio-visual equipment, among other devices, include an infrared (IR) receiver that receives signals from a dedicated remote. Although such remotes, and even aftermarket "universal" IR remotes are available, the number of portable devices a person must keep track of seems to grow. It may be sensible in many circumstances, therefore, to reduce the number of devices by combining functionality. While some smart phones include an infrared transmitter, most phones currently do not.

Accordingly, a modular accessory having an infrared transmitter and related circuitry may be connected to a case for an electronic device. A modular accessory having an infrared transmitter may include circuitry for receiving data via a physical electrical connection from the electronic device via electronic circuitry of the case. In another embodiment, the modular accessory with IR transmitter may receive the data from the electronic device wirelessly according to a standard or proprietary protocol (e.g., Wi-Fi, Bluetooth, Bluetooth Low Energy, and the like).

To power the IR transmitter and related circuitry, the modular accessory may include a power source 3410 such as any of the power sources discussed above, or may receive power from a power source 2810 of the case to which it attaches. The modular accessory with IR transmitter may include one or more buttons. Each button may be pre-programmed, either by a manufacturer or by the user, to perform a specific function. For example, in one embodiment a button may be configured to send a "power on" signal to a receiving device (e.g., audiovisual equipment). In other embodiments, the modular accessory with IR transmitter may merely transmit an IR signal in response to the press of a button or touchscreen area of the encased electronic device, where the electronic device sends a signal to the modular accessory for transmission via the IR transmitter of the modular accessory.

In an embodiment in which the modular accessory with IR transmitter includes its own power source and buttons, the modular accessory may function as a standalone remote control when disconnected from the case and electronic device. In this instance, the electronic device may be used to program the modular accessory.

Figure 36D:
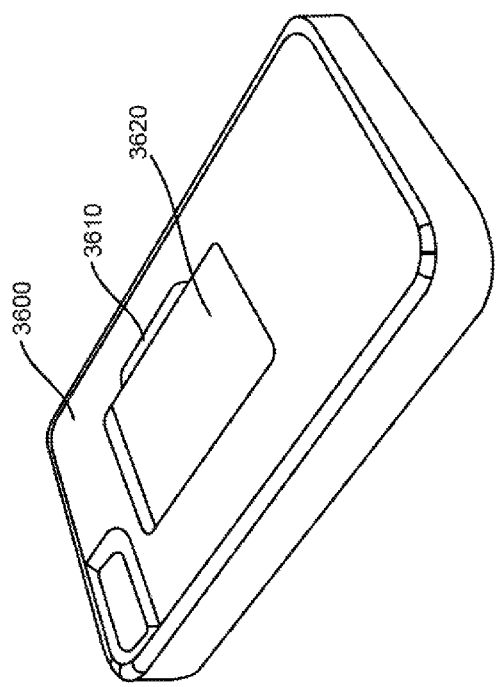
FIGS. 36A-36D show various views a protective case having a cavity for a remote control device and the remote control device.
Figure 36C:
Figure 36B:
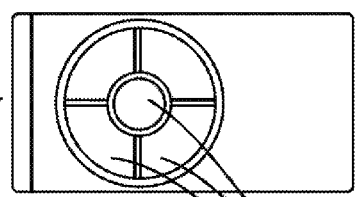
Figure 36A:
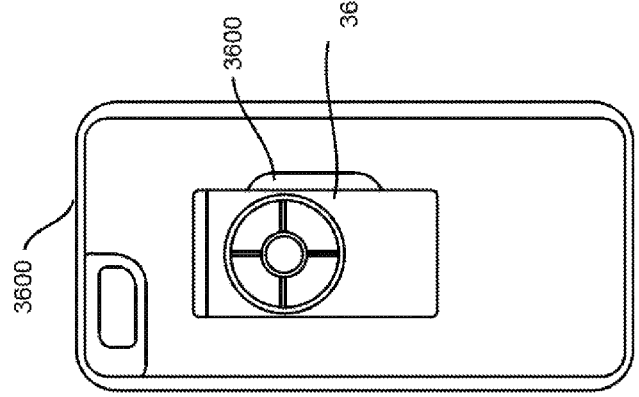

One example of a case having removable remote is illustrated in FIG. 36A. A case 3600, may include a receptacle 3610 for receiving a removable remote 3620 or other modular accessory(ies) that may use an interference fit in the receptacle 3610. The removable remote 3620 may include electronic components (e.g., 3400) that use power from a power source (e.g., 3410) and discrete components (e.g., 3480) and/or other components to effect remote control communications. The remote 3620 may have one or more buttons 3622, each of which may be assigned a respective function. It will be appreciated that the buttons, shown in a circular pattern in FIGS. 36A and 36B, may be implemented in other layouts and shapes. FIG. 36A shows a rear perspective of the case, with the remote 3620 occupying the receptacle 3610. FIGS. 36B and 36C illustrate the remote when removed, in front and rear views respectively. FIG. 36D illustrates a rear perspective view in which the remote 3520 is placed in the receptacle 3610 with the buttons 3622 facing inward. This arrangement may protect the buttons from impacts, scratches, etc. Case 3600 may include electronic components as described with respect to FIG. 28.

The removable remote 3620 may include a power source (e.g., 3410) such as a battery, as described above, for powering the remote when in operation, and when separate from the case 3600. The remote 3620 may, when occupying the receptacle 3610 may receive power from a power source (e.g., 2810) of the case 3600, and/or from a power source of an electronic device enclosed by the case 3600, in order to recharge the power source of the remote 3620. This arrangement may also permit the removable remote 3620 to recharge from an external power source (e.g., A/C wall plug) via electrical connection through the case and/or electronic device. The removable remote 3620 may include an IR transmitter and/or a radio frequency transmitter/receiver similar to what is described in the preceding paragraphs. In another embodiment (not shown), the removable remote may be a subassembly removable from a modular accessory, which in turn may attach to a case as described in embodiments above.

Alternatively, a modular accessory with IR transmitter may act as a repeater. In this instance, the modular accessory may be spaced from the electronic device by a distance (even a different room may feet away, separated by a wall), and yet may relay and/or translate a wireless signal received from the electronic device and transmit the signal to a receiving device (e.g., audiovisual equipment). In order to accommodate this functionality, the modular accessory may include a power source, communication circuitry for receiving an electromagnetic signal from the electronic device, processing circuitry for converting a received wireless signal to an infrared signal, and the infrared transmitter. In some embodiments, such modular accessory may include circuitry permitting the reverse transmission. That is, the modular accessory may include an infrared receiver for receiving feedback from a device that communicates via IR. The modular accessory in this configuration may translate or otherwise process the received infrared signal so that it may be transmitted via wireless transmitter to the electronic device (e.g., smart phone).

A memory expansion modular accessory may include one or more receptacles for receiving a flash memory card, such as a secure digital card. A modular accessory according to this disclosure may, similar to the SIM card carrying cases described with reference to FIGS. 10-22 may, alternatively, be configured to hold one or more memory cards. In certain embodiments, at least one of the protective case 100 and the sliding drawer 105 may include circuitry for electrically connecting a memory card to the electronic device held in the protective case 100. Consider the configurations illustrated in FIGS. 11 and 14A-C. In an embodiment in which an opening 186 is configured to hold one or more memory cards, such as an SD flash memory card, the back side surface 150 (as in FIG. 11) or the front side surface (as in FIG. 14B) may include electrical contacts aligned to contact electrical contacts of the memory card. Such electrical contacts of the back side surface 150 or front side surface may provide an electrical connection, such as a data connection between the memory card and electrical circuitry of the protective case 100. The electrical circuitry of the protective case may include wiring and a connector for connection with an electrical port of the electronic device such as, but not limited to, a USB or Lightning port. In another embodiment, the case may include a microcontroller or microprocessor that interfaces a memory card for use with a wired serial connection and/or with a wireless data connection to the electronic device, which acts as host to the memory card(s).

It will be appreciated that the sliding drawer 186 may, similar in part to what is shown in FIGS. 22A and 22B, include slots for receiving one or more memory cards (in place of the slots for SIM cards in FIG. 22B). The case and sliding drawer 186 may include circuitry for switchably selecting one of several memory cards for electrical connection with the encased electronic device, or may permit all memory cards held by the case to be simultaneously accessed by the encased electronic device via circuitry of the case.

Any of the modular accessories described herein may include one or more lighting devices. The lighting device may be an indicator such as one or more LEDs, OLEDs, laser, electroluminescent devices, phosphorescent elements or the like. LEDs may be multi-colored and thus capable of being programmed to any of many colors, or may be capable of only a single color. In some instances the lighting device(s) may be useable as a flash for use with a camera of the electronic device. In other instances, the lighting device may include a laser pointer such as may be used for a presentation. In each instance, the light may accept power from a battery of the case or may be configured to use power from a power source integrated with the modular accessory having the lighting device or power from another modular accessory used in concert with the modular accessory having the lighting device. The modular accessory having a lighting device may include additional circuitry, such as a lighting controller. The modular accessory having a lighting device may also include one or more buttons. The button(s) may turn the light of the modular accessory on or off, or may change the amount or quality of light produced in concert with circuitry of the modular accessory or of an associated electronic device. In other instances the button(s) may send a signal to the electronic device to effect a function.

Each lighting device of the modular accessory having a lighting device may in some embodiments be controlled by an application executed by the electronic device. For example, the application may cause a light of the modular accessory to be turned on in response to a notification received or generated by the electronic device, such as a time-based alarm, a data receipt (e.g., email or text message), or another indication. In other instances the modular accessory having a light may be controlled in response to a signal from another modular accessory. For example, a modular accessory that detects proximity of another device (e.g., via a BLE proximity profile) may transmit a signal to the modular accessory having a light to control one or more of the light of the modular accessory having the light(s). Alternatively, such other modular accessory may transmit a signal to the electronic device, which in turn may illuminate, turn off, or otherwise control the light(s) of the modular accessory having the light.

A security modular accessory may include one or more security features. For example, the security modular accessory may include authentication elements and/or personal defense elements. Authentication elements may include a fingerprint scanner, an iris scanner, a vein pattern scanner, a button sequence interpreter or the like. Each of these sensors/scanners may include additional electronic circuitry such as one or more processors, memory, communication circuit(s) and the like. The additional electronic circuitry of the security modular accessory including authentication elements may acquire data from the scanner(s)/interpreters, and report the data received directly to circuitry in the case and/or electronic device for comparison with a known authentication key. For example, a modular accessory with a fingerprint scanner may obtain fingerprint data from the fingerprint scanner and transmit the fingerprint data to the electronic device. The electronic device may process the fingerprints data and/or compare the fingerprint data to a set of expected data stored in the electronic device or obtained from an external source, such as via an internet connection. If the obtained authentication data, such as fingerprint data matches the expected data, the electronic device may perform a function, such as permitting access to features of the electronic device.

In another aspect of the security modular accessory having authentication elements, the modular accessory may include a lockable chamber having an electromechanical locking device that locks the lockable chamber. The authentication elements may control the locking and unlocking of the lockable chamber. In another embodiment, the security modular accessory having authentication elements may provide data to the electronic device, case, or another modular accessory to lock or unlock an electromechanically lockable chamber of the case or other modular accessory.

Personal defense elements of a security modular accessory may include one or more of a chemical distribution element and an electroshock weapon. A chemical distribution element may include a container and sprayer for containing and projecting oleoresin capsicum (pepper spray) or the like. The chemical distribution element may not require an electrical or data connection to the case or electronic device. However, in some embodiments, the chemical distribution elements may include electronic circuitry to monitor and report a chemical level in the container, number of dispensing events, time of dispensing, amount dispensed, and the like. Such information may be useful for maintaining the modular accessory in a state of readiness, or may be useful for forensic data.

A security modular accessory including an electroshock weapon may incorporate an electrical storage device capable of very fast electrical discharge for purposes of temporarily disabling an attacker, and electrodes to deliver a high voltage, low current electrical shock from the electrical storage. The electrical storage device may be charged from a battery of the case or by separate charging elements, such as circuitry to charge from an A/C wall socket. The electrodes may fixedly extend from a side of the security modular accessory, or may include a projectile delivery mechanism to project the electrodes at an opponent.

As with a chemical distribution embodiment of the security modular accessory, electronic circuitry may be included in the modular accessory having an electroshock weapon to control and/or monitor a voltage level of the electrical storage device thereof, to record time and/or amount of electrical discharge, and the like. An application executed by an associated electronic device in the case to which the modular accessory is attached may analyze, process, and/or report data obtained from electronics of the modular accessory.

Figure 37:
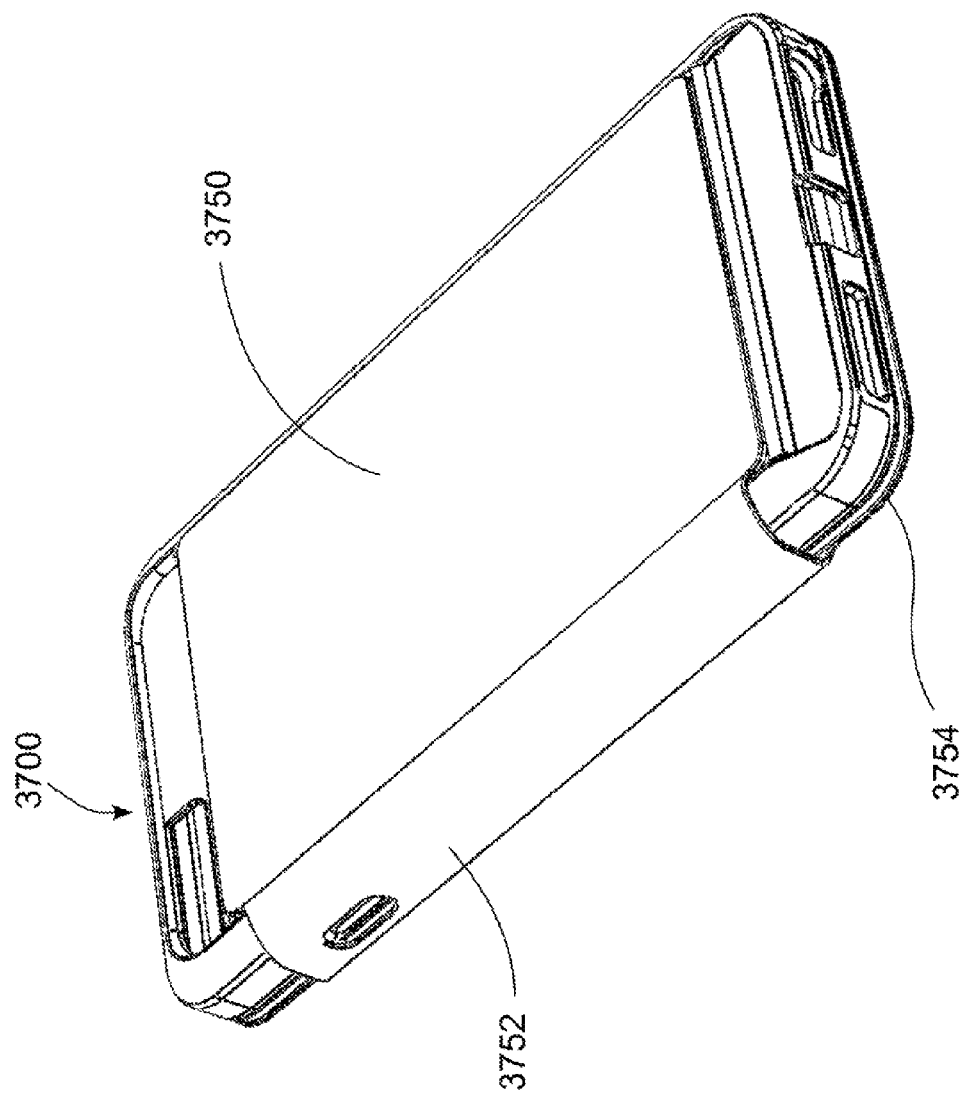
FIG. 37 shows a protective case according to the disclosure with a modular accessory that provides a folio cover.

As shown in FIG. 37, a folio modular accessory 3750 may be attached to a protective case 3700. The folio modular accessory 3750 may include a flap or lid 3754 (in this view covering a bottom-facing portion of the protective case 3700) attached to a hinge, such as a living hinge 3752 at a side of the modular accessory 3750, which flap or lid 3754 may be bent or folded around an encased device 3700 to cover at least a portion of a screen of the electronic device, thereby providing protection from scratches and the like. The flap or lid 3754 may be constructed of a deformable fabric, leather, rubber, TPE, and/or the like.

In another embodiment (not shown) the flap or lid may be formed of two or more rigid portions hinged at the edge of the modular accessory and at a second area to fold around the case and encased electronic device to cover the touch screen. In some embodiments the folio modular accessory may include electronic circuitry in the flap or lid, such as a keyboard. The flap or lid of the folio modular accessory may be configured to provide stand for hands-free viewing of a display of the electronic device when the flap or lid is in an open position. The flap or lid may in other embodiments include a solar electricity collecting panel.

Being removable, the folio modular accessory 3750 may permit a user to select the folio modular accessory from a variety of modular accessories for aesthetic preference. For example, the folio modular accessory may be provided in a variety of colors, imprinted graphics, materials, features and arrangements. A user may exchange one folio modular accessory for another depending on occasion, to match color or style of the user's attire, or to provide different functionality as needed.

Embodiments are disclosed in which a case may simultaneously receive multiple modular accessories. It will be appreciated that each of multiple modular accessory may communicate data or power wirelessly to the case and/or encased electronic device. However, non-wireless embodiments may be advantageous in relatively radio-quiet environments, such as were sensitive electrical equipment may be operating. In such cases, a plurality of modular accessories may include circuitry for chaining communications and/or power between each modular accessory. The chained data communications may be serialized for communication via a serial link, such as USB. Electrical power may be linked to a shared power bus in accord with a USB standard. It will be appreciated that other wired communication and power standards, or proprietary wired communication and power protocols may be used. For example, modular accessories may be connected via THUNDERBOLT, and/or other means. Modular accessories may communicate between themselves via one communication protocol, while communicating with an electronic device or external device by a different communication protocol.

While accessories above may suggest a size similar to, or smaller than the electronic device to which each modular accessory described above pertains, a modular accessory may be larger, even much larger than the electronic device with case. In some embodiments the case may be physically attached to a large modular accessory to permit use of the electronic device as a processing and/or communications base while the modular accessory provides features that are limited by the size of the electronic device itself. For example, the modular accessory may attach to the case and electronic device to provide a larger portable display and/or touchscreen, i.e., providing tablet-computer like features.

Figure 39:
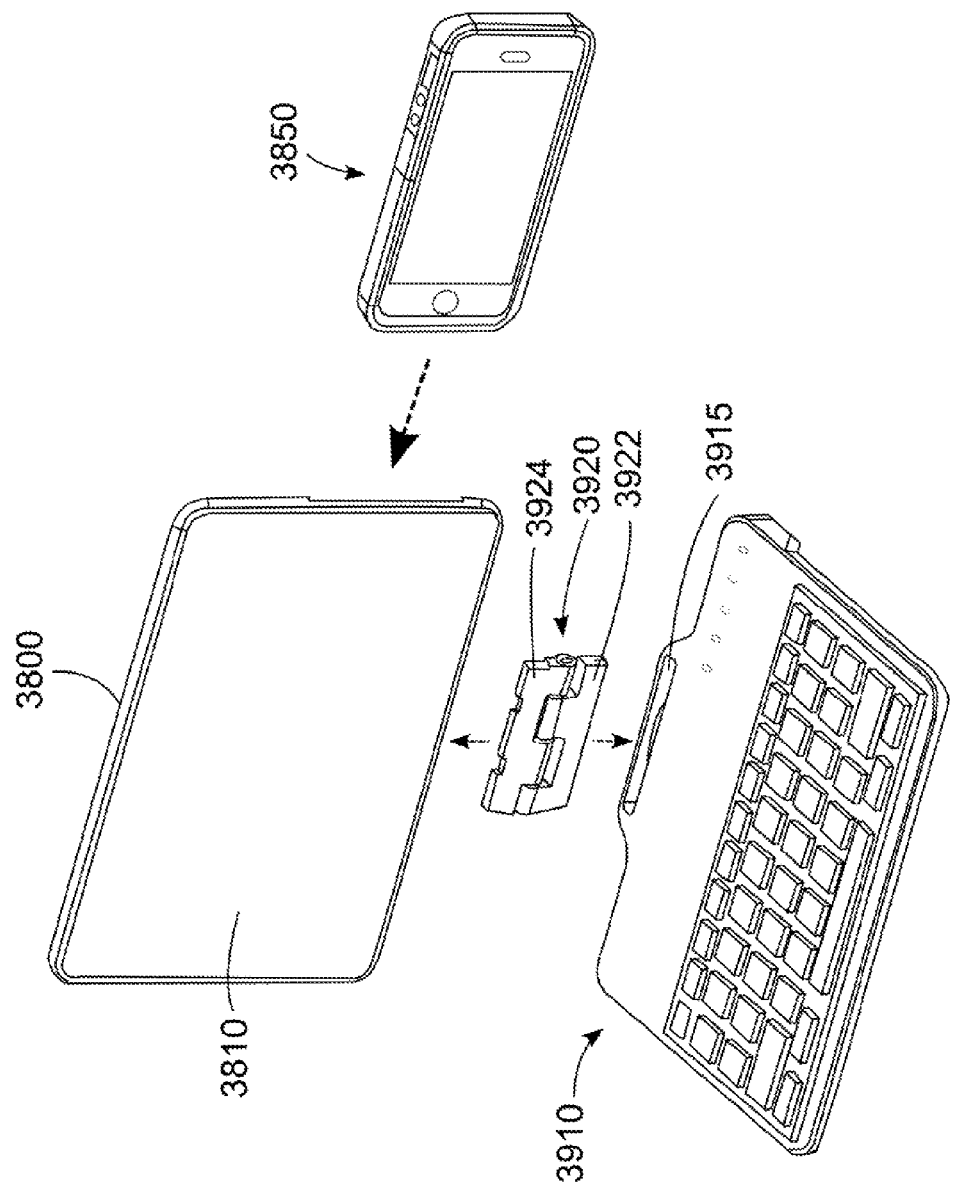
FIG. 39 shows the super-modular accessory of FIG. 38 with an optional keyboard and attachment support.

FIGS. 38-39 illustrate an example of such large modular accessory 3800. The large modular accessory may include electronic components as described above (3400). The large modular accessory may further include a receptacle 3820 for receiving the case and/or electronic device (together shown as 3850). The receptacle 3820 may include ridges, detents, or the like (not shown) along an insertion path of the encased electronic device for securely holding the protective case in place against the modular accessory when installed, and may include electrical connectors (also not shown) for electrically connecting to the protective case and/or electronic device 3850. The large modular accessory 3800 may include a touchscreen and display 3810 that may be configured to mirror a display of the electronic device, and may include a speaker 3830 for outputting sound data. The large modular accessory may also include electrical connectors 3840 for connecting the combined modular accessory and electronic device to an external device. For example, the electrical connectors may permit connection to a power source for charging a battery of the modular accessory 3800 and/or electronic device, an audiovisual cable (e.g., HDMI) for providing audio and/or video between the modular accessory and an external display screen and/or audio device. The large modular accessory 3800 may have a structure that permits the modular accessory to stand on its own, for example via a kickstand (not shown) or a large flat surface 3825.

As shown in FIG. 39, the modular accessory 3800 may be attached to a keyboard device 3810. The keyboard device 3910 may include a support or hinge mechanism 3920, one end 3922 of which may be held by a corresponding receptacle 3915 of the keyboard mechanism. Another end 3924 of the support or hinge mechanism may engage a corresponding receptacle 3815 of the modular accessory (seen in FIG. 38). The support or hinge mechanism 3920 may be purely mechanical or may include electrical contacts (not shown) to provide an electrical connection between the modular accessory 3800 and the keyboard device 3910, e.g. for data and/or power transfer therebetween.

In other embodiments, the case may physically and electrically attach to a portable sound system to provide audio input or output capabilities not possible in a small portable device, such as may be provided by large speakers, a compact disc reader, or the like.

In such "super module" implementation, the case may attach to the modular accessory using any of the above-mentioned connection elements. In implementations where a second, larger screen is provided, the case may be attached to the screen-oriented modular device in a way that protects otherwise exposed features of the electronic device. For example, in embodiments where the encased device is a smart phone having a touchscreen, the touchscreen of the smart phone may be covered by a back surface of the screen-oriented module, the touchscreen of the smart phone thus being protected from scratching when the combined electronic device, case, and smartphone are set down. In another implementation, the modular accessory may itself include a cavity into which the electronic device may be fit. For example, a large screen-oriented modular accessory may have a cavity formed in a back or side portion thereof for removably receiving the bare electronic device.

It will be appreciated that features described for various modular accessories are not limited to any particular type of modular accessory. Thus, for example, a modular accessory may include a solar panel and a heart monitor, or a compartment for valuables and an NFC radio and circuitry. Moreover, as described above, a case may be structured to hold more than one modular accessory, such that different features may be mixed and matched as desired.

In some embodiments the case itself may include no electrical connections or other electrical components. Instead, a modular accessory may include components for electrically connecting directly to the electronic device installed in the case, such as through an opening in the case that exposes, e.g., a port of the electronic device. For example, the modular device may include a portion that extends from an end of the modular device, and an electrical plug to engage an electrical port of the electronic device. When the modular accessory is installed on the case, the electrical plug may extend through an opening in a side wall of the case into the electrical port or receptacle of the electronic device. This extension of the modular accessory may include another electrical connector to accept a charging and/or data transfer cable.

Figure 40:
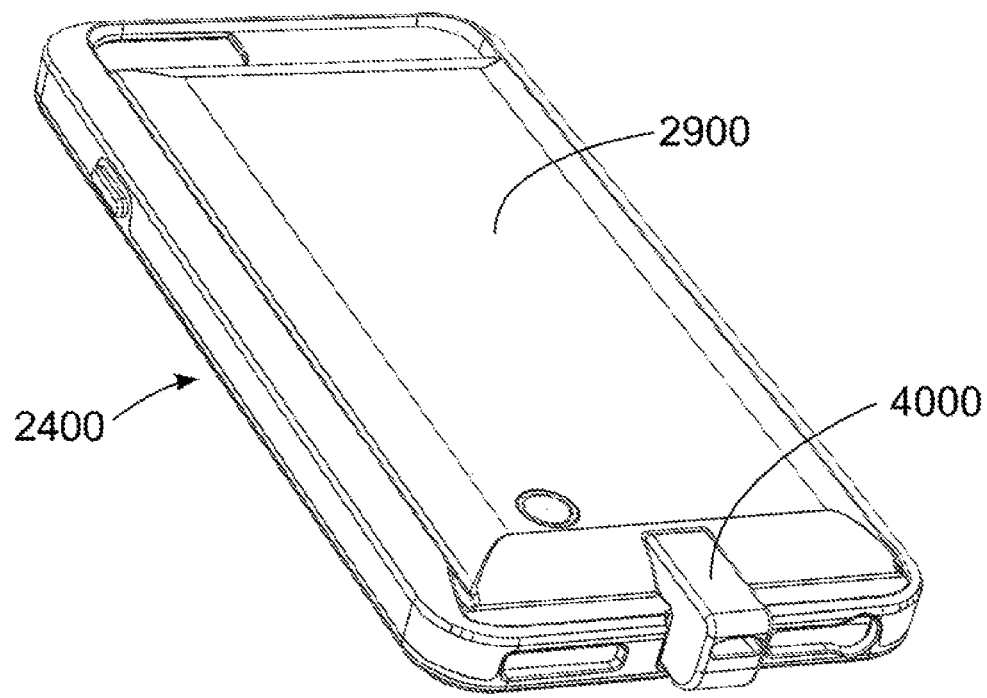
FIG. 40 is a bottom perspective view illustrating a protective case with a modular accessory, along with an adapter for electrically connecting the modular accessory to the case and/or encased electronic device.
Figure 41:
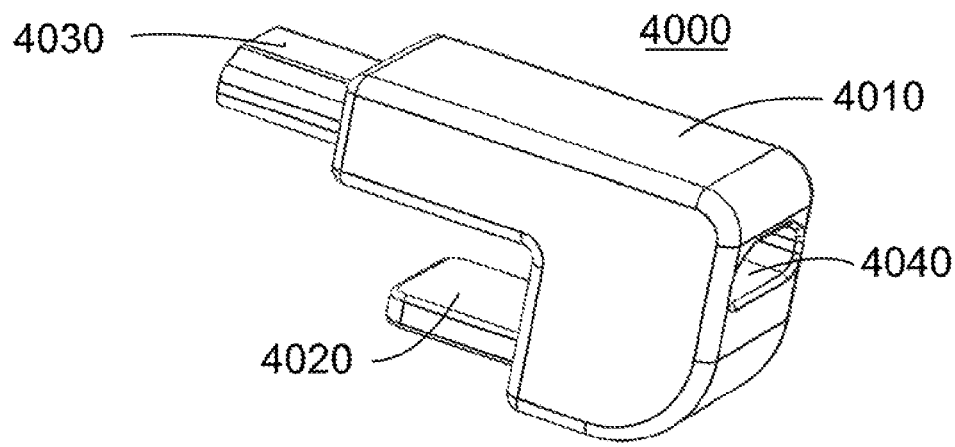
FIG. 41 is a side perspective view of the adapter in FIG. 40.

In another embodiment, as shown in FIG. 40, an electrical connection between a modular accessory 2900 (see FIG. 29) and encased electronic device may instead be made via a separate adapter 4000. As shown in FIG. 41, the adapter 4000 may include two or more electrical connectors. More specifically, a body 4010 may have a first electrical connector 4020 disposed at and extending from a first end of the body 4010 for connection to a modular accessory 2900. A second electrical connector 4030 may be disposed at and extend from a second end of the body 4010 for connection to a port of an electronic device. One or more wire(s) or other conductive material (not shown) disposed inside the body 4010 of the adapter 4000 may connect one of the two connectors to the other of the connectors. Thus, electrical signals received at the electrical connector at one end of the adapter, e.g., from the modular accessory, may be conveyed by the wire(s) or other conductive material to the electrical connector disposed at the other end of the adapter and thence to the electronic device (or vice versa).

The adapter may also include a third electrical connector 4040, such as an electrical receptacle. This third electrical connector 4040 may be accessible when the adapter is installed and may permits connection of the electronic device and/or modular accessory to a charging or data transfer cable. In some embodiments of the adapter 4000, circuitry may be included for intelligently directing electrical power and/or data between the electronic device, modular accessory, and an external source. For example, when a cable is used to provide electrical power from an external source, the circuitry of the adapter may direct the electrical power to first charge a battery of the electronic device, then charge a battery of the modular accessory. When a cable is installed for data transfer, the circuitry may direct data stored in memory of the modular accessory to an external device, or may direct data stored in memory of the electronic device to the external device, or vice versa. Such direction may be selectable by a user in some embodiments.

In still another embodiment, the adapter may itself include an electrical power source, such as a rechargeable battery or capacitor.

A modular device may alternatively, or additionally, include wireless communication circuitry for communication, e.g., with the electronic device or electronic components of the case. Likewise, the modular accessory may include wireless power transfer circuitry for receiving power from a wireless power charger and/or for transmitting power from a battery internal to the modular accessory to an installed electronic device configured to wirelessly receive power.

It will be appreciated by those having skill in the art that, as described above for a case 100, 200 with sliding drawer 105 or compartment door 205, a case (2400, 3100, 3200, 3600, 3700) configured to receive a modular device may provide a waterproof enclosure for an electronic device. Such waterproof enclosure may include a channel 10 with gasket 15 and first and/or second clasping mechanisms 27, 37 as described and illustrated by U.S. application Ser. No. 14/029,739 incorporated herein by reference. In many instances a modular accessory (2600, 2900, 3250, 3275, 3300, 3505, 3620, 3800) may be sealed to prevent internal access by a user, and such sealing may further provide a watertight seal. A watertight seal between members of a modular accessory housing (e.g., 2920) may include a channel (similar to the channel 10 shown in FIG. 3A of U.S. patent application Ser. No. 14/029,739) in a first modular accessory housing member, with a gasket (similar to the gasket 15 shown in FIG. 3A of U.S. patent application Ser. No. 14/029,739) disposed in the channel, and a perimeter ridge formed in a second modular accessory housing member configured to press against the gasket when the first housing member is assembled to the second housing member. First and second clasping mechanisms (similar to the first clasping mechanism 27 and second clasping mechanism 37 shown in FIG. 3A of U.S. patent application Ser. No. 14/029,739) may be respectively disposed on the first and second housing members of the modular accessory, where the first clasping mechanism engages with the second clasping mechanism to hold the two housing members together. Alternatively, housing members of a modular accessory may include o-rings and compressive features to seal the housing together. In other embodiments a modular accessory may be formed of a single housing member such that no waterproof seal is necessary, as no seams are formed between housing members. To the extent that a case or modular housing includes electrical connectors, the electrical connectors may be waterproof electrical connectors, such as a waterproof micro-USB connector or the like.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. An electrical accessory for use with a portable electronic device and with a protective cover for the portable electronic device, the protective cover adapted to receive and at least partially enclose the portable electronic device, the electrical accessory comprising:
   a body including:
      a back portion that is slidably attachable to a back side surface of the protective cover to removably affix the electrical accessory to the back side surface of the protective cover; and
      a bottom portion adapted to be proximate a bottom side surface of the protective cover when the electrical accessory is removably affixed to the protective cover;
   an electrical connector affixed to the bottom portion of the body of the electrical accessory, the electrical connector positioned to electrically interconnect directly to an electrical port of the portable electronic device when the electrical accessory is removably affixed to the protective cover and when the portable electronic device is installed in the protective cover; and
   electrical circuitry connected to the electrical connector of the electrical accessory, the electrical circuitry adapted to electrically interact with the portable electronic device through the electrical connector of the electrical accessory when the electrical accessory is removably affixed to the protective cover and when the portable electronic device is installed in the protective cover.

2. The electrical accessory of claim 1 further comprising a battery connected to the electrical circuitry, wherein the battery and the electrical circuitry are adapted to provide stored electrical power from the battery to the portable electronic device when the electrical accessory is removably affixed to the protective cover and when the portable electronic device is installed in the protective cover.

3. The electrical accessory of claim 2 wherein the battery is a rechargeable battery.

4. The electrical accessory of claim 2 wherein the body of the electrical accessory includes a cavity on a front side of the back portion, the cavity adapted to hold the battery.

5. The electrical accessory of claim 4 wherein the battery is removable from the cavity of the body of the electrical accessory such that the battery can be replaced in the electrical accessory with another battery.

6. The electrical accessory of claim 1 wherein the back portion of the body includes a cutout that aligns with an opening on the protective cover when the electrical accessory is removably affixed to the protective cover.

7. The electrical accessory of claim 1 wherein the electrical circuitry includes a computer processor adapted for conducting data communications with the portable electronic device.

8. The electrical accessory of claim 1 wherein the electrical circuitry includes wireless communication circuitry adapted for conducting wireless data communications with the portable electronic device.

9. The electrical accessory of claim 1 wherein the body further includes one or more rails that engage with one or more rail receivers of the protective cover, respectively, to removably affix the electrical accessory to the protective cover.

10. The electrical accessory of claim 1 wherein the body further includes one or more rail receivers that engage with one or more rails of the protective cover, respectively, to removably affix the electrical accessory to the protective cover.

11. The electrical accessory of claim 1 wherein the electrical connector is adapted for communicating both data and electrical power between the electrical accessory and the installed portable electronic device.

12. The electrical accessory of claim 1 wherein the electrical circuitry includes a sensor adapted for detecting a health parameter of a user of the electrical accessory.

13. The electrical accessory of claim 1 wherein the electrical circuitry includes one or more of a speaker and a microphone adapted for conducting audio information between the portable electronic device and a user of the electrical accessory.

14. An electrical accessory for use with an electronic device and for use with a protective case for the electronic device, the protective case adapted to receive and at least partially enclose the electronic device, the electrical accessory comprising:
   a body that is slidably attachable to a first side of the protective case to removably affix the electrical accessory to the protective case, wherein an end portion of the body is adapted to be proximate a second side of the protective case when the electrical accessory is removably affixed to the protective case;
   an electrical connector affixed to the end portion of the body of the electrical accessory, the electrical connector positioned to directly and electrically engage an electrical port of the electronic device proximate the second side of the protective case when the electrical accessory is removably affixed to the protective case and when the electronic device is installed in the protective case; and
   electrical circuitry connected to the electrical connector of the electrical accessory, the electrical circuitry adapted to electrically interact with the electronic device through the electrical connector of the electrical accessory when the electrical accessory is removably affixed to the protective case and when the electronic device is installed in the protective case.

15. The electrical accessory of claim 14 further comprising a rechargeable battery connected to the electrical circuitry, wherein the rechargeable battery and the electrical circuitry are adapted to provide stored electrical power from the rechargeable battery to the electronic device when the electrical accessory is removably affixed to the protective case and when the electronic device is installed in the protective case.

16. The electrical accessory of claim 15 wherein the body of the electrical accessory includes a cavity adapted to receive the rechargeable battery.

17. The electrical accessory of claim 16 wherein the rechargeable battery is removable from the cavity of the electrical accessory such that the rechargeable battery can be replaced with another battery.

18. A modular accessory system for use with an electronic device, the modular accessory system comprising:
   a cover for receiving and at least partially enclosing the electronic device when the electronic device is installed in the cover; and
   an electrical accessory for use with the electronic device and with the cover, the electrical accessory comprising:
      a body slidably attachable to a first side of the cover to removably affix the electrical accessory to the cover, wherein an end portion of the body is adapted to be proximate a second side of the cover when the electrical accessory is removably affixed to the cover;

an electrical connector affixed to the body of the electrical accessory, the electrical connector positioned to electrically interconnect directly to an electrical port of the electronic device proximate the second side of the cover when the electrical accessory is removably affixed to the cover and when the electronic device is installed in the cover; and electrical circuitry connected to the electrical connector of the electrical accessory, the electrical circuitry adapted to electrically interact with the electronic device through the electrical connector of the electrical accessory when the electrical accessory is removably affixed to the cover and when the electronic device is installed in the cover.

19. A modular accessory system for use with an electronic device and with a cover that receives and at least partially encloses the electronic device when the electronic device is installed in the cover, the modular accessory system comprising:

an electrical accessory for use with the electronic device and with the cover, the electrical accessory comprising:

a body slidably attachable to a first side of the cover to removably affix the electrical accessory to the cover;

an electrical interface accessible at an exterior surface of the body of the electrical accessory; and electrical circuitry connected to the electrical interface of the electrical accessory, the electrical circuitry adapted to electrically interact with the electronic device through the electrical interface when the electrical accessory is removably affixed to the cover and when the electronic device is installed in the cover; and an electrical adapter including a first electrical connector and a second electrical connector, wherein the first electrical connector of the electrical adapter is configured to electrically connect to the electrical interface of the electrical accessory and the second electrical connector is configured to simultaneously electrically connect to the installed electronic device when the electrical adapter is connected to the electrical accessory and the electrical accessory is removably affixed to the cover.

20. The modular accessory system of claim 19 wherein:

the cover includes one of a set of rails and a set of rail receivers;

the electrical accessory includes the other of the set of the rails and the set of the rail receivers; and the set of rails and the set of rail receivers are configured to engage to removably affix the electrical accessory to the cover.

* * * * *